(12) United States Patent
Yamamoto

(10) Patent No.: US 11,942,884 B2
(45) Date of Patent: Mar. 26, 2024

(54) VEHICLE SYSTEM VIBRATION SUPPRESSION CONTROL DEVICE AND VIBRATION SUPPRESSION CONTROL METHOD

(71) Applicant: MEIDENSHA CORPORATION, Tokyo (JP)

(72) Inventor: Yasuhiro Yamamoto, Ichinomiya (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/029,503

(22) PCT Filed: Aug. 2, 2021

(86) PCT No.: PCT/JP2021/028527
§ 371 (c)(1),
(2) Date: Mar. 30, 2023

(87) PCT Pub. No.: WO2022/070589
PCT Pub. Date: Apr. 7, 2022

(65) Prior Publication Data
US 2023/0318501 A1    Oct. 5, 2023

(30) Foreign Application Priority Data

Sep. 30, 2020 (JP) .................... 2020-165012
Nov. 9, 2020 (JP) .................... 2020-186285

(51) Int. Cl.
*H02P 23/04* (2006.01)
*B60L 15/20* (2006.01)
(Continued)

(52) U.S. Cl.
CPC ............. *H02P 23/04* (2013.01); *B60L 15/20* (2013.01); *G05B 13/042* (2013.01); *H02P 23/12* (2013.01);
(Continued)

(58) Field of Classification Search
None
See application file for complete search history.

(56) References Cited

U.S. PATENT DOCUMENTS 6,756,758 B2    6/2004  Karikomi et al.
9,150,117 B2   10/2015  Itou
(Continued)

FOREIGN PATENT DOCUMENTS

JP    2003-009566 A    1/2003
JP    2005-269835 A    9/2005
(Continued)

*Primary Examiner* — Todd Melton
*Assistant Examiner* — Jason R Roberson
(74) *Attorney, Agent, or Firm* — Foley & Lardner LLP

(57) ABSTRACT

A vehicle system vibration suppression control device is provided for a vehicle system in which a vehicle is driven via an elastic shaft by a motor drive device having a torque control function. The vehicle system vibration suppression control device includes: a section containing an approximate model to which an output torque command is inputted; and a feedback control section. The feedback control section is configured to: employ the approximate model; calculate a motor-accelerating torque component by differentiating a measured speed component of a motor rotational speed; produce a compensation torque component by causing the motor-accelerating torque component to pass through a vibration suppression control filter; and calculate the output torque command by subtracting the compensation torque component from an input torque command. The vibration suppression control filter is expressed by a second order mathematical expression.

15 Claims, 46 Drawing Sheets

CONFIGURATION OF VIBRATION SUPPRESSION CONTROL (a) CONFIGURATION OF VIBRATION SUPPRESSION CONTROL (b) SEPARATED SECOND-ORDER FILTER OF VIBRATION SUPPRESSION CONTROL (c) EFFECT OF MODIFICATION OF CHARACTERISTICS OF MOTOR MODEL BY VIBRATION SUPPRESSION CONTROL

(51) Int. Cl.
*G05B 13/04* (2006.01)
*H02P 23/12* (2006.01)

(52) U.S. Cl.
CPC ..... *B60L 2240/12* (2013.01); *B60L 2240/421* (2013.01); *B60L 2240/423* (2013.01); *B60L 2240/465* (2013.01); *B60L 2270/142* (2013.01)

(56) References Cited

U.S. PATENT DOCUMENTS

| | | | | |
|---|---|---|---|---|
| 2012/0081051 | A1* | 4/2012 | Kobayashi | B60W 10/08 |
| | | | | 903/930 |
| 2015/0127202 | A1* | 5/2015 | Itou | B60L 15/20 |
| | | | | 701/22 |
| 2022/0258617 | A1* | 8/2022 | Komatsu | B60L 3/0076 |

FOREIGN PATENT DOCUMENTS

| | | | |
|---|---|---|---|
| JP | 2013-223373 A | 10/2013 | |
| JP | 2013-223374 A | 10/2013 | |
| JP | 5861554 B2 | 1/2016 | |
| JP | 2020-043700 A | 3/2020 | |

* cited by examiner

NORMALIZED CONTROL MODEL

**SIMPLIFICATION OF CONTROL MODEL
BY ORDER REDUCTION**

MODEL WITH INTEGRATOR OMITTED WITH ATTENTION TO SHAFT TORSIONAL SPEED

FIG. 4
CONFIGURATION OF VIBRATION SUPPRESSION CONTROL
(a) CONFIGURATION OF VIBRATION SUPPRESSION CONTROL
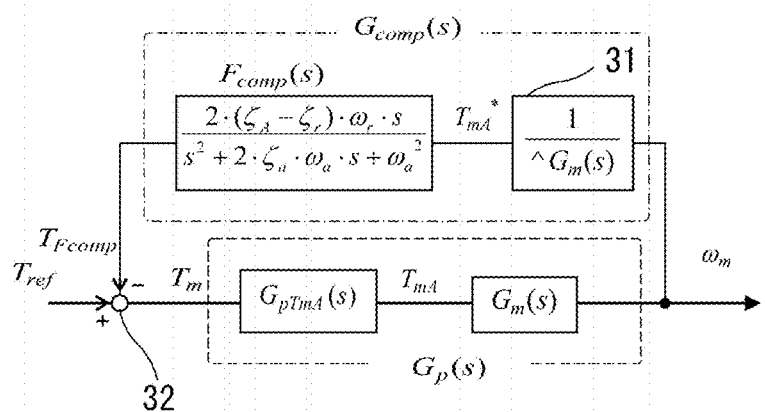
(b) SEPARATED SECOND-ORDER FILTER OF VIBRATION SUPPRESSION CONTROL
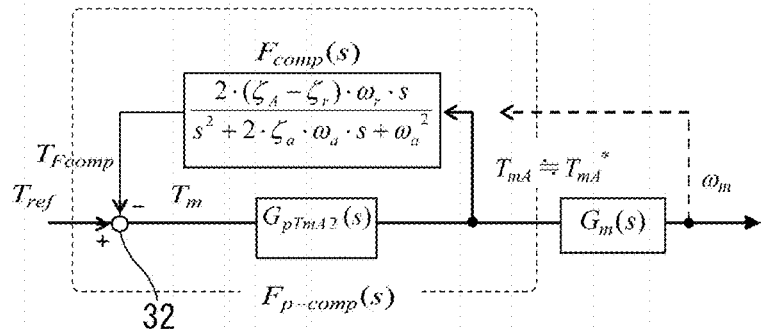
(c) EFFECT OF MODIFICATION OF CHARACTERISTICS OF MOTOR MODEL BY VIBRATION SUPPRESSION CONTROL
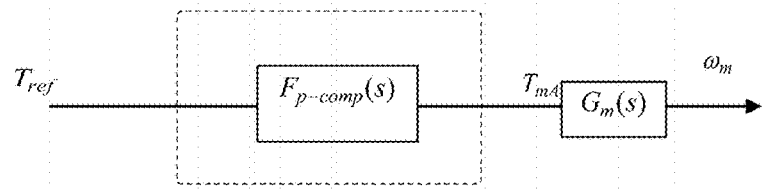

DISTURBANCE TORQUE OBSERVER (GENERAL)

DISTURBANCE TORQUE OBSERVER (TYPE ADAPTED TO VIBRATION SUPPRESSION CONTROL; MOTOR-ACCELERATING TORQUE)

VIBRATION SUPPRESSION CONTROL USING INFORMATION ABOUT MOTOR ACCELERATION BASED ON SPEED MEASUREMENT (WITH DISTURBANCE TORQUE OBSERVER ALSO SHOWN)

VIBRATION SUPPRESSION CONTROL USING INFORMATION ABOUT MOTOR ACCELERATION FROM DISTURBANCE TORQUE OBSERVER

VIBRATION SUPPRESSION CONTROL USING INFORMATION ABOUT MOTOR ACCELERATION FROM DISTURBANCE TORQUE OBSERVER

VIBRATION SUPPRESSION CONTROL USING INFORMATION ABOUT MOTOR ACCELERATION FROM DISTURBANCE TORQUE OBSERVER

PLANT MODEL FOR VERIFICATION
(BACKLASH COMPONENT; CORRECTION FACTOR OF TIRE COEFFICIENT)

SIMULATION MODEL FOR VERIFICATION OF ADVANTAGE OF VIBRATION SUPPRESSION CONTROL USING DISTURBANCE TORQUE OBSERVER

PATTERN OF INPUT TORQUE COMMAND AND LOAD DISTURBANCE FOR SIMULATION

NO VIBRATION SUPPRESSION CONTROL

VIBRATION SUPPRESSION CONTROL
(SPEED MEASUREMENT AND DIFFERENTIATION SYSTEM, WITHOUT BACKLASH, WITHOUT TIRE SLIP)

VIBRATION SUPPRESSION CONTROL
(SPEED MEASUREMENT AND DIFFERENTIATION SYSTEM,
WITH BACKLASH, WITHOUT TIRE SLIP)

VIBRATION SUPPRESSION CONTROL
(SPEED MEASUREMENT AND DIFFERENTIATION SYSTEM,
WITH BACKLASH, WITH TIRE SLIP)

VIBRATION SUPPRESSION CONTROL
(TORQUE OBSERVER SYSTEM, WITHOUT BACKLASH,
WITHOUT TIRE SLIP)

VIBRATION SUPPRESSION CONTROL
(TORQUE OBSERVER SYSTEM, WITH BACKLASH, WITHOUT TIRE SLIP)

VIBRATION SUPPRESSION CONTROL
(TORQUE OBSERVER SYSTEM, WITH BACKLASH, WITH TIRE SLIP)

VIBRATION SUPPRESSION CONTROL
(TORQUE OBSERVER SYSTEM, WITH BACKLASH, WITHOUT
TIRE SLIP, WITH DELAY IN SPEED MEASUREMENT,
WITHOUT TIME COMPENSATION)

**VIBRATION SUPPRESSION CONTROL
(TORQUE OBSERVER SYSTEM, WITH BACKLASH, WITH
TIRE SLIP, WITH DELAY IN SPEED MEASUREMENT, WITH
TIME COMPENSATION)**

BLOCK DIAGRAM SHOWING MODEL OF CONTROLLED OBJECT

BLOCK DIAGRAM FOR MODEL WITH ORDER REDUCED BY APPROXIMATION TO NEGLECT HIGH ORDER COMPONENTS IN MODEL OF CONTROLLED OBJECT

VIBRATION SUPPRESSION CONTROL WITH SPEED DEVIATION TYPE DISTURBANCE TORQUE OBSERVER AND MOTOR ACCELERATION INFORMATION (EMBODIMENT 6)

VIBRATION SUPPRESSION CONTROL SECTION, WITH PREFILTER AND CHANGE RATE LIMITATION FOR TORQUE COMMAND, AND TORQUE OBSERVER

EXAMPLE OF CONFIGURATION OF VEHICLE MODEL SECTION BASED ON SAMPLED DATA SYSTEM; BASE CONTINUOUS DATA MODEL

EXAMPLE OF CONFIGURATION OF VEHICLE MODEL SECTION BASED ON SAMPLED DATA SYSTEM; SAMPLED DATA SYSTEM MODEL (1): MODEL WITH REDUCED ORDER

EXAMPLE OF CONFIGURATION OF VEHICLE MODEL SECTION BASED ON SAMPLED DATA SYSTEM (CONTINUED); SAMPLED DATA SYSTEM MODEL (2): MODEL WITH REDUCED ORDER, EXPRESSED BY SECOND ORDER EQUATION

FIG. 32

CALCULATION OF DIFFERENCE BETWEEN MEASURED SPEED AND ESTIMATED SPEED OF OBSERVER (METHOD FOR TIME MATCHING)

(a) METHOD FOR CALCULATION OF DIFFERENCE BETWEEN MODEL MOTOR SPEED AND MEASURED SPEED (METHOD FOR TIME MATCHING BY MOVING AVERAGE)

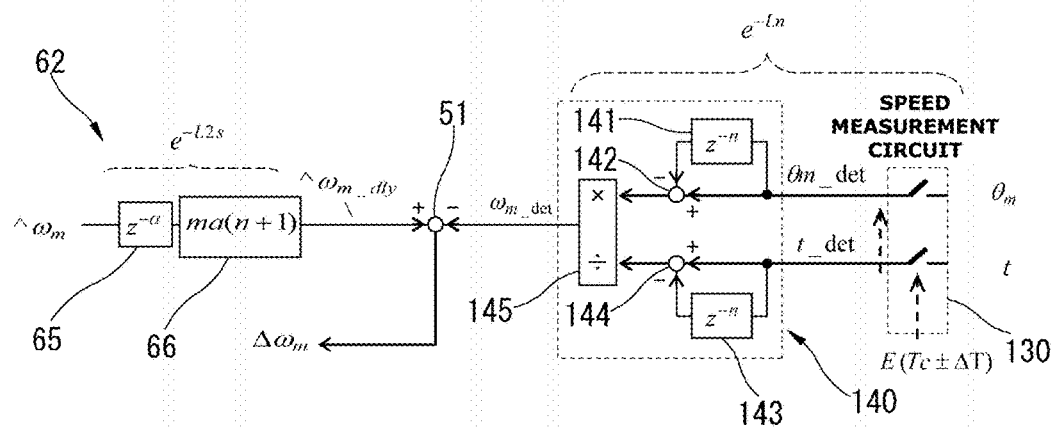

(b) METHOD FOR DIFFERENCE CALCULATION FOR INTEGRAL OF MOTOR-ACCELERATING TORQUE (METHOD FOR TIME MATCHING BY MOVING AVERAGE)

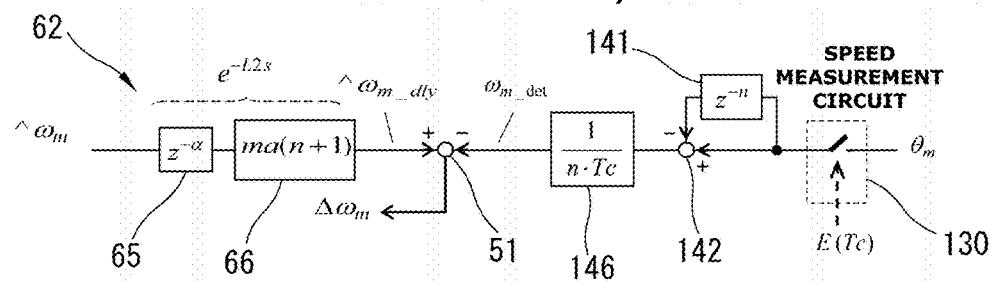

(c) METHOD FOR DIFFERENCE CALCULATION FOR INTEGRAL OF MOTOR-ACCELERATING TORQUE (METHOD FOR TIME MATCHING BY IIR FILTER)

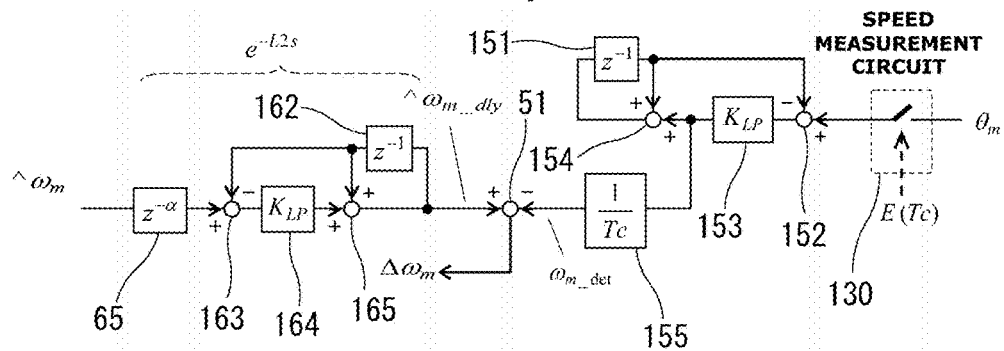

FIG. 33
EXAMPLE OF CONFIGURATION FOR MOVING AVERAGE CALCULATION
(a) EXAMPLE OF MOVING AVERAGE BY (n + 1) STEPS
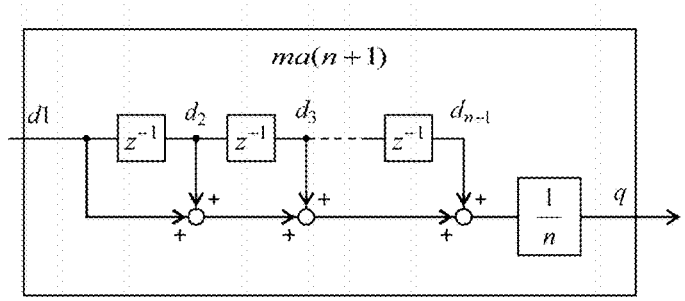
(b) TIME CHART ILLUSTRATING TIME MATCHING BY MOVING AVERAGE
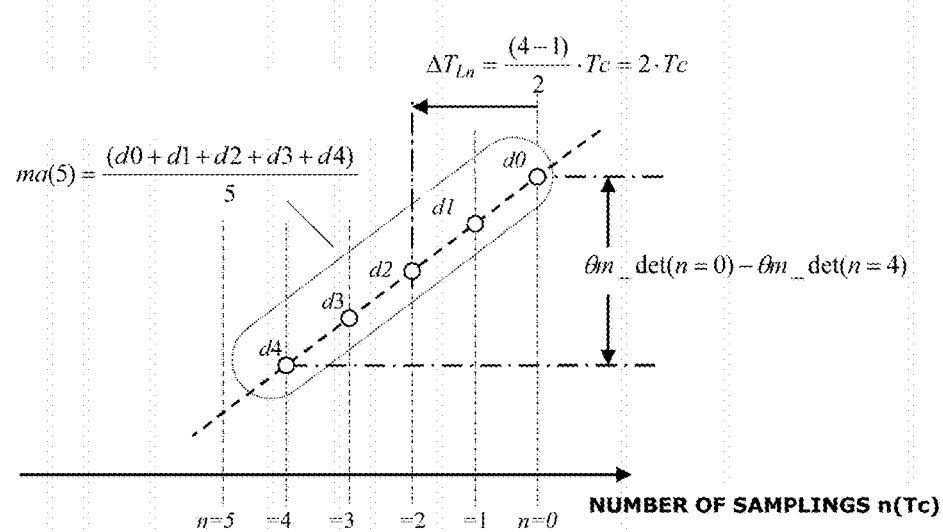

VIBRATION SUPPRESSION CONTROL WITH MOTOR-ACCELERATING TORQUE DEVIATION TYPE DISTURBANCE TORQUE OBSERVER AND MOTOR ACCELERATION INFORMATION ACCORDING TO EMBODIMENT 7 (WHOLE CONFIGURATION)

FIG. 35
VIBRATION SUPPRESSION CONTROL WITH MOTOR-ACCELERATING TORQUE DEVIATION TYPE DISTURBANCE TORQUE OBSERVER AND MOTOR ACCELERATION INFORMATION
(a) CONFIGURATION WHERE LOCATION OF INTEGRATION IS MODIFIED IN FIG. 30 (EMBODIMENT 7)
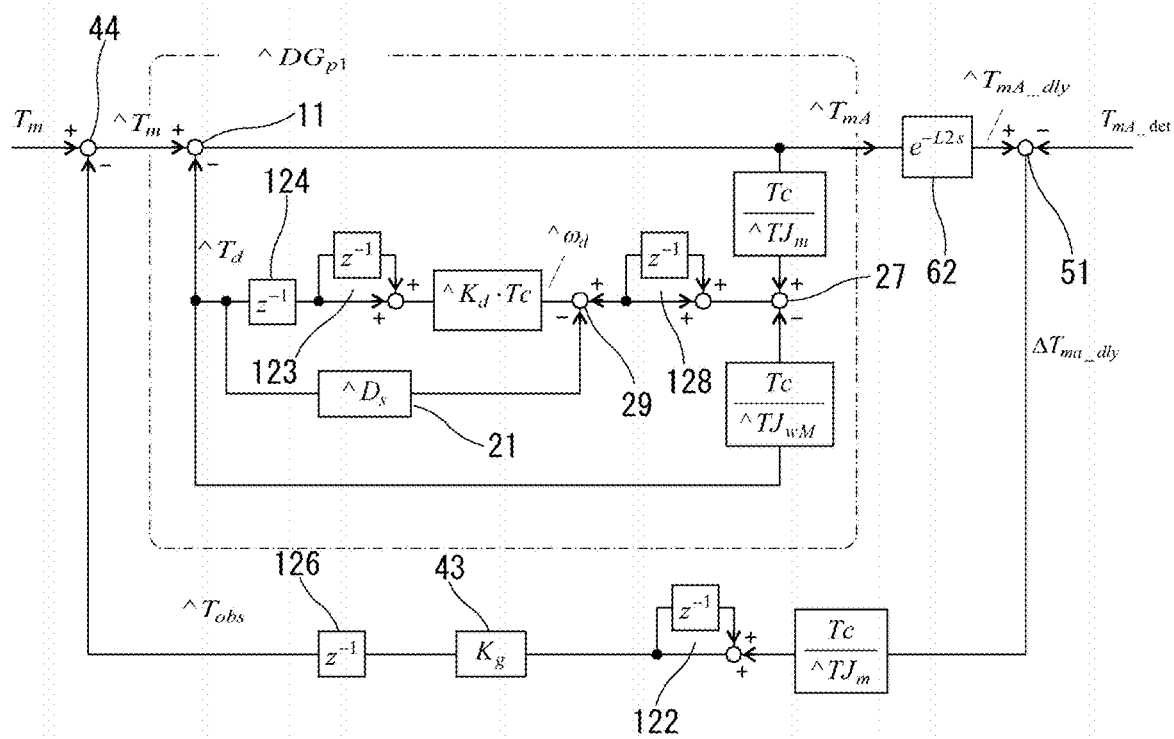
(b) CONFIGURATION WHERE LOCATION OF INTEGRATION IS MODIFIED IN FIG. 31 (EMBODIMENT 7)
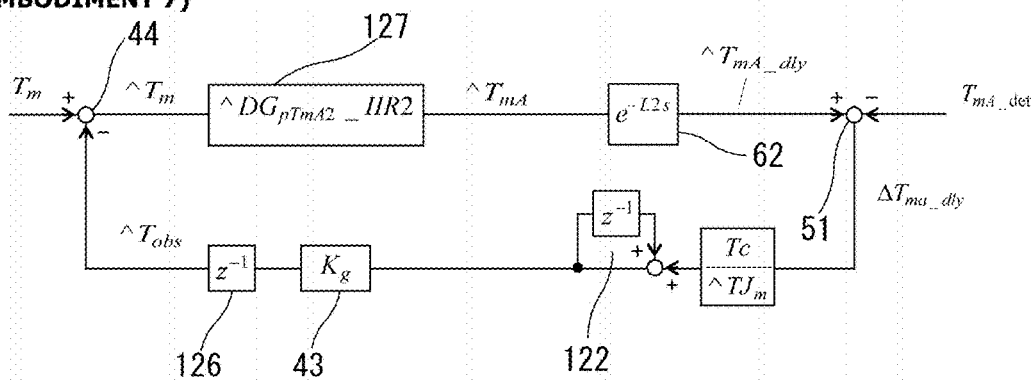

FIG. 36
CALCULATION OF DIFFERENCE BETWEEN MEASURED SPEED AND ESTIMATED SPEED OF OBSERVER (METHOD FOR TIME MATCHING) (EMBODIMENT 7)
(a) CONFIGURATION WHERE LOCATION OF INTEGRATION IS MODIFIED IN FIG. 32 (a) (EMBODIMENT 7)
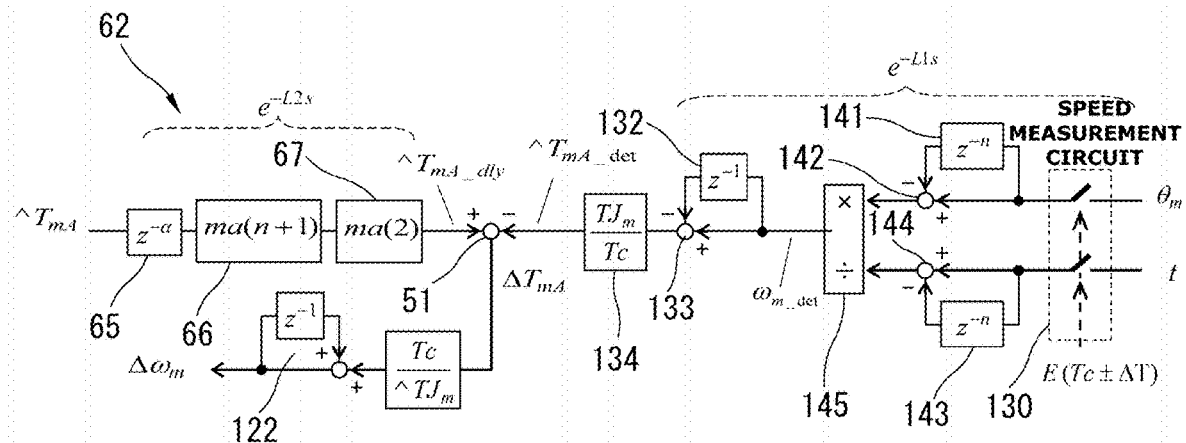
(b) CONFIGURATION WHERE LOCATION OF INTEGRATION IS MODIFIED IN FIG. 32 (c) (EMBODIMENT 7)
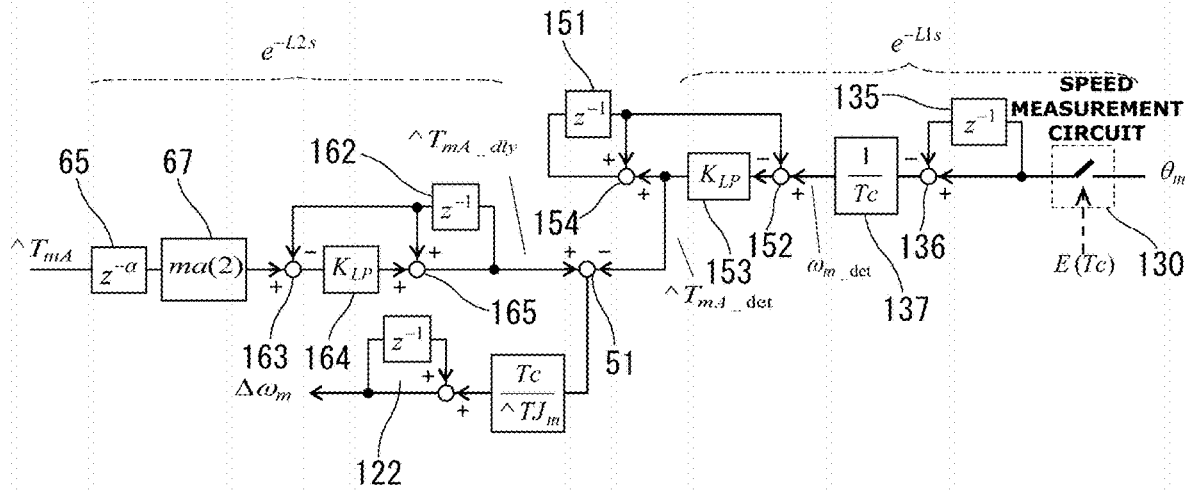

VIBRATION SUPPRESSION CONTROL SECTION WITH PREFILTER AND UPPER AND LOWER LIMITS FOR TORQUE COMMAND AND TORQUE OBSERVER ACCORDING TO EMBODIMENTS 8, 9

EXAMPLE OF CONFIGURATION FOR TORQUE LIMITATION DURING BACKLASH PERIOD
(METHOD FOR BACKLASH PERIOD ESTIMATION)

FIG. 39
WITHOUT VIBRATION SUPPRESSION CONTROL
(A)
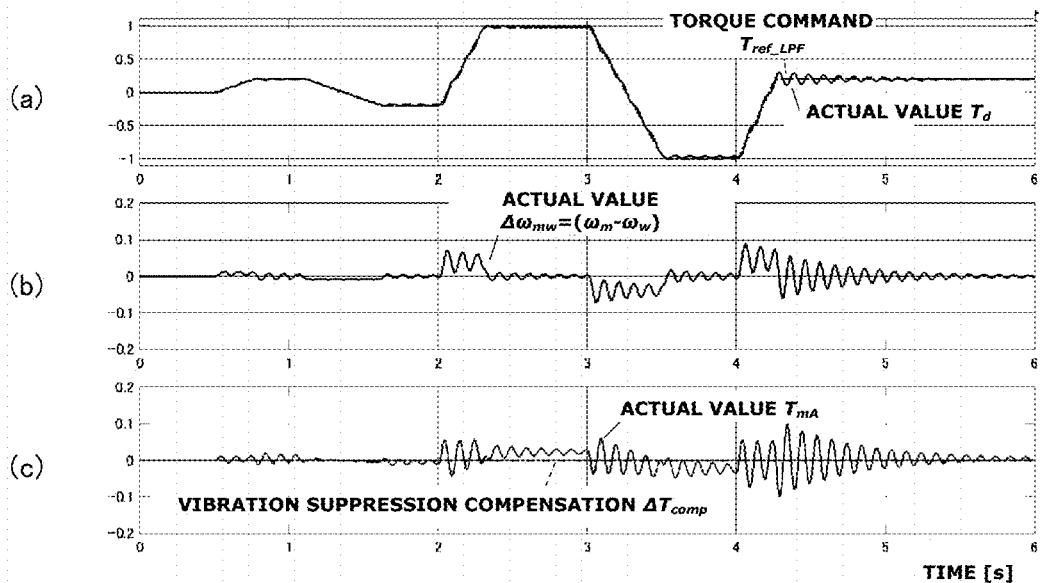
(B) EXPANDED IN TIME (TIME PERIOD FROM 3 [s] – 5 [s])
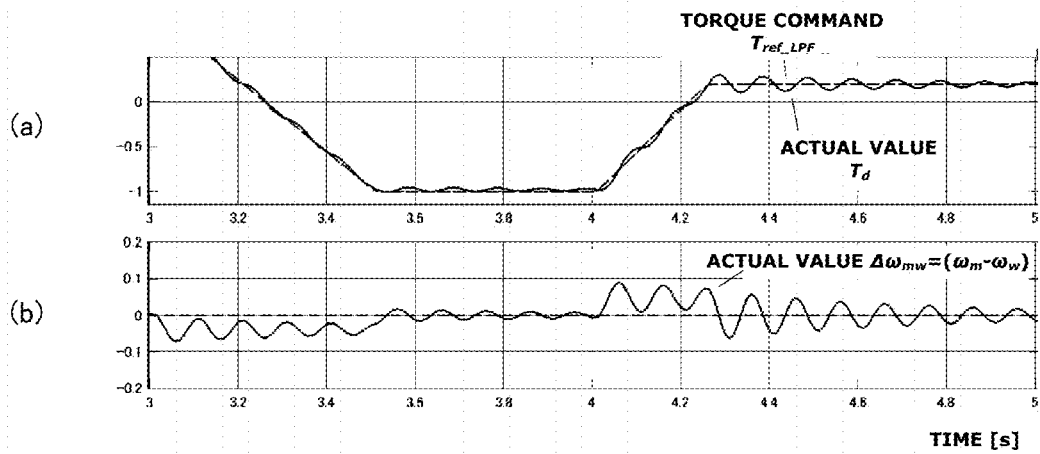

WITH VIBRATION SUPPRESSION CONTROL, WITHOUT BACKLASH IN ACTUAL VEHICLE
(EMBODIMENT 6, CONFIGURATION OF FIG. 32 (c))

WITH VIBRATION SUPPRESSION CONTROL, WITHOUT BACKLASH IN ACTUAL VEHICLE
(EMBODIMENT 7, CONFIGURATION OF FIGS. 34-35)

FIG. 42
(A) WITH VIBRATION SUPPRESSION CONTROL (EMBODIMENT 7), WHERE BACKLASH IS SET IN ACTUAL VEHICLE SECTION
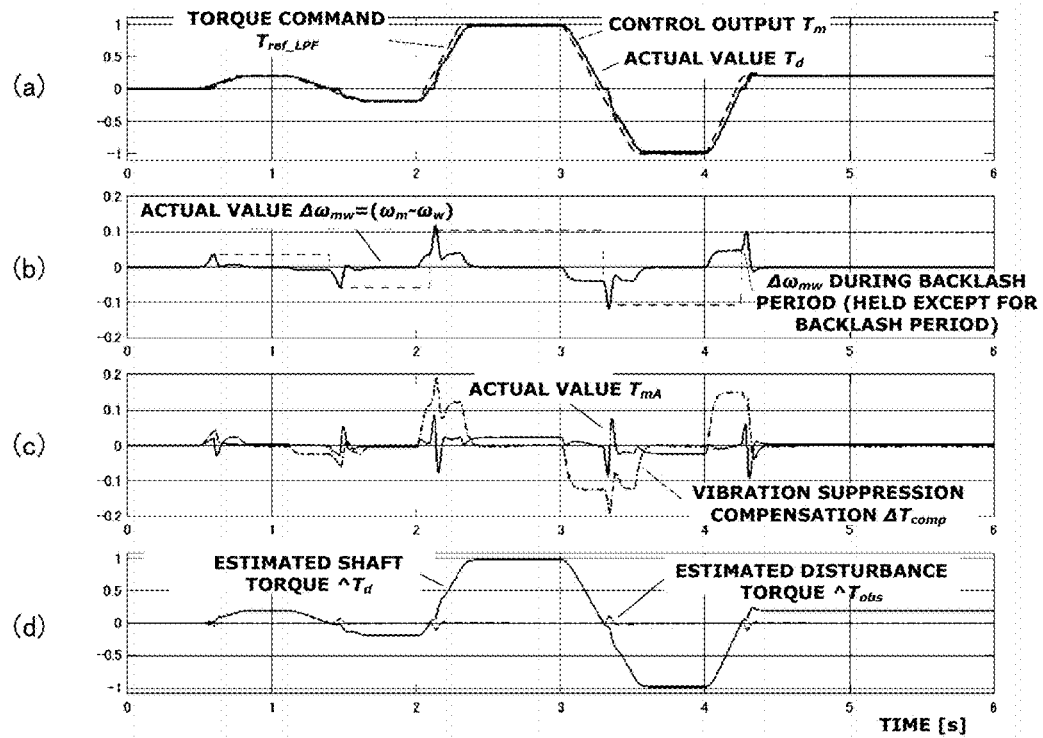
(B) WITH VIBRATION SUPPRESSION CONTROL (EMBODIMENT 7), WITH BACKLASH IN ACTUAL VEHICLE (EXPANDED)
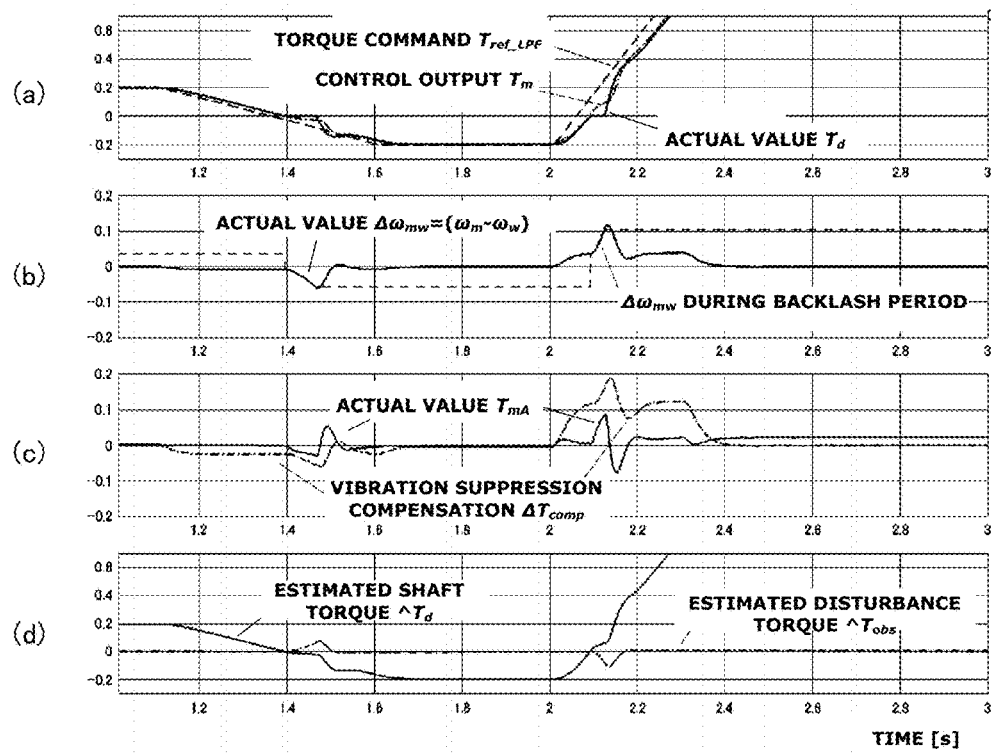

FIG. 43
WITH VIBRATION SUPPRESSION CONTROL AND BACKLASH
TREATMENT, WITH BACKLASH IN ACTUAL VEHICLE (EMBODIMENT 8)
(A) CHARACTERISTICS IN ENTIRETY
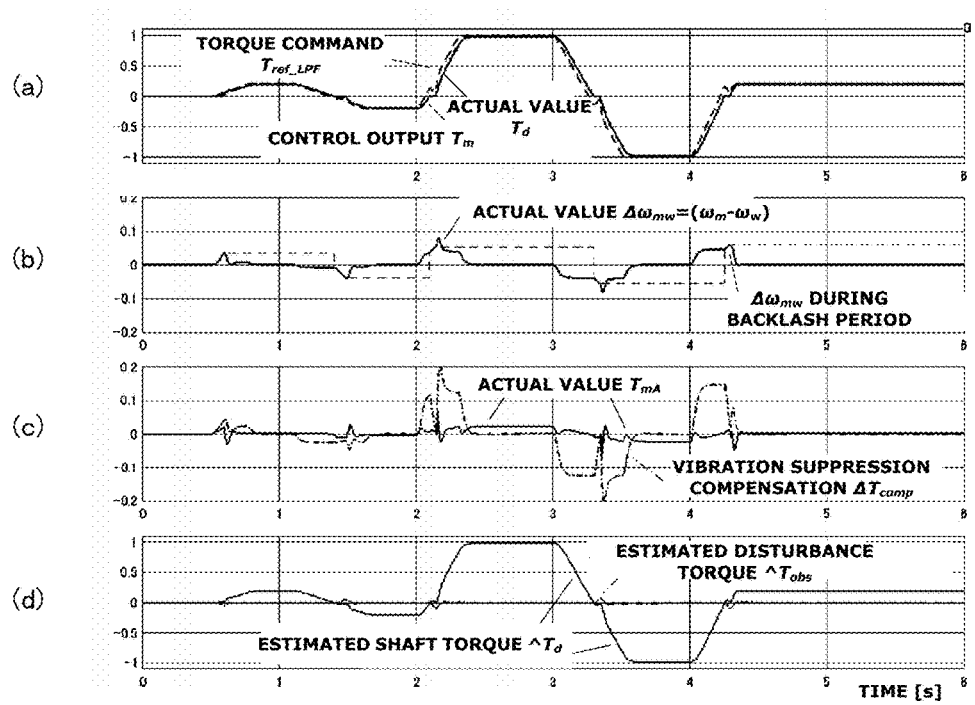
(B) EXPANDED VIEW IN PROXIMITY TO ZERO-CROSSING POINT
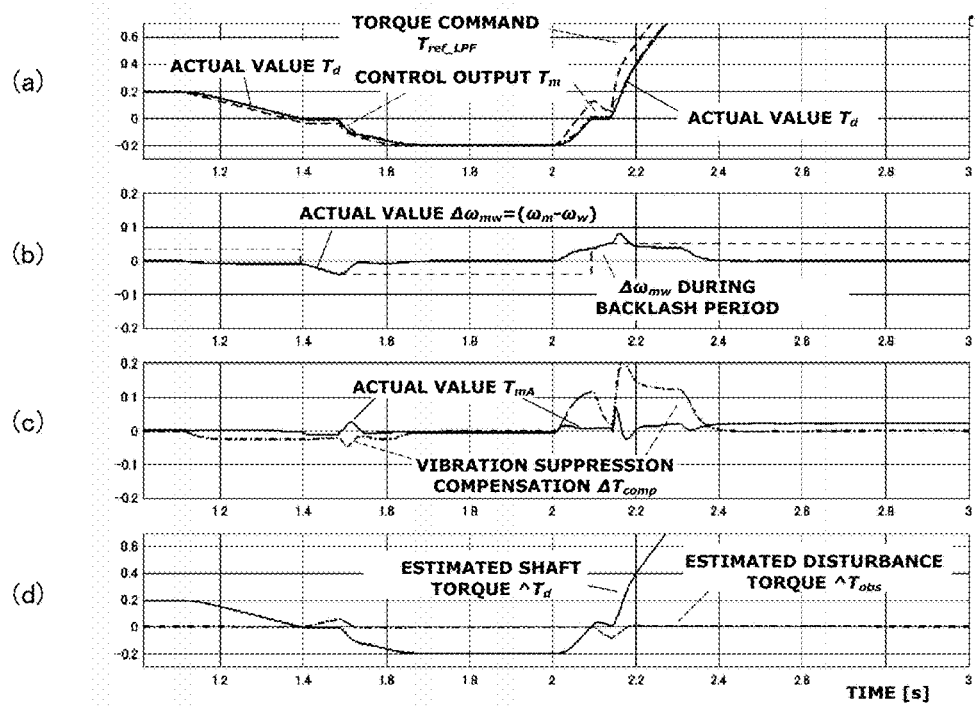

BEHAVIOR OF BACKLASH PREDICTION CONTROL SECTION
(SAME AS IN FIG. 43, EMBODIMENT 8)

FIG. 45
WITH VIBRATION SUPPRESSION CONTROL AND BACKLASH TREATMENT, WITH BACKLASH IN ACTUAL VEHICLE (EMBODIMENT 9)
(A) CHARACTERISTICS IN ENTIRETY
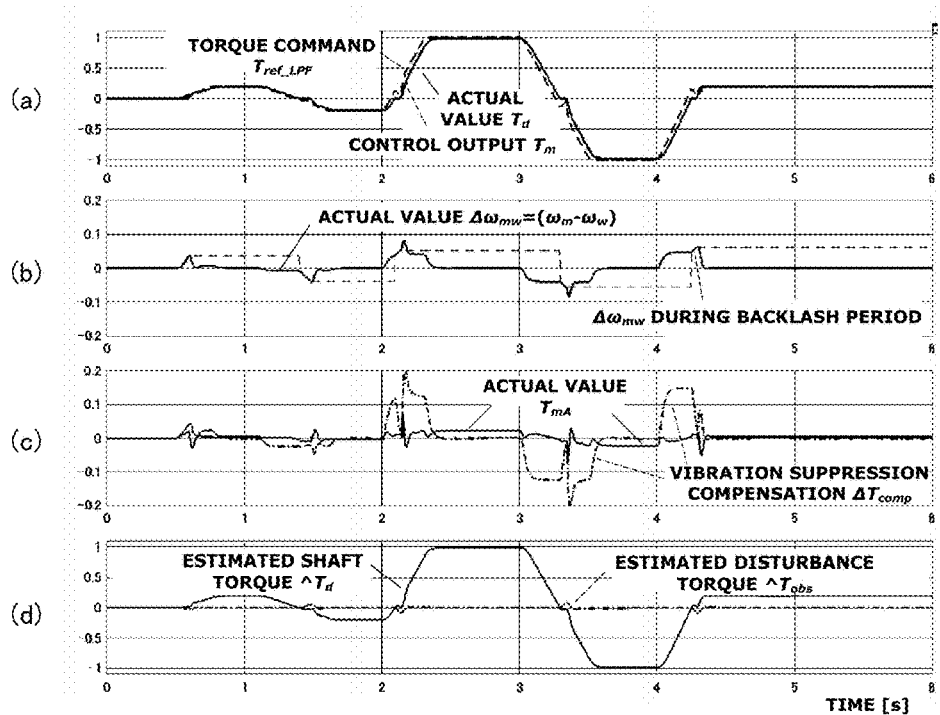
(B) EXPANDED VIEW IN PROXIMITY TO ZERO-CROS
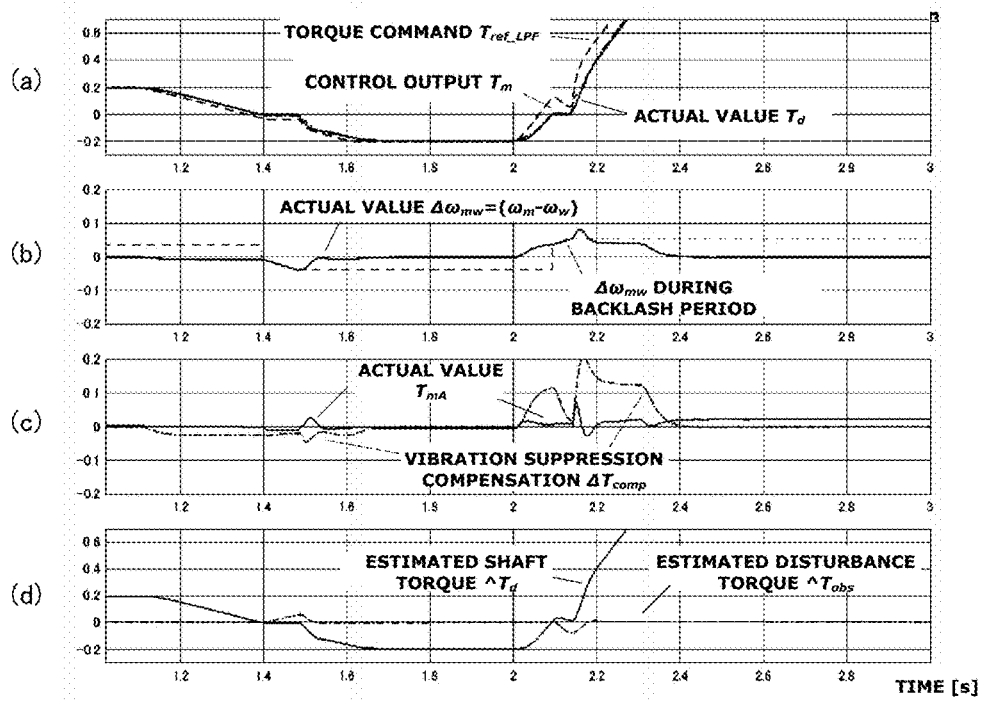

BEHAVIOR OF BACKLASH PREDICTION CONTROL SECTION
(SAME AS IN FIG. 43, EMBODIMENT 9)

VEHICLE SYSTEM VIBRATION SUPPRESSION CONTROL DEVICE AND VIBRATION SUPPRESSION CONTROL METHOD

TECHNICAL FIELD

The present invention relates to a vibration suppression control device for a vehicle system, wherein the vehicle system includes a drive device for torque-controlling an electric motor, and an elastic driveline including components such as gears and shafts.

In an electric vehicle or the like, driveline mechanisms such as gears and shafts behave as an elastic shaft having a low stiffness, so that torsional resonance occurs among the rotational inertia of a motor, the rotational inertia of tires, wherein the motor and tires are connected to the elastic shaft, and the inertia of a vehicle body. The present invention relates to a control method for suppressing this vibration.

BACKGROUND ART

A motor drive device controls a torque generated by a motor, by regulating a voltage and an electric current. In case of an AC motor, an electric current phase of the AC motor is controlled based on phase information from a resolver or encoder directly connected to a motor shaft. Namely, the phase and speed of the motor can be measured. There is another sensor for speed measurement at a tire axle, but this sensor is low in accuracy and resolution and large in measurement delay. Accordingly, speed information obtained from this speed sensor cannot be used for vibration suppression control for resonance and others. Therefore, a vibration suppression control is required which uses only position information and speed information on the motor side.

A patent document 1 and a patent document 2 disclose conventional examples in the field of the present invention. Patent document 1 discloses a vibration suppression control system using a vehicle model. In the following, description is based on a vehicle model as described in patent document 1. Patent document 2 discloses an improvement with respect to patent document 1, in which countermeasures are taken against a delay time (dead time) in speed measurement.

Patent document 1 defines in FIG. 4 a model of a system to which a vibration suppression control is applied, wherein the model is expressed by a mathematical expression in paragraph of patent document 1. Patent document 1 discloses in FIG. 2 a basic configuration of vibration suppression control.

In FIG. 2 of patent document 1, the following blocks are employed as control elements.
(a) $G_p(S)$ as a model of a transfer characteristic from a torque inputted to a vehicle to a motor rotational speed,
(b) $H(s)$ as a transfer characteristic having a band-pass filter characteristic, and
(c) $G_m(s)$ as a transfer characteristic from a torque desired to be inputted to the vehicle to the motor rotational speed.

By combination thereof, a band cutoff filter is configured to remove a resonant frequency component from a torque command, and a vibration suppression control is configured to perform a feedback control based on motor speed measurement.

Patent document 2 discloses a countermeasure against a dead time resulting from delays in electric current control response, speed measurement, and others. The countermeasure is implemented by inserting a delay to a torque command inputted to a model, wherein the delay is equal to the dead time in speed measurement, and thereby ensuring time matching between an estimated speed of the model and a measured speed.

Among the disclosures of patent documents 1 and 2, the following items are functions to be compared with the present invention.
(1) A vibration suppression control system that adds a compensation torque to a torque command for suppressing vibration, wherein the compensation torque is determined based on the torque command and measured speed,
(2) Suppression of errors due to discrete time, wherein the errors are caused by implementation of the control system by a sampled data system, and
(3) Suppression of error components due to a delay time (dead time) in electric current control, speed measurement, etc.

PRIOR ART DOCUMENT(S)

Patent Document(s)

Patent Document 1: Japanese Patent Application Publication No. 2003-009566
Patent Document 2: Japanese Patent Application Publication No. 2005-269835
Patent Document 3: Japanese Patent No. 5861554

SUMMARY OF INVENTION

First, the following describes problems to be solved by embodiments of the present invention in separate sections.

(1) Order Reduction of Model

In patent document 1, the vehicle system model is represented by $G_p(S)$. This model includes a plurality of inertial bodies such as a motor, tires, and a vehicle body. Accordingly, the model is expressed as a transfer function having a high order mathematical expression. However, with the high order mathematical expression, it is difficult to grasp characteristics of the model, and it is complicated to design a vibration suppression control. Therefore, the following proposes a design method for vibration suppression control, in which the model is approximated to a transfer function expressed by a product of an integral and a second order mathematical expression, and the transfer function is employed.

(2) Problem of Mismatching Between Model and Tire Slip and Others

Although patent documents 1 and 2 are silent, errors in the model used in the control system also cause a problem. Usage conditions of the vehicle change widely. For example, a slippery road surface has a smaller tire coefficient. In general, the model in the control system is fixed, so that a parameter error occurs between the model and a plant. This adversely affects performance of the control system. Therefore, it is desirable to ensure robustness so that the performance is less adversely affected even when the road surface varies.

(3) Method of Compensating for Dead Time in Control and Measurement

As discussed in the background art section, (2) and (3), there are two types of components of the dead time to be addressed by the present invention. Patent document 1 addresses an error due to discrete time caused by transformation to a sampled data system for implementation in a CPU, whereas patent document 2 addresses a dead time in control such as a delay in speed measurement.

As a countermeasure against the issue of discrete time, configuration of a control block is modified at the stage of a continuous data system. As a countermeasure against the issue of a delay time in speed measurement, an equivalent delay time is inserted to an input torque command to the model. Also in the present invention, countermeasures are considered against these dead times.

Furthermore, in the system of patent document 2, time matching is carried out when a difference is taken between the speed measurement side and the model side. However, the difference still contains a delay. Therefore, the following studies predictive compensation for a dead time as well.

(4) Effect of Backlash of Reduction Gears, Etc.

There is a backlash component in gears of a driveline mechanism. This nonlinear element is likely to cause unstable phenomena such as hunting. Patent document 1 employs a vibration suppression system using an inverse function of the model, $1/G_p(s)$. The characteristic of $1/G_p(s)$ has a low gain in a resonant frequency band, but conversely, a high gain near an anti-resonant frequency. Accordingly, vibration components due to nonlinearity and model errors occur at low frequencies near the anti-resonant frequency. It is also required to suppress this unstable phenomenon.

It is an object of the present invention to provide a vibration suppression control device for a vehicle system, which is capable of realizing functions equivalent to those of the background art section, (1) to (3), further reducing the influence of disturbances, improving robustness against model errors, etc., and by using motor speed information, suppressing vibrations due to resonance and thereby improving ride comfort of the vehicle.

For solving the problems described above, according to a first aspect of the present disclosure, a vibration suppression control device for a vehicle system in which a vehicle is driven via an elastic shaft by a motor drive device having a torque control function, the vehicle system vibration suppression control device includes: a section containing an approximate model to which an output torque command $(T_m)$ is inputted; and a feedback control section configured to: employ the approximate model; calculate a motor-accelerating torque component $(T_{mA}*)$ by differentiating a measured speed component $(\omega_m)$ of a motor rotational speed; produce a compensation torque component $(T_{Fcomp})$ by causing the motor-accelerating torque component $(T_{mA}*)$ to pass through a vibration suppression control filter $(F_{comp}(S))$; and calculate the output torque command $(T_m)$ by subtracting the compensation torque component $(T_{Fcomp})$ from an input torque command $(T_{ref})$; wherein the vibration suppression control filter $(F_{comp}(s))$ is expressed by a mathematical expression (13), $$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \quad (13)$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$\zeta_A$: an adjustable parameter,
$D_s = TJ_M/(TJ_w + TJ_M) \cdot K_r$,
$TJ_m$: a time constant equivalent to motor inertia, $TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_r$: a coefficient relating to friction between tire and road surface, and
$TJ_{wM} = TJ_w + TJ_M$.

According to a second aspect of the present disclosure, the vehicle system vibration suppression control device according to the first aspect includes a disturbance torque observer, wherein: the approximate model includes: a subtractor configured to subtract an estimated disturbance torque $(^\wedge T_{obs})$, which is calculated by the disturbance torque observer, and a shaft torsional torque $(^\wedge T_d)$ from the output torque command $(T_m)$ to output an estimated motor-accelerating torque component $(^\wedge T_{mA})$; a block configured to calculate a motor side acceleration by dividing the estimated motor-accelerating torque component $(^\wedge T_{mA})$ by a time constant equivalent to motor rotational inertia; a block configured to calculate a vehicle body side acceleration by dividing the shaft torsional torque $(^\wedge T_d)$ by a combined rotational inertia of a vehicle body and tires; a block configured to calculate a relative speed between the motor and the vehicle body by time-integrating a difference between the motor side acceleration and the vehicle body side acceleration; a block configured to calculate a tire slip speed by multiplying the shaft torsional torque $(^\wedge T_d)$ by a slip coefficient $(^\wedge D_s)$; and a block configured to calculate the shaft torsional torque $(^\wedge T_d)$ by transforming a difference between the tire slip speed and the relative speed between the motor and the vehicle body into a torsional phase of the elastic shaft by time integration, and multiplying the torsional phase of the elastic shaft by a torsional stiffness coefficient $(^\wedge K_d)$ of driveline; wherein the disturbance torque observer is configured to: integrate with the time constant equivalent to motor rotational inertia a deviation between the estimated motor-accelerating torque component $(^\wedge T_{mA})$ and the motor-accelerating torque component $(T_{mA}*)$ calculated by differentiating the measured speed component $(\omega_m)$ of the motor rotational speed to produce an integrated quantity; calculate the estimated disturbance torque $(^\wedge T_{obs})$ by multiplying the integrated quantity by an observer gain $(K_g)$; and input the estimated disturbance torque $(^\wedge T_{obs})$ to the subtractor.

According to a third aspect of the present disclosure, the vehicle system vibration suppression control device according to the second aspect is configured such that the motor-accelerating torque component $(T_{mA}*)$ is replaced with the estimated motor-accelerating torque component $(^\wedge T_{mA})$ for input to the vibration suppression control filter $(F_{comp}(S))$.

According to a fourth aspect of the present disclosure, the vehicle system vibration suppression control device according to the third aspect includes a delay compensator configured to delay the estimated motor-accelerating torque component $(^\wedge T_{mA})$ for time matching between the estimated motor-accelerating torque component $(^\wedge T_{mA})$ and the measured speed component of the motor rotational speed.

According to a fifth aspect of the present disclosure, the vehicle system vibration suppression control device according to the fourth aspect includes a low-pass filter configured to delay the deviation between the motor-accelerating torque component $(T_{mA}*)$ and the estimated motor-accelerating torque component $(^\wedge T_{mA})$.

According to a sixth aspect of the present disclosure, the vehicle system vibration suppression control device according to the third or fourth or fifth aspect includes: a first multiplier configured to multiply the motor-accelerating torque component $(T_{mA}*)$ by a variable weighting factor; a second multiplier configured to multiply the estimated motor-accelerating torque component ($\hat{T}_{mA}$) by a variable weighting factor; and an adder configured to sum outputs of the first and second multipliers; wherein an output of the adder is inputted to the vibration suppression control filter ($F_{comp}(S)$).

According to a seventh aspect of the present disclosure, a vehicle system vibration suppression control device for a vehicle system in which a vehicle is driven via an elastic shaft by a motor drive device having a torque control function, the vehicle system vibration suppression control device includes: a disturbance torque observer configured to: calculate a measured motor rotational speed ($\omega_{m\_det}$) based on a measured value of a motor rotational phase and a measured value of time; determine an estimated motor rotational speed ($\hat{\omega}_m$) by a vehicle model to which an output torque command ($T_m$) is inputted; determine a first quantity ($\hat{\omega}_{m\_dly}$) by delaying the estimated motor rotational speed ($\hat{\omega}_m$) by a time equal to an overall delay time including a speed measurement side delay time; and determine an estimated disturbance torque ($\hat{T}_{obs}$) based on a deviation between the measured motor rotational speed ($\omega_{m\_det}$) and the first quantity ($\hat{\omega}_{m\_dly}$); and a feedback control section configured to: produce a torque command ($T_{ref\_LPF}$) by causing an input torque command ($T_{ref}$) to pass through a prefilter; produce a compensation torque component ($\Delta T_{comp}$) by causing an estimated motor-accelerating torque component ($\hat{T}_{mA}$) to pass through a vibration suppression control filter, wherein the estimated motor-accelerating torque component ($\hat{T}_{mA}$) is calculated by the vehicle model; and calculate the output torque command ($T_m$) by subtracting the compensation torque component ($\Delta T_{comp}$) from the torque command ($T_{ref\_LPF}$); wherein the disturbance torque observer is a first block based on a sampled-data system model and configured to: receive input of a second quantity ($\hat{T}_m$) calculated by subtracting the estimated disturbance torque ($\hat{T}_{obs}$) from the output torque command ($T_m$); and calculate the estimated motor-accelerating torque component ($\hat{T}_{mA}$) based on the second quantity ($\hat{T}_m$); wherein the disturbance torque observer includes: a second block or a $\hat{T}_m$-$\hat{T}_{mA}$ transformation block; wherein the second block includes a subtractor configured to subtract a shaft torsional torque ($\hat{T}_d$) from the second quantity ($\hat{T}_m$) to output the estimated motor-accelerating torque component ($\hat{T}_{mA}$); wherein the second block is configured to: calculate the estimated motor rotational speed ($\hat{\omega}_m$) by approximately integrating the estimated motor-accelerating torque component ($\hat{T}_{mA}$); calculate a vehicle speed ($\hat{\omega}_{Wm}$) by approximately integrating the shaft torsional torque ($\hat{T}_d$); calculate a tire slip speed by multiplying the shaft torsional torque ($\hat{T}_d$) by a slip coefficient ($\hat{D}_s$); calculate a shaft torsional speed ($\hat{\omega}_d$) by subtracting the vehicle speed ($\hat{\omega}_{Wm}$) and the tire slip speed from the estimated motor rotational speed ($\hat{\omega}_{Wm}$); produce a third quantity by approximately integrating a product of the shaft torsional speed ($\hat{\omega}_d$) and an integral coefficient ($\hat{K}_d \cdot T_c$); produce the shaft torsional torque ($\hat{T}_d$) by causing the third quantity to pass through a delayer; wherein the $\hat{T}_m$-$\hat{T}_{mA}$ transformation block is composed of a second order filter having a coefficient designed based on a second order transfer function expressed by a mathematical expression (12), $$G_{pTmA2A2}(s) = \frac{s^2 + (K_d \cdot D_c) \cdot s + K_d \cdot \frac{1}{TJ_{wM}}}{s^2 + (K_d \cdot D_s \cdot s) + K_d \cdot \left(\frac{1}{TJ_m} + \frac{1}{TJ_{wM}}\right)} = \frac{s^2 + 2 \cdot \zeta_a \cdot \omega_a \cdot s + \omega_a^2}{s^2 + 2 \cdot \zeta_r \cdot \omega_r \cdot s + \omega_r^2} \quad (12)$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_t$: a coefficient related to friction between tire and road surface, and
$TJ_{wM} = TJ_w + TJ_M$;
wherein the disturbance torque observer further includes: a gain multiplier configured to multiply the deviation between the first quantity ($\hat{\omega}_{m\_dly}$) and the measured motor rotational speed ($\omega_{m\_det}$) by an observer gain ($K_g$); and a delayer configured to delay an output of the gain multiplier to produce the estimated disturbance torque ($\hat{T}_{obs}$); wherein the deviation between the measured motor rotational speed ($\omega_{m\_det}$) and the estimated motor rotational speed ($\hat{\omega}_m$) is determined by first, second, or third sampled data system model calculation; wherein the first sampled data system model calculation is configured to: calculate the measured motor rotational speed ($\omega_{m\_det}$) by dividing a phase difference from a past sampled value of the motor rotational phase by a time difference; produce the first quantity ($\hat{\omega}_{m\_dly}$) by delaying the estimated motor rotational speed ($\hat{\omega}_m$) by a delay block; and calculate the deviation between the measured motor rotational speed ($\omega_{m\_det}$) and the first quantity ($\hat{\omega}_{m\_dly}$); wherein the second sampled data system model calculation is configured to: calculate the measured motor rotational speed ($\omega_{m\_det}$) by dividing a phase difference from a past sampled value of the motor rotational phase by a constant sampling period; produce the first quantity ($\hat{\omega}_{m\_dly}$) by delaying the estimated motor rotational speed ($\hat{\omega}_m$) by a delay block; and calculate the deviation between the measured motor rotational speed ($\omega_{m\_det}$) and the first quantity ($\hat{\omega}_{m\_dly}$); wherein the third sampled data system model calculation is configured to: calculate the measured motor rotational speed ($\omega_{m\_det}$) by dividing an input signal from an integrating part of a sampled data system first-order delay filter by a sampling period (Tc), wherein the sampled data system first-order delay filter is configured to process a measured value of the motor rotational phase; produce the first quantity ($\hat{\omega}_{m\_dly}$) by delaying the estimated motor rotational speed ($\hat{\omega}_m$) by a delay block having a first-order delay filter identical in coefficient to the sampled data system first-order delay filter; and calculate the deviation between the measured motor rotational speed ($\omega_{m\_det}$) and the first quantity ($\hat{\varphi}\omega_{m\_dly}$); and wherein the vibration suppression control filter ($F_{comp}(s)$) is expressed by a mathematical expression (13), $$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \quad (13)$$

where s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$\zeta_A$: an adjustable parameter,
$D_s = TJ_M/(TJ_w + TJ_M) \cdot K_r$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_r$: a coefficient relating to friction between tire and road surface, and
$TJ_{wM} = TJ_w + TJ_M$.

According to an eighth aspect of the present disclosure, a vehicle system vibration suppression control device for a vehicle system in which a vehicle is driven via an elastic shaft by a motor drive device having a torque control function, the vehicle system vibration suppression control device includes: a disturbance torque observer configured to: calculate a measured motor rotational speed ($\omega_{m\_det}$) based on a measured value of a motor rotational phase and a measured value of time; and determine an estimated disturbance torque ($\hat{T}_{obs}$) based on a time differential component ($T_{mA\_det}$) of the measured motor rotational speed ($\omega_{m\_det}$) and an output torque command ($T_m$); and a feedback control section configured to: produce a torque command ($T_{ref\_LPF}$) by causing an input torque command ($T_{ref}$) to pass through a prefilter; produce a compensation torque component ($\Delta T_{comp}$) by causing an estimated motor-accelerating torque component ($\hat{T}_{mA}$) to pass through a vibration suppression control filter, wherein the estimated motor-accelerating torque component ($\hat{T}_{mA}$) is calculated by a model of the vehicle; and calculate the output torque command ($T_m$) by subtracting the compensation torque component ($\Delta T_{comp}$) from the torque command ($T_{ref\_LPF}$); wherein the disturbance torque observer is a first block based on a sampled-data system model and configured to: receive input of a second quantity ($\hat{T}_m$) calculated by subtracting the estimated disturbance torque ($\hat{T}_{obs}$) from the output torque command ($T_m$); and calculate the estimated motor-accelerating torque component ($\hat{T}_{mA}$) based on the second quantity ($\hat{T}_m$); wherein the disturbance torque observer includes: a second block or a $\hat{T}_m$-$\hat{T}_{mA}$ transformation block; wherein the second block includes a subtractor configured to subtract a shaft torsional torque ($\hat{T}_d$) from the second quantity ($\hat{T}_m$) to output the estimated motor-accelerating torque component ($\hat{T}_{mA}$); wherein the second block is configured to: calculate a first quantity by subtracting a product of the estimated motor-accelerating torque component ($\hat{T}_{mA}$) and an integral coefficient ($Tc/\hat{TJ}_m$) from a product of the shaft torsional torque ($\hat{T}_d$) and an integral coefficient ($Tc/\hat{TL}_{wM}$); calculate a third quantity by first approximate integration of the first quantity; calculate a tire slip speed by multiplying the shaft torsional torque ($\hat{T}_d$) by a slip coefficient ($\hat{D}_s$); calculate a shaft torsional speed ($\hat{\omega}_d$) by subtracting the tire slip speed from the third quantity; produce a fourth quantity by second approximate integration of a product of the shaft torsional speed ($\hat{\omega}_d$) and an integral coefficient ($\hat{K}_d \cdot T_c$); produce the shaft torsional torque ($\hat{T}_d$) by causing the fourth quantity to pass through a delayer; wherein the $\hat{T}_m$-$\hat{T}_{mA}$ transformation block is composed of a second order filter having a coefficient designed based on a second order transfer function expressed by a mathematical expression (12), $$G_{pTmA2}(s) = \frac{s^2 + (K_d \cdot D_s) \cdot s + K_d \cdot \dfrac{1}{TJ_{wM}}}{s^2 + (K_d \cdot D_s \cdot s) + K_d \cdot \left(\dfrac{1}{TJ_m} + \dfrac{1}{TJ_{wW}}\right)} = \frac{s^2 + 2 \cdot \zeta_a \omega_a \cdot s + \omega_a^2}{s^2 + 2 \cdot \zeta_r \cdot \omega_r \cdot s + \omega_r^2} \quad (12)$$

wherein the disturbance torque observer further includes: an integrator configured to integrate a deviation component ($\Delta T_{mA\_dly}$) between a fifth quantity ($\hat{T}_{mA\_dly}$) and the time differential component ($T_{mA\_det}$)/wherein the fifth quantity ($\hat{T}_{mA\_dly}$) is produced by delaying the estimated motor-accelerating torque component ($\hat{T}_{mA}$); a gain multiplier configured to multiply an output of the integrator by an observer gain ($K_g$); and a delayer configured to delay an output of the gain multiplier to produce the estimated disturbance torque ($\hat{T}_{obs}$); wherein the deviation ($\Delta T_{mA\_det}$) is determined by first, second, or third sampled data system model calculation; wherein the first sampled data system model calculation is configured to: calculate the measured motor rotational speed ($\omega_{m\_det}$) by dividing a phase difference from a past sampled value of the motor rotational phase by a time difference; produce a sixth quantity by delaying the measured motor rotational speed ($\omega_{m\_det}$); calculate the time differential component ($\hat{T}_{mA\_det}$) by differentiating the sixth quantity with a coefficient ($TJ_m/Tc$); produce the fifth quantity ($\hat{T}_{mA\_dly}$) by delaying the estimated motor-accelerating torque component ($\hat{T}_{mA}$) by a delay block; and calculate the deviation between the time differential component ($\hat{T}_{mA\_det}$) and the fifth quantity ($\hat{T}_{mA\_dly}$); wherein the second sampled data system model calculation is configured to: calculate the measured motor rotational speed ($\omega_{m\_det}$) by dividing a phase difference from a past sampled value of the motor rotational phase by a constant sampling period; produce a sixth quantity by delaying the measured motor rotational speed ($\omega_{m\_det}$); calculate the time differential component ($\hat{T}_{mA\_det}$) by differentiating the sixth quantity with a coefficient ($TJ_m/Tc$); produce the fifth quantity ($\hat{T}_{mA\_dly}$) by delaying the estimated motor-accelerating torque component ($\hat{T}_{mA}$) by a delay block; and calculate the deviation between the time differential component ($\hat{T}_{mA\_det}$) and the fifth quantity ($\hat{T}_{mA\_dly}$); wherein the third sampled data system model calculation is configured to: determine the time differential component ($\hat{T}_{mA\_det}$) as an input signal from an integrating part of a sampled data system first-order delay filter, wherein the sampled data system first-order delay filter is configured to process the measured motor rotational speed ($\omega_{m\_det}$) produced by differentiating a measured value of the motor rotational phase; and produce the fifth quantity ($\hat{T}_{mA\_dly}$) by delaying the estimated motor-accelerating torque component ($\hat{T}_{mA}$) by a delay block having a first-order delay filter identical in coefficient to the sampled data system first-order delay filter; and wherein the vibration suppression control filter ($F_{comp}(s)$) is expressed by a mathematical expression (13), $$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \quad (13)$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$\zeta_A$: an adjustable parameter,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_m$: a time constant equivalent to vehicle mass,
$K_d$: a torsional stiffness coefficient of driveline,
$K_t$: a coefficient relating to friction between tire and road surface, and
$TJ_{wM} = TJ_w + TJ_M$.

According to a ninth aspect of the present disclosure, the vehicle system vibration suppression control device according to the seventh or eighth aspect includes: a backlash period detection section configured to detect a backlash period; a compensation torque subtractor configured to subtract the compensation torque component ($\Delta T_{comp}$) from the torque command ($T_{ref\_LPF}$) to output the output torque command ($T_m$), wherein the torque command ($T_{ref\_LPF}$) is produced by causing the input torque command ($T_{ref}$) to pass through the prefilter to suppress a high frequency band; first and second torque limiters configured to limit the output torque command ($T_m$) outputted from the compensation torque subtractor, wherein the first torque limiter has a first torque limit value, and wherein the second torque limiter has a second torque limit value smaller than the first torque limit value; a switch configured to select one of an output of the first torque limiter and an output of the second torque limiter, and when the backlash period detection section detects the backlash period, select the output of the second torque limiter; and an adder configured to calculate a first sum of the output of one of the torque limiters selected by the switch and the compensation torque component ($\Delta T_{comp}$), and feed the first sum back to the prefilter; wherein the backlash period detection section includes: a torque-to-phase transformation section configured to receive input of the shaft torsional torque ($^\wedge T_d$) estimated, which is a difference between the second quantity ($^\wedge T_m$) and the estimated motor-accelerating torque component ($^\wedge T_{mA}$), and transform the estimated shaft torsional torque ($^\wedge T_d$) into an estimated shaft torsional phase ($^\wedge \theta_d$); a backlash start timing detection section configured to detect a zero cross point of the estimated shaft torsional phase ($^\wedge \theta_d$) as a start timing of the backlash period; a torsional speed estimation section configured to estimate the shaft torsional speed by time-differentiating the estimated shaft torsional phase ($^\wedge \theta_d$); a speed change estimation section configured to estimate a speed change component during the backlash period by time-integrating the output torque command ($T_m$); a torsional displacement estimation section configured to calculate an estimated phase change amount ($^\wedge \Delta \theta_{BL}$) corresponding to backlash by: calculating a second sum of the shaft torsional speed, which is estimated by the torsional speed estimation section, an initial torsional speed, which is stored at the start timing of the backlash period detected by the backlash start timing detection section, and the speed change component during the backlash period, which is estimated by the speed change estimation section; and time-integrating the second sum; and a backlash end detection section configured to detect an end of the backlash period by comparing the phase change amount ($^\wedge \Delta \theta_{BL}$), which is estimated by the torsional displacement estimation section, with an absolute value of backlash phase width ($^\wedge \theta_d$) and a margin width ($\Delta \theta$) as set values; and wherein the backlash period is detected based on the backlash start timing detected by the backlash start timing detection section and the backlash end signal detected by the backlash end detection section.

According to a tenth aspect of the present disclosure, the vehicle system vibration suppression control device according to the ninth aspect is configured such that the estimated shaft torsional torque ($^\wedge T_d$) is replaced with the output torque command ($T_m$) for input to the torque-to-phase transformation section.

According to an eleventh aspect of the present disclosure, a vehicle system vibration suppression control method includes operating the vehicle system vibration suppression control device according to any one of the first to tenth aspects.

(1) According to the first to eleventh aspects of the present disclosure, it is possible to suppress vibrations due to resonance by using motor speed information, and thereby improve the ride comfort of the vehicle.

(2) According to the first aspect of the present disclosure, it is possible to reduce the order of the transfer function of the approximate model to the second order. By using the reduced second order expression of the filter, it is possible to easily design the filter characteristic of mathematical expression (13) which is required for constructing the vibration suppression control.

(3) According to the second aspect of the present disclosure, it is possible to realize the disturbance torque observer by using the motor-accelerating torque component $T_{mA}^*$ calculated for the vibration suppression control, and by this disturbance torque observer, estimate the disturbance torque.

(4) According to the third aspect of the present disclosure, it is possible to allow the disturbance estimation function of the disturbance torque observer to contribute to vibration suppression, and thereby suppress vibrations due to backlash (hunting) and suppress disturbance components due to model errors such as when the tire coefficient varies.

(5) According to the fourth and fifth aspects of the present disclosure, it is possible to achieve time matching between the motor-accelerating torque of the disturbance torque observer and the differential component of the measured speed, and thereby improve characteristics of the vibration suppression control when the torque command changes rapidly.

(6) According to the sixth aspect of the present disclosure, it is possible to switch the motor-accelerating torque used for the vibration suppression control between the component obtained by differentiating the measured speed and the motor-accelerating torque of the disturbance torque observer side, or mix them, or assign weighting factors to them.

(7) According to the seventh aspect of the present disclosure, it is possible to output a torque command from which a torque component in a resonant band is removed.

Furthermore, it is possible to obtain effects as produced by a differential feedback type vibration suppression control using speed measurement, and thereby suppress resonant components from being caused by disturbance forces applied to the vehicle body and the driveline mechanisms.

Furthermore, since the disturbance torque observer is configured to feed back the deviation component between the information from the vehicle model and the information from the speed measurement to the model input, it is possible to suppress error components due to a difference in parameters between the vehicle model and the actual vehicle even if the difference occurs. Therefore, robustness is ensured so that even if parameter errors or fluctuations occur, the performance of the vibration suppression control is suppressed from being adversely affected.

(8) According to the eighth aspect of the present disclosure, it is possible to simplify the configuration of the disturbance torque observer, because the estimated disturbance torque $T_{obs}$ is calculated based on the deviation between the motor-accelerating torque component $T_{mA\_det}$ obtained from the speed measurement and the estimated motor-accelerating torque component $\hat{T}_{mA}$ obtained from the vehicle model.

(9) According to the ninth and tenth aspects of the present disclosure, it is possible to estimate the start time and end time of a backlash, and during the backlash period, suppress acceleration of the motor by reducing the torque command. This serves to reduce a kinetic energy due to acceleration, and thereby reduce shocks occurring when gear teeth collide at the end of the backlash.

BRIEF DESCRIPTION OF DRAWINGS

FIG. 4 is a block diagram showing a feedback section and an approximate transfer function of a vibration suppression control device according to a first embodiment of the present invention.

FIG. 32 is a block diagram showing a method of calculation of a difference between a measured speed and an estimated speed of the disturbance torque observer according to the sixth embodiment of the present invention.

FIG. 33 is a diagram showing an example of moving average calculation according to the sixth embodiment of the present invention, where (a) is a block diagram, and (b) is a time chart illustrating time matching by moving averaging.

FIG. 35 is a block diagram showing an example of a sampled data system model of a vehicle model section in a disturbance torque observer according to the seventh embodiment of the present invention, where (a) shows an example of configuration, and (b) shows another example of configuration.

FIG. 36 is a block diagram showing a method of calculation of a difference between a measured speed and an estimated speed of the disturbance torque observer according to the seventh embodiment of the present invention.

FIG. 39 is a diagram showing characteristics of acceleration/deceleration when no vibration suppression control is employed.

FIG. 42 is a diagram showing characteristics of acceleration/deceleration when the seventh embodiment of the present invention is employed and backlash is assumed in the actual vehicle.

FIG. 43 is a diagram showing characteristics of acceleration/deceleration when the eighth embodiment of the present invention is employed and backlash is assumed in the actual vehicle.

FIG. 45 is a diagram showing characteristics of acceleration/deceleration when the ninth embodiment of the present invention is employed and backlash is assumed in the actual vehicle.

MODE(S) FOR CARRYING OUT INVENTION

The following describes embodiments of the present invention with reference to the drawings. The present invention is not limited to the following embodiments, but may be implemented in various manners. In patent document 1, a model of a vehicle is defined by a mathematical expression. When expressed as a block diagram and a transfer function using a Laplace operator, the model is expressed by $G_p(S)$ in FIG. 1.

Basically, the vehicle model is the same as in FIG. 4 of patent document 1. However, a model becomes complicated due to factors such as gear ratios, a tire radius, etc. Therefore, a general concept of a per-unit system is used to transform the vehicle model to a normalized model based on a rated torque and a rated rotational speed. As a result, the unit system is unified, so that gear ratios, a tire radius, etc., do not appear explicitly, and the control block diagram is simplified. Although description of terms, "per-unit system" and "normalization", is omitted, the rotational inertia of a motor and the inertia of a vehicle body are each replaced by a time constant until the rated speed is reached after the rated torque is inputted. By introducing the time constants, it becomes possible to quantitatively compare a plurality of inertial components with each other, and use the time constants for judgment about approximation.

Figure 1:
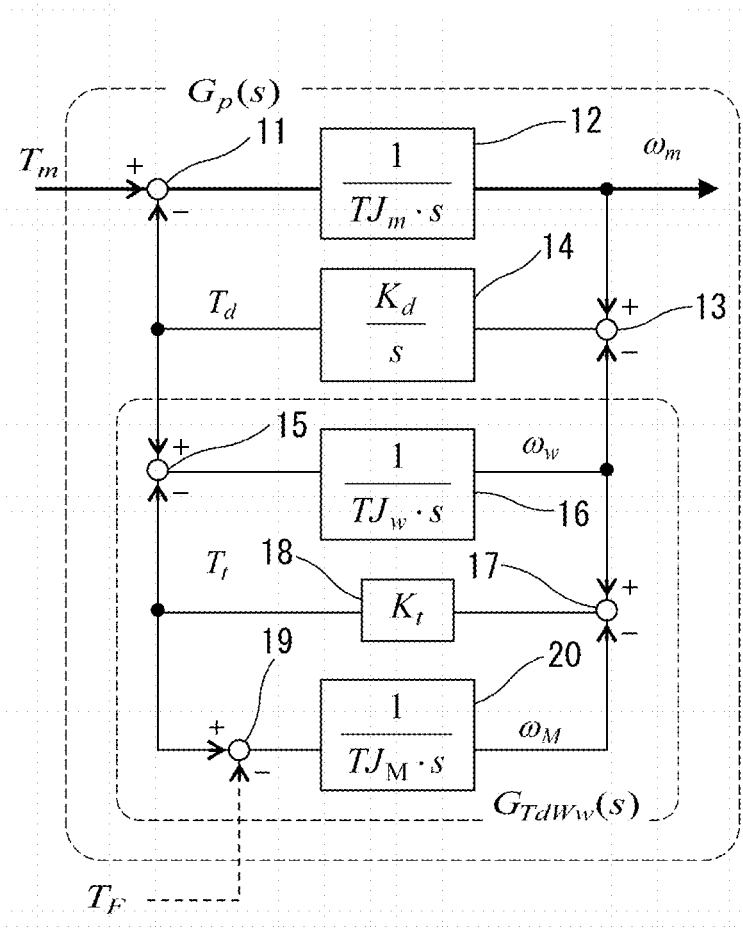
FIG. 1 is a block diagram showing a normalized control model of a vehicle system to which the present invention is applied.

Variables and constants in FIG. 1 are defined as follows.

$TJ_m$: a time constant equivalent to motor inertia,
$TJ_w$: a time constant equivalent to driving wheel inertia (a combined value of driving wheels),
$TJ_m$: a time constant equivalent to vehicle mass,
$K_d$: a torsional stiffness coefficient of driveline,
$K_t$: a coefficient relating to friction between tire and road surface,
$\omega_m$: a motor angular speed,
$\omega_w$: a driving wheel angular speed,
$\omega_m$: a vehicle speed,
$T_m$: a motor torque,
$T_d$: a driving wheel torque,
$T_t$: a torque between tire and road surface, and
$T_F$: an external force applied to vehicle (disturbance torque component).

In the above description, "T" is used for variables relating to torque, and "TJ" is used for time constants produced by conversion from rotational inertias, in order to avoid confusion between torques and time constants.

For description of a control system, an actual plant and a model used in a control section are described. This may be likely to cause confusion between them. Therefore, for distinguishing a coefficient or variable relating to the control model, a symbol "^" is added to the beginning of the coefficient or variable, in second and following embodiments.

Integral blocks are represented by transfer functions in mathematical expression (1), where "s" is the Laplace operator.

$$G_d(s) = \frac{K_d}{s}, \ G_m(s) = \frac{1}{TJ_m \cdot s}, \ G_w(s) = \frac{1}{TJ_w \cdot s}, \ G_M(s) = \frac{1}{TJ_M \cdot s} \quad (1)$$

A subtractor 11 subtracts the driving wheel torque $T_d$ from the motor torque (output torque command) $T_m$ to output the motor torque (motor-accelerating torque) $T_{mA}$.

A $G_m(s)$ block 12 multiplies the output of the subtractor 11 by a transfer function $G_m(s)$ to output the motor angular speed $\omega_m$. A subtractor 13 subtracts the driving wheel angular speed $\omega_w$ from the motor angular speed $\omega_m$. A $G_d(s)$ block 14 multiplies the output of the subtractor 13 by a transfer function $G_d(s)$ to output the driving wheel torque $T_d$.

A subtractor 15 subtracts the torque Tt between tires and a road surface from the driving wheel torque $T_d$. A $G_w(s)$ block 16 multiplies the output of the subtractor 15 by a transfer function $G_w(s)$ to output the driving wheel angular speed $\omega_w$. A subtractor 17 subtracts the vehicle speed $\omega_M$ from the driving wheel angular speed $\omega_w$. A $K_t$ block 18 multiplies the output of the subtractor 17 by a coefficient $K_t$ relating to friction between the tires and the road surface, and outputs the torque $T_t$ between the tires and the road surface. A subtractor 19 subtracts the external force (disturbance torque component) $T_F$ applied to the vehicle from the torque $T_t$ between the tire and the road surface. A $G_M(s)$ block 20 multiplies the output of the subtractor 19 by a transfer function $G_M(s)$ to output the vehicle speed $\omega_M$.

The subtractors 15, 17, 19 and blocks 16, 18, 20 are defined as a transfer function $G_{TdWw}(s)$.

The configuration of FIG. 1 is a multi-stage feedback configuration. Accordingly, as the disturbance component $T_F$ is ignored and the blocks are developed in order from the bottom, this model system is expressed by transfer functions of mathematical expressions (2) and (3).

Namely, as the section from the torsional torque of the elastic shaft (driving wheel torque) $T_d$ to the tire speed (driving wheel angular speed) $\omega_w$ is defined as a transfer function $G_{TdWw}(s)$, $G_{TdWw}(s)$ is expressed by mathematical expression (2).

$$G_{TdWw}(s) = \frac{\omega_w}{T_d} = \frac{\frac{1}{TJ_w \cdot s}}{1 + \frac{1}{TJ_w \cdot s} \cdot G_{WwTt}(s)} = \quad (2)$$

$$\frac{\frac{1}{TJ_w \cdot s}}{1 + \frac{1}{TJ_w \cdot s} \cdot \frac{TJ_M \cdot s}{\frac{TJ_M}{Kt} \cdot s + 1}} = \frac{1}{(TJ_w + TJ_M) \cdot s} \cdot \frac{\frac{TJ_M}{Kt} \cdot s + 1}{\frac{1}{Kt} \cdot \frac{TJ_w \cdot TJ_M}{TJ_w + TJ_M} \cdot s + 1}$$

The transfer function $G_p(s)$, which is a transfer function of the entire model from the electromagnetically generated motor torque (output torque command) $T_m$ to the motor rotational speed (angular speed) $\omega_m$, is a product of an integral term and a third order term as expressed by mathematical expression (3). Here, the sum of rotational inertias is represented by $TJ_\Sigma = TJ_m + TJ_w + TJ_M$.

$$G_p(s) = \frac{\omega_m}{T_m} = \frac{1}{TJ_\Sigma \cdot s} \cdot \frac{\frac{TJ_w TJ_M}{Kt \cdot K_d} \cdot s^3 + \frac{TJ_w + TJ_M}{K_d} \cdot s^2 + \frac{TJ_M}{Kt} \cdot s + 1}{\frac{TJ_m \cdot TJ_w \cdot TJ_M}{TJ_\Sigma \cdot Kt \cdot K_d} \cdot s^3 + \frac{TJ_m \cdot (TJ_w + TJ_M)}{TJ_\Sigma \cdot K_d} \cdot s^2 + \frac{(TJ_M \cdot TJ_w)}{TJ_\Sigma \cdot Kt} \cdot s + 1} \quad (3)$$

$$(TJ_\Sigma = TJ_m + TJ_w + TJ_M)$$

The integral term in mathematical expression (3) contains a time constant equivalent to a combined component of all of the rotational inertias. Correcting coefficients so as to separate the integral term into a combination of an integral term of the motor rational inertia, $G_m(s) = 1/(TJ_m \cdot s)$, and $F_p(s)$, as in mathematical expression (4), gives a filter section ($F_p(s)$) expressed by mathematical expression (5).

$$G_p(s) = G_m(s) \cdot F_p(s) \quad (4)$$

$$F_p(s) = \frac{TJ_m}{TJ_\Sigma} \cdot \frac{\frac{TJ_w \cdot TJ_M}{Kt \cdot K_d} \cdot s^3 + \frac{TJ_w + TJ_M}{K_d} \cdot s^2 + \frac{TJ_M}{Kt} \cdot s + 1}{\frac{TJ_m \cdot TJ_w \cdot TJ_M}{TJ_\Sigma \cdot Kt \cdot K_d} \cdot s^3 + \frac{TJ_m \cdot (TJ_w + TJ_M)}{TJ_\Sigma \cdot K_d} \cdot s^2 + \frac{TJ_M \cdot (TJ_m + TJ_w)}{TJ_\Sigma \cdot Kt} \cdot s + 1} \quad (5)$$

In a first embodiment, mathematical expression (5) is simplified and then used for vibration suppression control.

Figure 2:
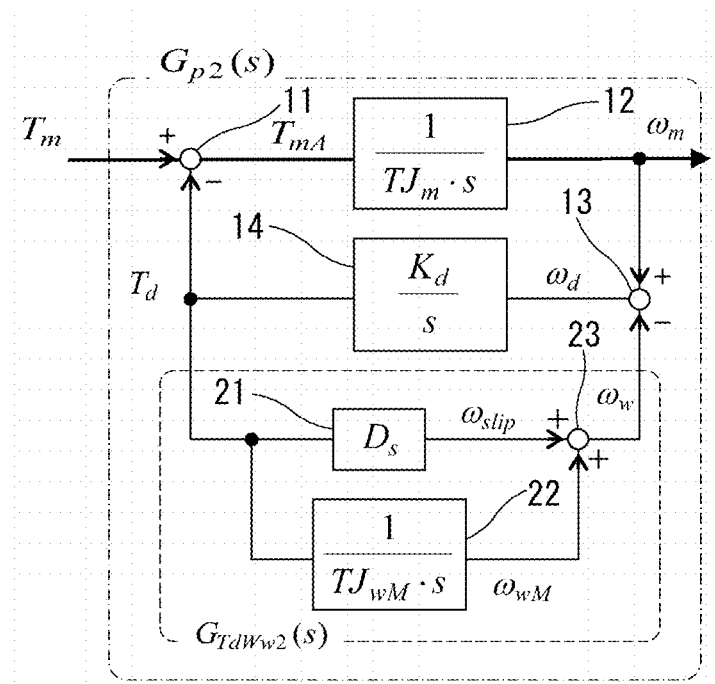
FIG. 2 is a block diagram showing a simplified control model according to an embodiment of the present invention.

Mathematical expressions (4) and (5) represent the configuration of FIG. 1. This configuration is approximated to reduce the number of components as shown in FIG. 2. This approximation is described in terms of transfer functions.

The approximation is applied to mathematical expression (2), which corresponds to replacing $G_{TdWw}(s)$ in FIG. 1 with $G_{TdWw2}(s)$ in FIG. 2.

The transfer function $G_{TdWw2}(s)$ in FIG. 2 includes: a $D_s$ block 21 that multiplies the driving wheel torque $T_d$ by a slip coefficient $D_s$ to output a tire slip speed $\omega_{slip}$; a $1/TJ_{wM}(s)$ block 22 that integrates the driving wheel torque $T_d$ by the combined rotational inertia $TJ_{wM}$ of the tires and the vehicle body to output the tire and vehicle body speed $\omega_{wM}$; and an adder 23 that sums the speeds $\omega_{slip}$ and $\omega_{wM}$ to output the driving wheel angular speed $\omega_w$.

Mathematical expression (2) is composed of a product of an integral term and a first order filter. The coefficients in the denominator of the first order filter are approximated as mathematical expression (6).

$$\frac{1}{Kt} \cdot \frac{TJ_w \cdot TJ_M}{TJ_w + TJ_M} = \frac{1}{Kt} \cdot \frac{TJ_w \cdot TJ_M}{TJ_M} = \frac{TJ_w}{Kt} \ll 1 \quad (6)$$

In general, when the inertia of the vehicle body and the rotational inertia of the tires are compared in terms of time constants, the time constant of the tires is much smaller ($TJ_M \gg TJ_w$). Furthermore, the tire coefficient $K_t$ has a large value ($K_t \gg 1$). From these two characteristics, it can be seen that the coefficient of the denominator of the first order filter part in mathematical expression (2) is much smaller than 1 with reference to a relationship in mathematical expression (6).

The denominator of this first order filter part represents characteristics of a low-pass filter (LPF), where the reciprocal of mathematical expression (6) corresponds to a corner frequency. The fact that mathematical expression (6) has a small value means that this LPF attenuates only fairly high frequency components. Accordingly, if the corner frequency is sufficiently high with respect to a resonant frequency or a band of compensation of the vibration suppression control, it can be considered irrelevant from the vibration suppression control. By regarding the value of mathematical expression (6) as zero and approximating the denominator side of the first order filter part to a unity gain (=1), the mathematical expression (2) is approximated to mathematical expression (7), which is equivalent to a sum of a proportional term $D_s$ in mathematical expression (8) and an integral with the time constant $TJ_{wM}$ in mathematical expression (9).

$$G_{TdWw2}(s) \fallingdotseq \qquad (7)$$

$$\frac{(TJ_M/Kt) \cdot s + 1}{(TJ_w + TJ_M) \cdot s} = \frac{TJ_M}{(TJ_w + TJ_M) \cdot Kt} + \frac{1}{(TJ_w + TJ_M) \cdot s} = D_s + \frac{1}{TJ_{wM} \cdot s}$$

$$D_s = \frac{TJ_M}{(TJ_w + TJ_M) \cdot Kt} \qquad (8)$$

$$TJ_{wM} = TJ_w + TJ_M \qquad (9)$$

As in mathematical expression (9), $TJ_{wM}$ represents the combined rotational inertia of the tires and the vehicle body. In mathematical expression (8), D s is a coefficient representing a tire slip characteristic, and corresponds to a slip coefficient for calculating the slip speed $\omega_{slip}$ that is caused by the driving force (driving wheel torque) $T_d$ applied to the tire axle.

By applying the above approximation, mathematical expressions (4) and (5) are simplified to mathematical expressions (10) and (11).

$$G_p(s) \fallingdotseq G_{p2}(s) = G_m(s) \cdot F_{p2}(s) \qquad (10)$$

$$F_{p2}(s) = \frac{s^2 + K_d \cdot D_s \cdot s + \frac{K_d}{TJ_{wM}}}{s^2 + K_d \cdot D_s \cdot s + K_d \cdot \left(\frac{1}{TJ_{wM}} + \frac{1}{TJ_m}\right)} \qquad (11)$$

By simplifying the third order filter $F_p(s)$ expressed by mathematical expression (5) to the second order filter $F_{p2}(S)$ expressed by mathematical expression (11), characteristics can be represented in a general system with a natural frequency of a second order equation and a viscosity ratio, and control design can be carried out using a model approximated into a two-inertia system.

Ends of the elastic shaft are connected to the motor shaft and the tire axle. The vibration suppression control uses a difference in speed between both ends and a torsional phase, wherein the torsional phase is produced by time-integrating the speed difference. If there is no need to refer to individual speeds of the motor and tires, the integral terms in the block diagram shown in FIG. 2 can be commonized and reduced as shown in FIG. 3 (approximate model of this embodiment).

First, the integral time constants $TJ_m$ and $TJ_{wM}$ are isolated and used to calculate individual acceleration components ($A_m$ and $A_{wM}$). Then, the difference between these accelerations is integrated to calculate the speed difference (torsional speed). Furthermore, since the component obtained by differentiating the motor speed is used for the vibration suppression control as described below, it is modified so that the input component $T_{mA}$ to the integral term of the motor is outputted. With the configuration shown in FIG. 3, the number of integrators can be reduced to two.

This output component $T_{mA}$ is produced by subtracting a reaction force (driving wheel torque) $T_d$, which corresponds to a torque transmitted to the elastic shaft and is applied to the output shaft of the motor, from the electromagnetic torque ($T_m$) generated between the stator and rotor of the motor. Since the output component $T_{mA}$ is proportional to the acceleration Am of the motor, the output component $T_{mA}$ is henceforth referred to as "motor-accelerating torque".

Figure 3:
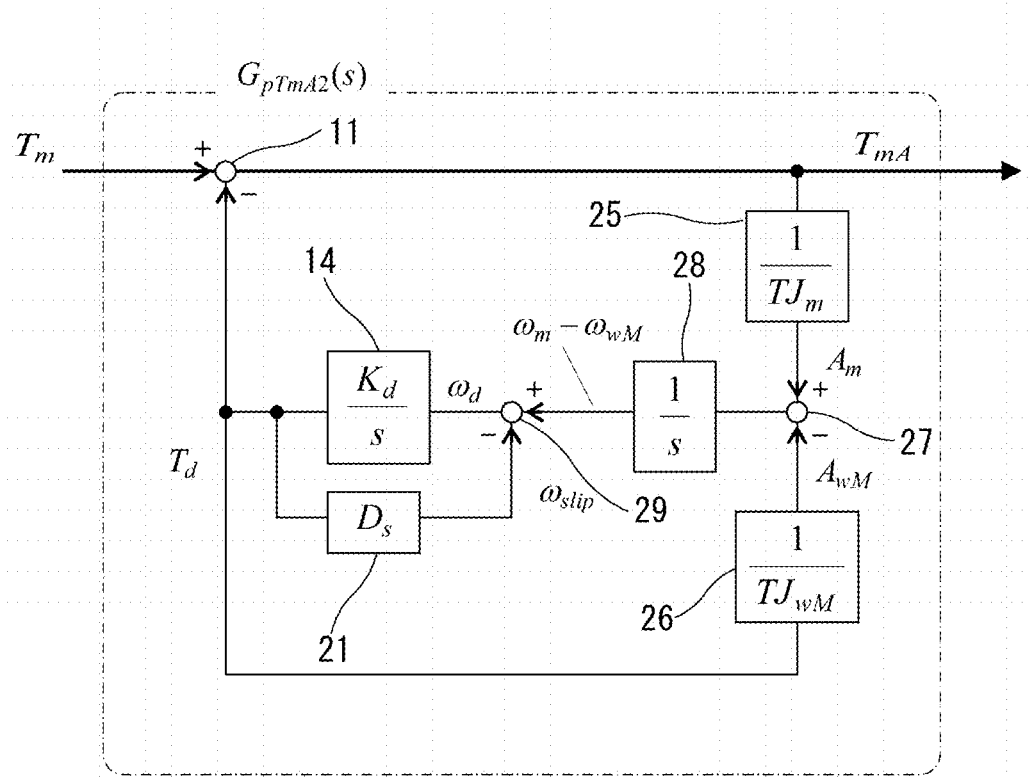
FIG. 3 is a block diagram showing an approximate model according to an embodiment of the present invention.

In FIG. 3, the same parts as those in FIGS. 1 and 2 are denoted by the same reference numerals. A divider 25 divides the motor-accelerating torque $T_{mA}$, which is obtained by subtracting the driving wheel torque $T_d$ from the output torque command $T_m$ by the subtractor 11, by the time constant equivalent to the rotational inertia of the motor ($TJ_m$), and outputs the motor side acceleration $A_m$.

A divider 26 divides the driving wheel torque $T_d$ by the combined rotational inertia $TJ_{wM}$ of the tires and the vehicle body to output the vehicle body side acceleration $A_{wM}$.

A subtractor 27 obtains a deviation between the motor-side acceleration Am and the vehicle-side acceleration $A_{wM}$. An integrator 28 time-integrates the outputted deviation to produce a relative speed ($\omega_m$-$\omega_{wM}$) between the motor and the vehicle body.

A subtractor 29 subtracts the tire slip speed $\omega_{slip}$, which is produced by multiplying the driving wheel torque $T_d$ by the slip coefficient $D_s$, from the motor/vehicle relative speed ($\omega_m$-$\omega_{wM}$) to produce a motor/tire relative speed (relative torsional speed of the elastic shaft) $\omega_d$.

A $G_d(s)$ block 14 multiplies the motor/tire relative speed $\omega_d$, which is outputted from the subtractor 29, by a transfer function $G_d(s)$ to output the driving wheel torque $T_d$.

When represented by a transfer function, the configuration of FIG. 3 is expressed by $G_{PTmA2}(s)$ in mathematical expression (12), which is equal to the second order filter $F_{P2}(s)$ in mathematical expression (11). It is known that in a two-inertia system, the denominator represents resonant characteristics and the numerator represents anti-resonant characteristics. A second order mathematical expression like mathematical expression (12) can be treated in terms of a natural frequency and a damping ratio. In this embodiment, this mathematical expression (12) is used for designing a vibration suppression control.

$$G_{pTmA2} = \qquad (12)$$

$$\frac{s^2 + (K_d \cdot D_s) \cdot s + K_d \cdot \frac{1}{TJ_{wM}}}{s^2 + (K_d \cdot D_s \cdot s) + K_d \cdot \left(\frac{1}{TJ_m} + \frac{1}{TJ_{wM}}\right)} = \frac{s^2 + 2 \cdot \zeta_a \cdot \omega_a \cdot s + \omega_a^2}{s^2 + 2 \cdot \zeta_r \cdot \omega_r \cdot s + \omega_r^2}$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline (gears, an elastic shaft, etc.),
$K_t$: a coefficient relating to friction between tire and road surface, and
$TJ_{wM} = TJ_w + TJ_M$.

First Embodiment

FIG. 4 (*a*) shows an example of configuration of a vibration suppression control system according to the first embodiment, in which feedback compensation of $G_{comp}(s)$ is applied to a controlled plant $G_P(s)$. In $G_{comp}(s)$, a measured speed $\omega_m$ is differentiated by $1/\hat{G}_m(s)$ of a differentiator 31 to produce a motor-accelerating torque component $T_{mA}^*$, which is caused to pass through a band-pass filter $F_{comp}(s)$ (vibration suppression control filter) to produce a compensation torque component $T_{Fcomp}$, which is fed back to an input torque command $T_{ref}$.

Namely, a subtractor 32 subtracts the compensation torque component $T_{Fcomp}$ from the input torque command $T_{ref}$ to output an output torque command $T_m$. Mathematical expression (13) is employed for this bandpass filter $F_{comp}(s)$. In mathematical expression (13), $\zeta_A$ is a sole adjustable parameter, and except for this parameter, the natural frequency and damping ratio of mathematical expression (12) are used.

$$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \tag{13}$$

The plant side in FIG. 4 (*a*) can be separated into the integral term $G_m(s)$ of the motor and the filter part $G_{PTmA}(s)$, and $G_m(s)$ of the actual plant and $G_m(s)$ of the control model are approximated to be equal to each other as shown in FIG. 4 (*b*). As the filter section $G_{PTmA}(s)$ is also approximated to $G_{PTmA2}(s)$, only a feedback $F_{P-comp}(s)$ and $G_m(s)$ remain as shown in FIG. 4 (*c*). Accordingly, it is sufficient to approximate $F_{P-comp}(s)$ as in mathematical expression (14), and design $F_{comp}(s)$ to have stable characteristics.

$$F_{p-comp}(s) = \frac{F_p(s)}{1 + F_p(s) \cdot F_{comp}(s)} \cong \frac{G_{pTmA2}(s)}{1 + G_{pTmA2}(s) \cdot F_{comp}(s)} \tag{14}$$

Substituting the mathematical expression (12) for the approximate model and mathematical expression (13) for the compensation filter into mathematical expression (14) yields a second order mathematical expression (15).

$$F_{p-comp}(s) \cong \frac{F_{p2}(s)}{1 + F_{p2}(s) \cdot F_{comp}(s)} = \frac{\frac{s^2 + 2 \cdot \zeta_a \cdot \omega_a \cdot s + \omega_a^2}{s^2 + 2 \cdot \zeta_r \cdot \omega_r \cdot s + \omega_r^2}}{1 + \frac{s^2 + 2 \cdot \zeta_a \cdot \omega_a \cdot s + \omega_a^2}{s^2 + 2 \cdot \zeta_r \cdot \omega_r \cdot s + \omega_r^2} \cdot \frac{2 \cdot (\zeta_A - \zeta_r) \cdot \omega_r \cdot s}{s^2 + 2 \cdot \zeta_a \cdot \omega_a \cdot s + \omega_a^2}} = \frac{s^2 + 2 \cdot \zeta_a \cdot \omega_a \cdot s + \omega_a^2}{s^2 + 2 \cdot \zeta_A \cdot \omega_r \cdot s + \omega_r^2} \tag{15}$$

Since the adjustable parameter $\zeta_A$ corresponds to the viscosity ratio of the denominator, setting "$\zeta_A=1$" makes the denominator have a double root and thereby makes the system become stable, which means that the band pass filter $F_{comp}(S)$ has been designed suitably.

Actually, model errors exist, so that it is required to set $\zeta_A$ to a small value. Ideally, it is sufficient to set $\zeta_A$ as $\zeta_A=1$. Mathematical expression (15) is obtained by approximating the filter characteristic part of the plant to mathematical expression (11). The use of the approximate model makes it easy to design the compensator.

According to the first embodiment, by approximating the configuration of FIG. 1 to the model configuration of two-inertia system in FIG. 2, it is possible to reduce the order of the transfer function as in mathematical expression (10) and mathematical expression (11). Furthermore, by modifying the model to output the motor-accelerating torque as shown in FIG. 3, it is possible to express the characteristics by a general system based on a second order filter with a natural frequency and a viscosity ratio of a second order mathematical expression. This makes it possible to easily grasp the characteristics of resonance and anti-resonance of a controlled object.

By using this simplified second order mathematical expression, it is possible to easily design the filter characteristics of the feedback control of mathematical expression (13) required for constructing the vibration suppression control of FIG. 4 (*a*).

Second Embodiment

The vibration suppression control designed in the first embodiment still has issues. It is required to take countermeasures against gear backlash and tire coefficient (friction coefficient) fluctuations. As a preliminary step, in this section as a second embodiment, a method is proposed for realizing a disturbance torque observer using the approximate model of FIG. 3.

Figure 5:
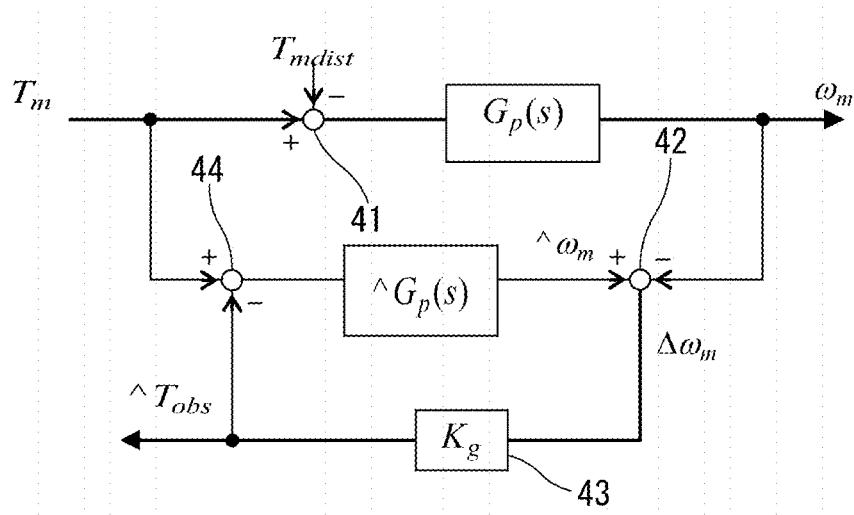
FIG. 5 is a block diagram showing a general system of disturbance torque observer.

FIG. 5 shows an example of configuration of a general disturbance torque observer. Symbols and variables are defined for components as follows.

$G_p(s)$: a model of a plant to be controlled,
$\hat{G}_P(s)$: a model in control,
$K_g$: an observer gain,
$\hat{\omega}_m$: a motor speed estimated by control model,
$T_{mdist}$: a disturbance torque component converted to motor shaft torque, and
$\hat{T}_{obs}$: an estimated disturbance torque.

Originally, a gradient such as on a climbing road acts as an external force on the vehicle body, and a decelerating force due to braking acts as a disturbance torque on the tire axle. However, since only the motor speed is measured, these disturbance torque components are collectively defined as $T_{mdist}$, which is a quantity produced by conversion to the motor shaft. This disturbance torque is estimated as $\hat{T}_{obs}$ by a disturbance torque observer.

FIG. 5 shows a general structure, in which subtracting $T_{mdist}$ from the output torque command $T_m$ by the subtractor 41 yields a quantity, and the quantity is inputted to the plant model $G_p(s)$ to output a speed corresponding to the measured speed $\omega_m$. On the observer side, a subtractor 44 subtracts $\hat{T}_{obs}$ from the output torque command $T_m$ to produce a quantity, which is inputted to the model $\hat{G}_P(s)$ to calculate the estimated speed $\hat{\omega}_m$; a subtractor 42 calculates a difference between the estimated speed $\hat{\omega}_m$ and the measured speed $\omega_m$ from the plant; a gain multiplier 43 multiplies the difference by an observer gain Kg to produce the estimated disturbance torque $\hat{T}_{obs}$, and feeds the estimated disturbance torque $\hat{T}_{obs}$ back to the subtractor 44 to which the model input torque is inputted.

Figure 6:
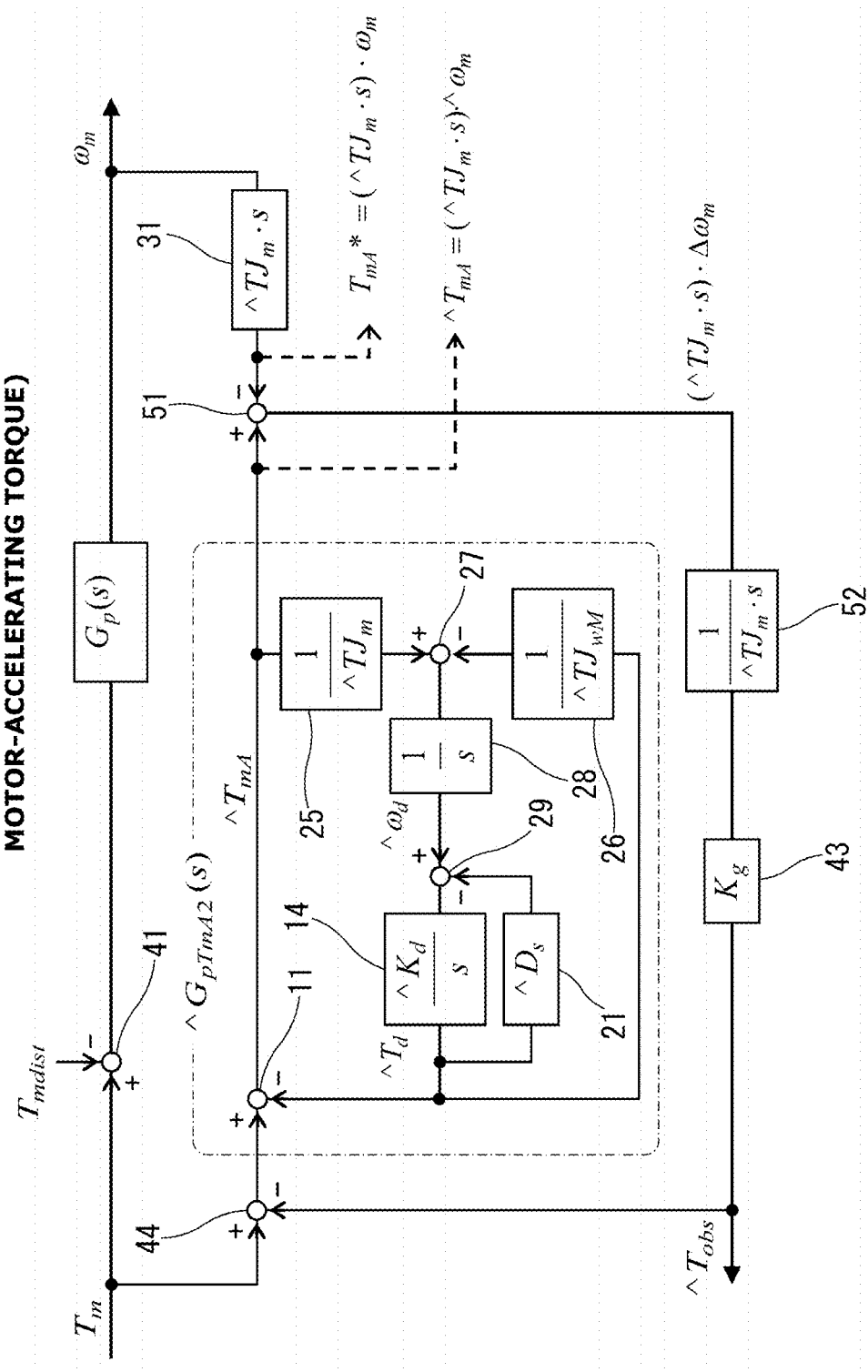
FIG. 6 is a block diagram showing a disturbance torque observer according to a second embodiment of the present invention.

In the second embodiment, the general configuration of FIG. 5 is further modified to a configuration shown in FIG. 6. In FIG. 4 (*a*) showing the vibration suppression control according to the first embodiment, the torque accelerating the motor (motor-accelerating torque component) $T_{mA}^*$ is calculated by application of $1/G_m(s)=(TJ_m \cdot s)$, which corresponds to differentiation, to the measured speed. On the other hand, the model in FIG. 3 also outputs $T_{mA}$ equivalent to $T_{mA}^*$. Accordingly, by using the approximate model in FIG. 3 and replacing the speed difference component ($\hat{\omega}_m - \omega_m$) in FIG. 5 with the difference in motor-accelerating torque ($\hat{T}_{mA}$-$T_{mA}$*) (output of a subtractor 51), it is possible to implement a disturbance torque observer that uses $T_{mA}$*, which has already been calculated in the vibration suppression control. For actual implementation in a digital controller, the second order transfer function of mathematical expression (12) is used to suppress a discrete time error.

In FIG. 6, the same parts as in FIGS. 3 and 5 are denoted by the same reference numerals. The estimated motor-accelerating torque component $\hat{T}_{mA}$ (=($\hat{T}J_m$·s)·$\hat{\omega}_m$), which is outputted from a subtractor 11 in the approximate model $G_{PTmA2}$(s), is taken into a subtractor 51. The subtractor 51 calculates the difference between the estimated motor-accelerating torque component $\hat{T}_{mA}$ and the motor-accelerating torque component $T_{mA}$*(=($\hat{T}J_m$·s)·$\omega_m$) that is produced by causing the motor angular speed $\omega_m$ to pass through a differentiator 31. The output ($\hat{T}J_m$·s)·$\Delta\omega_m$ of the subtractor 51 is integrated by an integrator 52 and then multiplied by the observer gain $K_g$ of a gain multiplier 43 to produce the estimated disturbance torque $\hat{T}_{obs}$.

Furthermore, in FIG. 6, the slip coefficient $D_s$ and the torsional stiffness coefficient $K_d$ relate to the control model, and accordingly, they are expressed as slip coefficient $\hat{D}_s$ and torsional stiffness coefficient $\hat{K}_d$.

A divider 25 divides the estimated motor-accelerating torque component $\hat{T}_{mA}$ by a time constant $\hat{T}J_m$ equivalent to the rotational inertia of the motor to produce the motor side acceleration.

A divider 26 divides the shaft torsional torque $\hat{T}_d$ by the combined rotational inertia $\hat{T}J_{wM}$ of the tires and the vehicle body to produce the vehicle body side acceleration.

A subtractor 27 calculates the difference between the dividers 25 and 26, and an integrator 28 integrates the outputted difference over time to produce the relative speed $\hat{\omega}_d$ between the motor and the vehicle body.

By multiplying the shaft torsional torque $\hat{T}_d$ by the slip coefficient $\hat{D}_s$ of a $D_s$ block 21, the tire slip speed is calculated.

A subtractor 29 calculates the difference between the tire slip speed and the motor/vehicle relative speed $\hat{\omega}_d$, wherein the calculated difference is time-integrated in a $G_d$(s) block 14 and thereby converted into the torsional phase of the elastic shaft. The torsional phase is multiplied by the torsional stiffness coefficient $\hat{K}_d$ of the driveline to produce the shaft torsional torque $\hat{T}_d$.

The subtractor 11 and the subtractor 44 may be integrated into a single subtractor that subtracts the estimated disturbance torque $\hat{T}_{obs}$ and the shaft torsional torque $\hat{T}_d$ from the output torque command $T_m$.

As described above, $\hat{T}_{mA}$ from the model $G_{PTmA2}$(s) can be used without changed from the output in FIG. 3, wherein there is no need to differentiate the speed on the model side. However, since this difference is a differential component of speed, the integral 1/($\hat{T}J_m$·s) is added after difference calculation in order to restore a speed difference. Finally, the value obtained after the integration is multiplied by the observer gain $K_g$ to produce the estimated disturbance torque $\hat{T}_{obs}$. Thereby, FIG. 6 becomes equivalent to FIG. 5 in terms of characteristics. In the following embodiments, vibration suppressing control is realized by using two types of signals $T_{mA}$* and $\hat{T}_{mA}$ indicated by broken lines in FIG. 6.

Figure 7:
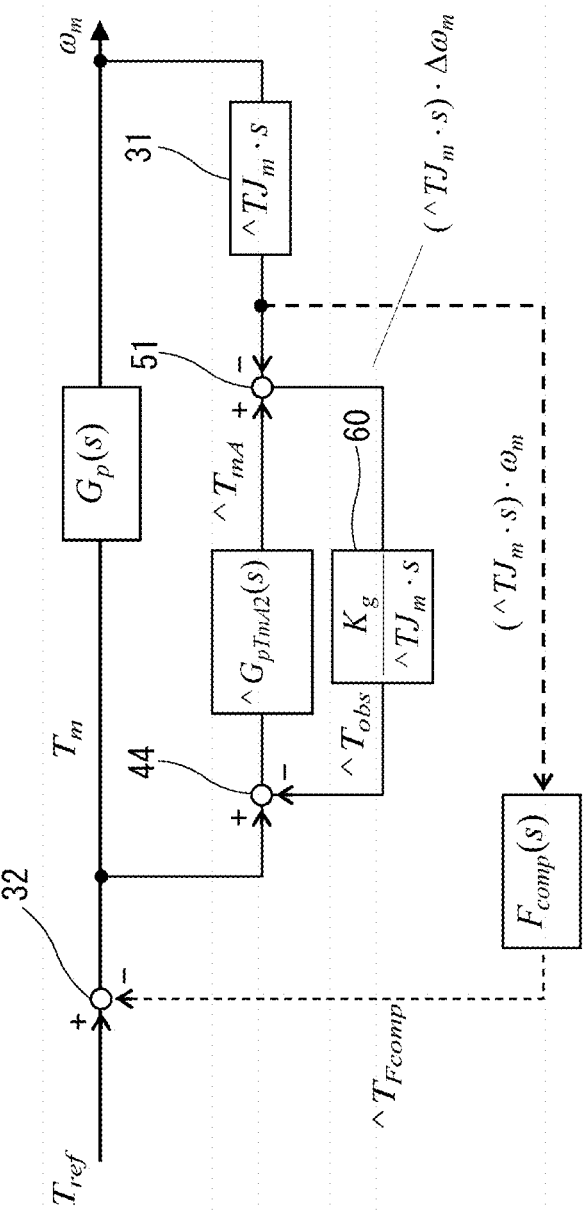
FIG. 7 is a block diagram showing a vibration suppression control device according to the second embodiment of the present invention.

FIG. 7 shows a combination of the disturbance torque observer shown in FIG. 6 and the vibration suppression control shown in FIG. 4 (a), as an example of configuration of the second embodiment. In FIG. 7, the same parts as in FIG. 6 and FIG. 4 (a) are denoted by the same reference numerals.

In FIG. 7, a block 60 is a combination of the functions of the integrator 52 and the gain multiplier 43 shown in FIG. 6.

In FIG. 7, the model section ($G_{PTmA2}$(s)) of FIG. 6 is collectively shown as a block $\hat{G}_{PTmA2}$(s). If it is implemented as a model that is not approximated as the model in FIG. 1, calculation takes a longer time. If it is implemented as multiple element blocks as shown in FIG. 3, transformation to a sampled data system may cause errors due to discrete time. However, by transforming to a second order filter form like $\hat{G}_{PTmA2}$(s) of mathematical expression (12) and then transforming to a sampled data system, it is also possible to suppress errors due to discrete time.

According to the second embodiment, by configuring the disturbance torque observer shown in FIG. 6 using the simplified model of FIG. 3, it is possible to estimate the disturbance torque component converted to the motor shaft. Adoption of $\hat{G}_{PTmA2}$(s) for the model section as shown in FIG. 7, serves to simplify the configuration, because the intermediate component of the vibration suppression control of the first embodiment can be used.

Furthermore, when the section of $\hat{G}_{PTmA2}$(s) in FIG. 7 is expressed by a single transfer function, the transfer function has the form of a second order filter as in mathematical expression (12). Accordingly, even with transformation into a sampled data system for implementation in a controller, it is possible to suppress errors due to discrete time.

Third Embodiment

Figure 8:
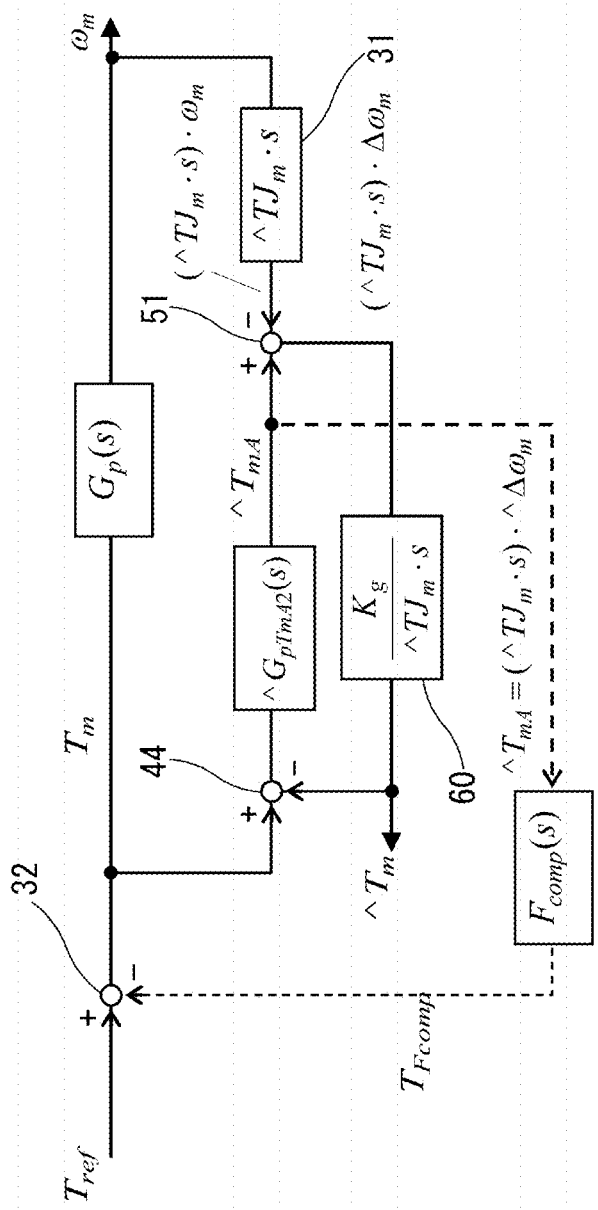
FIG. 8 is a block diagram showing a vibration suppression control device according to a third embodiment of the present invention.

FIG. 8 shows a vibration suppression control according to a third embodiment, which employs the vibration suppression control according to the first embodiment and the disturbance torque observer according to the second embodiment. This differs from FIG. 7 in a feedback signal source, wherein the input to the bandpass filter $F_{comp}$(s) is modified from $T_{mA}$* on the speed measurement side to the estimated value $\hat{T}_{mA}$ on the model side. These signals usually converge to approximately the same value, because the disturbance torque observer operates so as to equate the components $T_{mA}$* and $\hat{T}_{mA}$ with each other.

However, compared with the method of the first embodiment, the third embodiment is characterized in that it is possible to suppress hunting caused by backlash and disturbance components due to model errors such as when the tire coefficient varies.

In patent document 1, a prefilter is added to a torque command input section for removing frequency components near resonance. In addition, since an inverse characteristic (1/$G_p$(s)) of an ideal model in which no disturbance is taken into account is used for vibration suppression, there is a problem that compensation performance is adversely affected by a model error when it is present. Furthermore, since this inverse characteristic has a high gain near an anti-resonant frequency, low-frequency vibration may occur conversely.

In order to solve these problems, in the third embodiment, both the torque command and the measured speed are inputted to the model, and the internal state of the model is used for feedback control for vibration suppression. By ignoring the measured speed component of the two input components to the model, and taking out only the torque command, the model, and the vibration suppression feedback, it is possible to produce an effect equivalent to that of a prefilter. In other words, it acts to suppress a frequency component contained in the torque command which causes resonance. Therefore, the configuration of the third embodiment requires no prefilter inserted as in patent document 1. Furthermore, as the observer gain K g is increased, the prefilter effect becomes smaller, and instead, the effect of vibration suppression control based on speed measurement equivalent to that of the first embodiment becomes larger. By including two types of functions in this way, it is possible to produce an effect of suppressing the vibration component due to resonance, similar to patent document 1 and the first and second embodiments.

Furthermore, patent document 1 and the first and second embodiments have a problem of being susceptible to non-linearity, model errors, etc. For example, during a period of gear backlash, only the rotational inertia of the motor accelerates, resulting in a large change in the speed of the motor. It is conceivable that this causes excessive compensation of the vibration suppression control, and thereby causes hunting behavior. A model error due to variation in road surface friction (tire coefficient) is conceivable to cause a design error in the compensation filter, thereby cause a deviation in a frequency characteristic for compensation, and thereby distort a response waveform. As described above, the effect of these error components is particularly likely to appear as components in the anti-resonant band where the gain of the compensation filter is high.

On the other hand, when the third embodiment is employed and the observer gain $K_g$ is set so that the operating band of the disturbance torque observer contains the anti-resonant frequency, the low-frequency vibration component near the anti-resonant frequency can be estimated as a disturbance torque. The estimated disturbance torque component is to correct the value of compensation of the vibration suppression control, thereby suppressing low-frequency vibration components from being caused by hunting due to backlash and variation in road surface friction.

Therefore, by employing the disturbance torque observer to use the motor-accelerating torque, which includes the influence of disturbance, for vibration suppression control, it is possible to produce an effect of realizing robustness that can maintain stability even when there are influences of factors such as nonlinearity and model errors.

Fourth Embodiment

Figure 9:
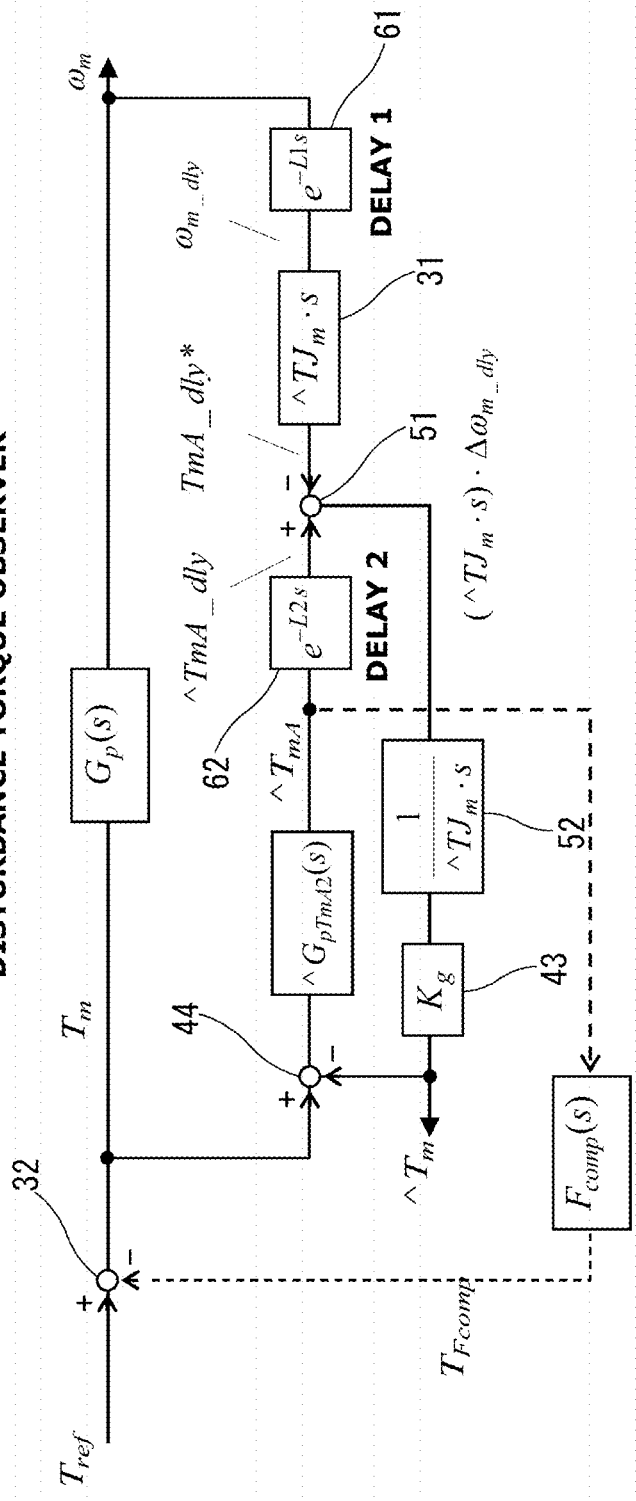
FIG. 9 is a block diagram showing a vibration suppression control device according to an example of a fourth embodiment of the present invention.

FIG. 8 shows a block diagram showing a continuous data system, ignoring a delay in speed measurement. However, actual speed measurement is implemented by periodically sampling phase information obtained from a rotation sensor such as a resolver or encoder, and calculating the speed based on a phase difference and a time difference between samples. Accordingly, speed measurement has a delay due to a sample interval, a calculation time, etc. Furthermore, since the motor drive device employs an electric current control or the like to control the torque, there is also a delay in response of the electric current control. In FIG. 9, these delay times are combined into a dead time component L1 and expressed as a delay 1, $e^{-L1s}$ (delay part 61). $\omega_{m\_dly}$ after this delay is an actually measured speed component.

With respect to the third embodiment, the fourth embodiment further employs a measure for reducing the influence of the dead time. FIG. 9 shows an example of configuration of the fourth embodiment. In FIG. 9, the same parts as in FIG. 6 are denoted by the same reference numerals. In FIG. 9, in order to make the estimated torque of the disturbance torque observer accurate, a dead time component L2 as a delay 2, $e^{-L2s}$ (delay part 62) is inserted to the disturbance torque observer side, wherein the dead time component L2 is equal to the dead time component L1 on the speed measurement side, to ensure time matching between both components before subtraction by a subtractor 51. The delay part 62 constitutes a delay compensating means of the present invention.

The measured speed component including the delay time L1 is used to calculate a motor-accelerating torque $T_{mA\_dly}*$, which is outputted from a differentiator 31. Since functions of electric current control and speed measurement are not implemented in the model of the disturbance torque observer, the delay processing (delay part 62) with the delay time (L2) equal to the delay time L1 is inserted to the estimated motor-accelerating torque ($\hat{T}_{mA}$) in the disturbance torque observer, to calculate a quantity ($\hat{T}_{mA\_dly}$), and the difference between this quantity ($\hat{T}_{mA\_dly}$) and the aforementioned quantity ($T_{mA\_dly}*$) is calculated to produce the difference component of the motor-accelerating torque of the disturbance torque observer, which is outputted from the subtractor 51.

The fourth embodiment differs from patent document 2 in that the motor-accelerating torque component $\hat{T}_{mA}$ of the disturbance torque observer is used as a feedback component of the vibration suppression control (inputted to the bandpass filter $F_{comp}(s)$), and $\hat{T}_{mA}$ contains no delay. Namely, the component ($\hat{T}_{mA}$) extracted from the preceding stage of the delay 2 (delay part 62) is used for vibration suppression control as indicated by a dashed line from the disturbance torque observer in FIG. 9.

Figure 10:
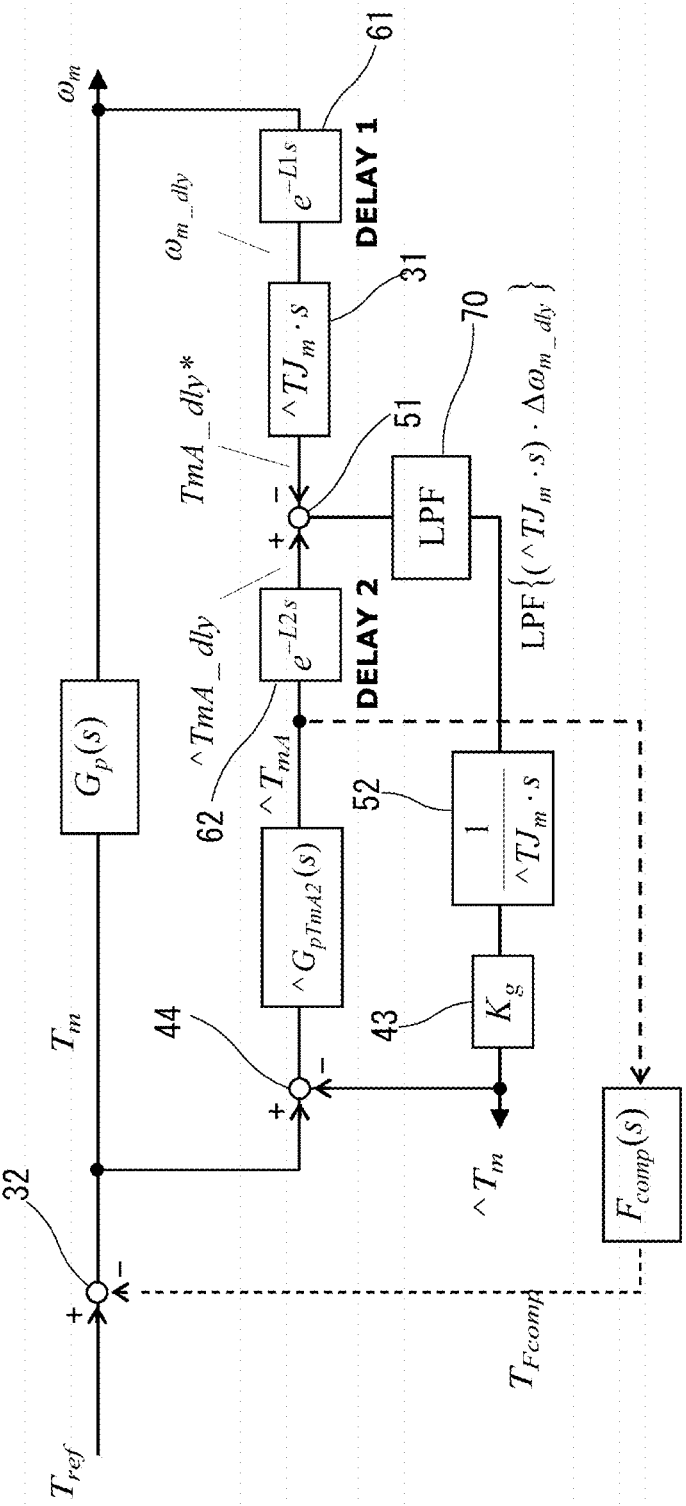
FIG. 10 is a block diagram showing a vibration suppression control device according to another example of the fourth embodiment of the present invention.

In FIG. 10 showing another example of configuration of the fourth embodiment, it is assumed that there is more noise in speed measurement than in the case of FIG. 9. In general, in order to suppress speed disturbance due to noise, a low-pass filter LPF (high band cutoff filter) is often added to the subsequent stage of the differentiator 31 for filtering the result of speed measurement. This adds an LPF delay the subsequent stage of the dead time component L1, thereby further delaying the component $T_{mA\_dly}*$. Therefore, it is required to add an LPF to $\hat{T}_{mA\_dly}$ on the model side for time matching.

However, the configuration of FIG. 10 is such that a low-pass filter 70 is inserted in the subsequent stage of the subtractor 51 in FIG. 9 that calculates the difference between $T_{mA\_dly}*$ and $\hat{T}_{mA\_dly}$. In the configuration that the single low-pass filter 70 is inserted in the subsequent stage of calculation of the difference between the motor-accelerating torque components with as little delay as possible and time matching, there is no need to consider time matching for a delay time due to the added low-pass filter 70. This is another example of configuration of the fourth embodiment for realizing delay time matching. It is a The point is that time matching between the actual device side and the model side can be achieved. Although there are various configurations for achieving time matching between the actual vehicle side and the model side, the present disclosure includes only two examples shown in FIGS. 9 and 10.

The fourth embodiment produces the following effects.

In patent document 2, in order to correct the influence of a delay time (dead time) due to speed measurement and others, an equivalent delay is inserted into an input component to the ideal model $1/G_p(s)$ so as to ensure time matching for a speed difference component between the model and the actual vehicle. However, the signal used for feedback control also contains this dead time delay, so that an error occurs under conditions where a torque command changes rapidly. Therefore, it is required to remove high-frequency components with a prefilter.

In the system of the fourth embodiment, the difference component between the observer model and the actual vehicle is time-matched using a delay, as in patent document 2. However, the vibration suppression control component resulting from the torque command is a signal containing no delay. Accordingly, the effect of suppressing the vibration component caused by change in the torque command includes no delay in compensation.

From a different point of view, the time delay in speed measurement cannot be corrected, but the command of torque to be generated by the motor can be grasped at the time of control calculation. Also, since the time constant of the vehicle body side is large, fluctuations in measured speed due to disturbance torque are relatively slow, but the motor side speed changes greatly depending on the torque command. Therefore, since the compensation component based on speed measurement is less affected by a delay, time matching by delaying is adopted for the compensation component based on speed measurement. In contrast, the compensation component based on the torque command is configured to contain no delay.

Namely, by time-matching the difference in the disturbance torque observer, it is possible to accurately estimate the disturbance torque and to produce an effect of applying predictive compensation for the dead time when the torque command rapidly changes.

Fifth Embodiment

Figure 11:
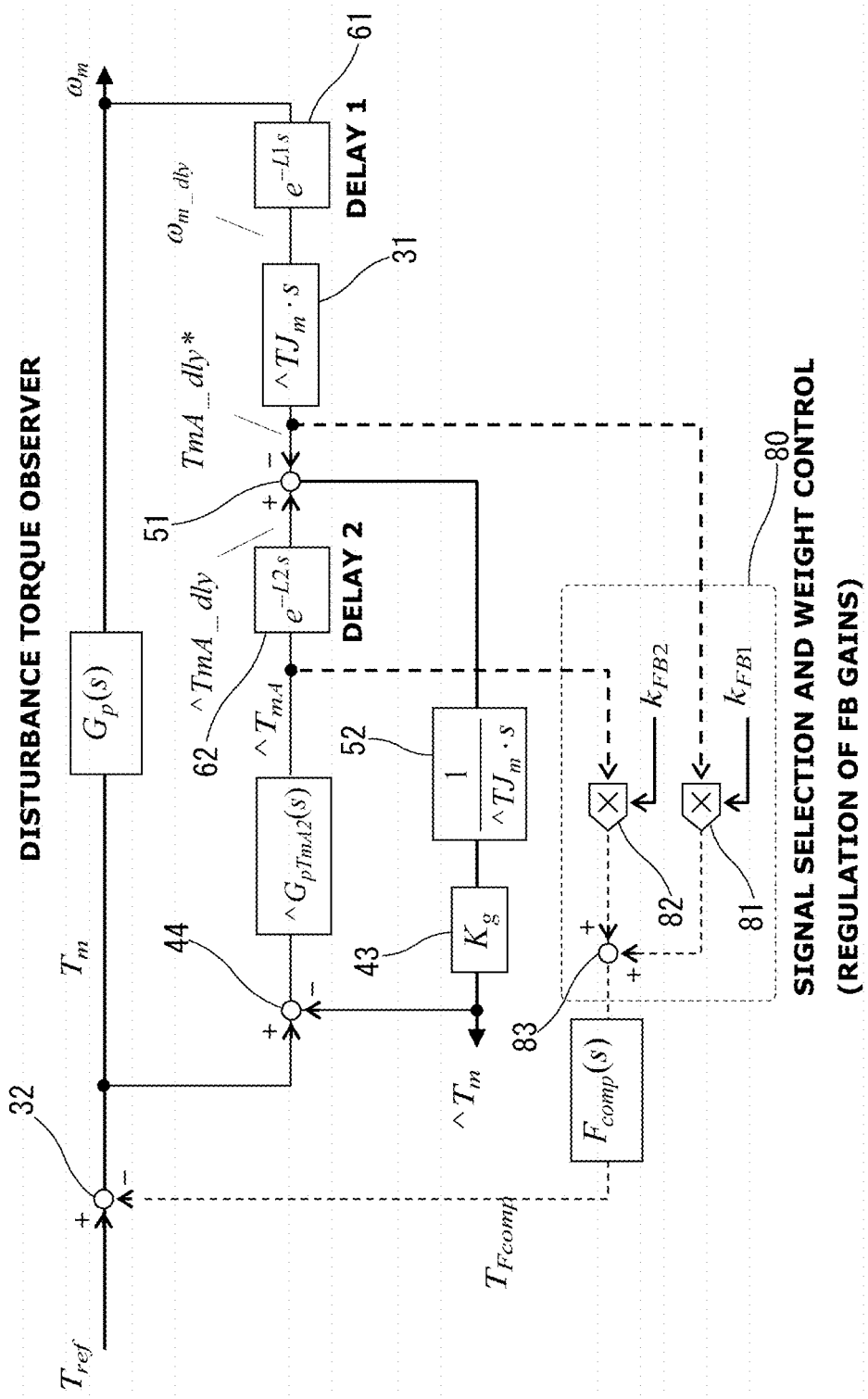
FIG. 11 is a block diagram showing a vibration suppression control device according to a fifth embodiment of the present invention.

FIG. 11 shows an example of configuration according to a fifth embodiment. For input to the bandpass filter $F_{comp}(s)$, a function of switching is added between the system based on the differential component of the measured speed in the first and second embodiments and the system based on the disturbance torque observer in the third and fourth embodiments. When the torque command is fixed to zero, such as at the time of starting, it is desirable to suppress the disturbance on the load side as quickly as possible with high priority. In such a case, the first and second embodiments, which use only speed measurement, are more suitable. Furthermore, there may be special conditions in which the road surface condition changes in synchronization with the resonant frequency. In such a case, it is desirable to improve the response of the compensation signal.

Therefore, as shown in FIG. 11, the second embodiment and the third embodiment are combined, and a configuration is added in which both of the motor-accelerating torque components are weighted and added, thereby adding a function of switching between both signals and a function of gain adjustment.

In FIG. 11, the same parts as in FIG. 9 are denoted by the same reference numerals. A multiplier 81 multiplies the motor-accelerating torque component $T_{mA\_dly}*$ on the speed measurement side (on the output side of the differentiator 31) by a weighting factor $K_{FB1}$. A multiplier 82 multiplies the motor-accelerating torque component $\hat{T}_{mA}$ on the model $\hat{G}_{PTmA2}(s)$ side by a weighting factor $K_{FB2}$. The weighting factors $K_{FB1}$ and $K_{FB2}$ are variable. An adder 83 sums the outputs of the multipliers 81 and 82 and inputs the result of summation to the bandpass filter $F_{comp}(s)$. A signal selection and weight control section 80 is composed of the multipliers 81 and 82 and adder 83.

The function of the fifth embodiment in which the signal selection and weight control section 80 is provided is not limited to FIG. 9, and may be applied to the configurations of FIGS. 7, 8, and 10 as well.

FIG. 11 shows an example of configuration in which a delay 2 (delay part 62) is provided. The configuration of FIG. 11 may be replaced with a configuration without the delay 2.

By relative increase and decrease with time, it is possible to switch slowly between the two types of signals (control systems). Furthermore, by increasing or decreasing the sum of the two types of weighting coefficients, it is possible to adjust the amount of feedback of the vibration suppression control.

According to the example of configuration of the fifth embodiment, immediately after the inverter in the motor drive device is released from its gate cutoff state (in which all switching elements of the inverter are cut off), which corresponds to engine starting, the system is preferably operated to carry out the vibration suppression control based on speed measurement according to the first embodiment, thereby suppressing the disturbance quickly. After the state of the disturbance torque observer is stabilized, the switching weighting coefficients $K_{FB1}$ and $K_{FB2}$ may be gradually shifted to the system according to the third and fourth embodiments. By shifting the coefficients linearly with time, it is possible to prevent shocks due to switching of the control system.

<Results of Verification of Behavior and Effects of Embodiments>

Since it is an object of the present invention to improve characteristics of vibration suppression control, behavior and effects are verified by investigating transient responses such as step responses through numerical simulations.

Figure 12:
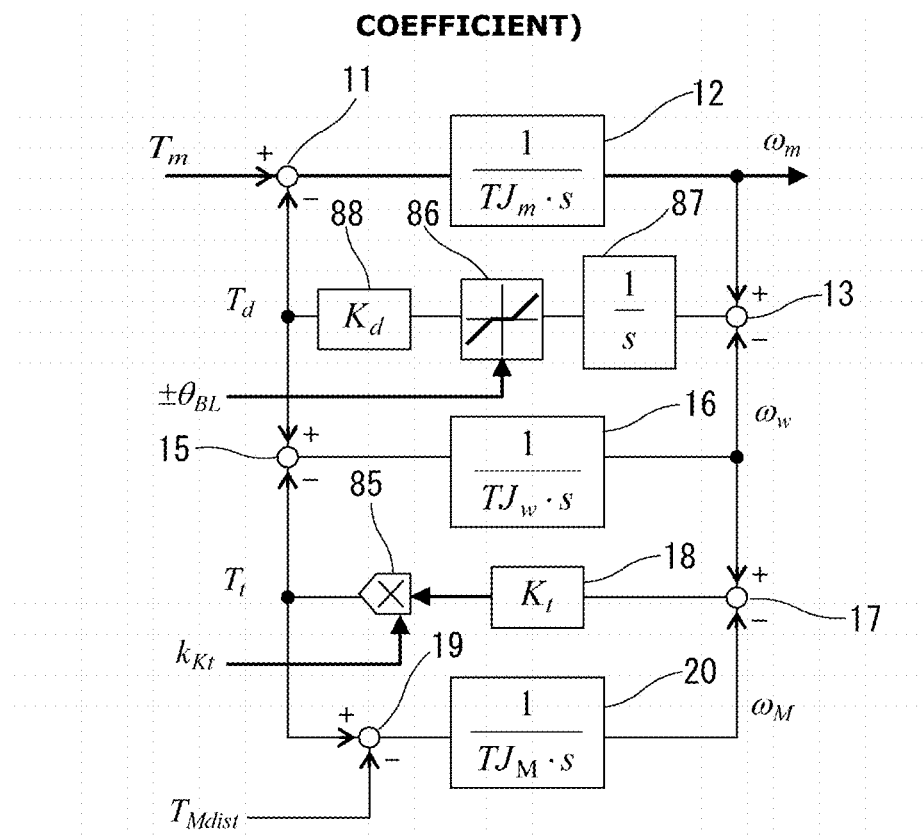
FIG. 12 is a block diagram showing a simulated plant model for verification.

FIG. 12 shows a model used as an actual plant. The configuration of FIG. 12 employs a detailed model system $G_p(S)$ based on the configuration of FIG. 1, wherein a load torque caused by the gradient of a road surface is represented by $T_{Mdist}$ (corresponding to $T_F$ in FIG. 1), and changes in the road surface friction coefficient are simulated by adding a multiplier 85 for multiplication by an adjustment coefficient $K_{Kt}$ after multiplication by the tire coefficient in the $K_t$ block 18.

Gear backlash is simulated by adding a phase nonlinear function (backlash phase$\pm\theta_{BL}$) part 86 to the torsional phase of the elastic shaft. The $G_d(s)$ (=$K_d$/s) block 14 in FIG. 1 is composed of an integrator 87 and a $K_d$ block 88 separated from each other. This model is solely employed as the plant, wherein set values are changed for switching of presence/absence of disturbance, presence/absence of coefficient change, and presence/absence of backlash.

The parameters of this plant model are set by the per-unit system, to define a virtual model having a resonant frequency of 10 Hz and an anti-resonant frequency of 1.5 Hz, for investigation of characteristics of compensation. The tire coefficient is set large as $K_t$=25.0 p.u.

Figure 13:
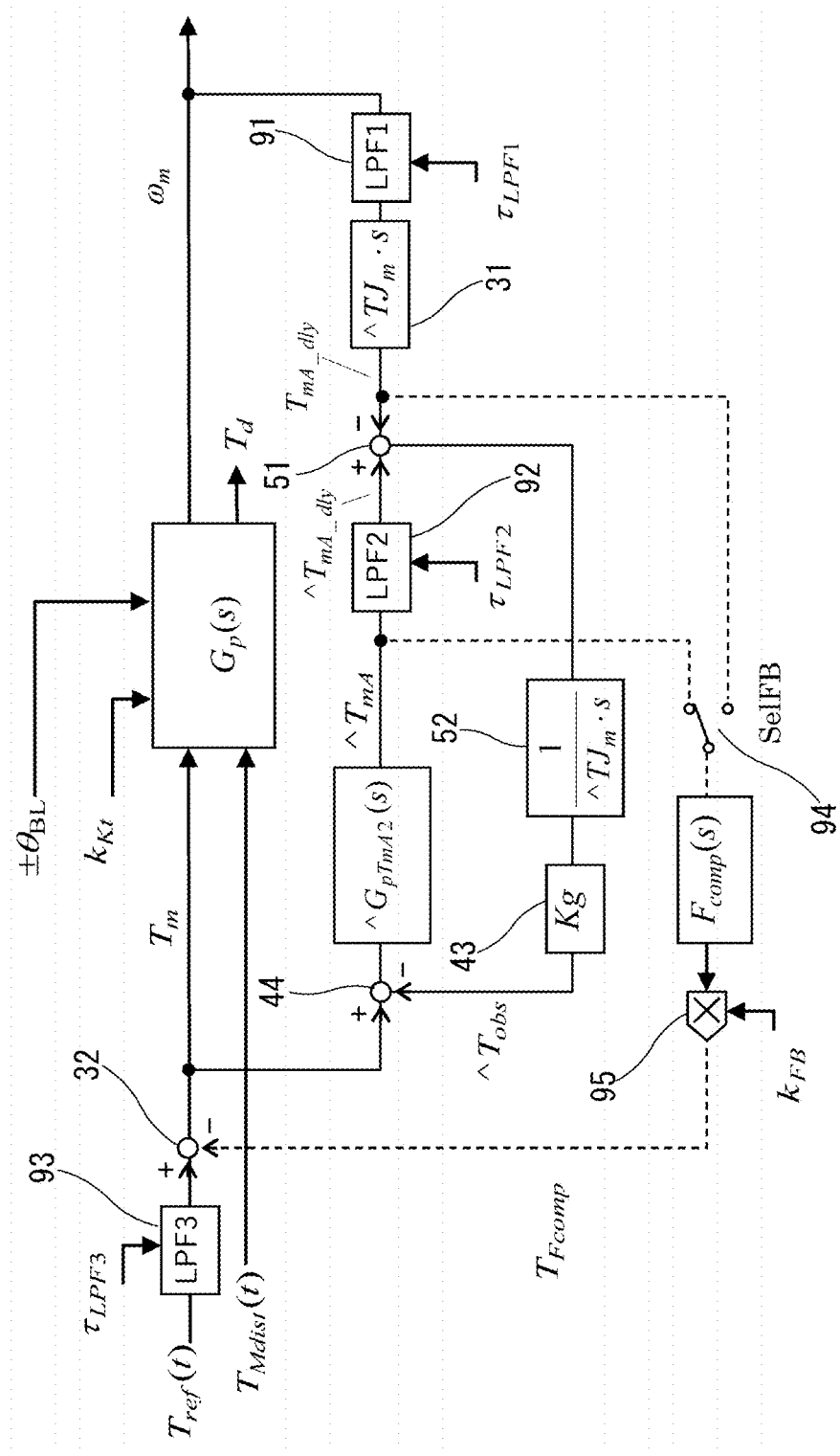
FIG. 13 is a block diagram showing a simulation model for verification of effects of a vibration suppression control employing a disturbance torque observer.

The control system is configured as shown in FIG. 13. The configuration of FIG. 13 is produced by modifying the configuration FIG. 11 partly as follows. The plant model $G_p(S)$ receives input of the backlash phase$\pm\theta_{BL}$, the adjustment coefficient $K_{Kt}$ for road surface change, and the disturbance force (equivalent torque) $T_{Mdist}(t)$ applied to the vehicle body. The delay parts 61, 62 are replaced with low-pass filters 91 and 92 (LPF1 and LPF2) with time constants $T_{LPF1}$ and $T_{LPF2}$. A low-pass filter 93 (LPF3) with a time constant $T_{LPF3}$ is provided between the input torque command $T_{ref}(t)$ and the subtractor 32. Furthermore, the signal selection and weight control section 80 is replaced with a SelFB switch 94 for switching between $\hat{T}_{mA}$ and $T_{mA\_dly}$ for input to the bandpass filter $F_{comp}(s)$. A multiplier 95 is provided on the output side of the bandpass filter $F_{comp}(s)$ for multiplying by a weighting coefficient (gain correction value) $K_{FB}$.

Basically, the first to fourth embodiments can be simulated by this configuration. Feedback compensation can be invalidated by setting $K_{FB}$ to zero, wherein $K_{FB}$ is to be multiplied by the vibration suppression control component. Switching between the configuration of the first and second embodiments and the configuration of the third and fourth embodiments can be performed by switching the SelFB switch 94. The time matching of the disturbance torque observer is simulated by the first order delay filters LPF1 (91) and LPF2 (92). The LPF characteristics can be equivalently disabled by setting the time constants $T_{LPF1}$ and $T_{LPF2}$ to 0 s.

Elements in FIGS. 12 and 13 are as follows.

$T_{ref}(t)$: an input torque command, $T_{mdist}(t)$: a disturbance force applied to vehicle body (equivalent torque), $G_p(S)$: a plant model simulating a vehicle (FIG. 12), $\pm\theta_{BL}$: a gear backlash phase of an actual model (when set to zero, it means no backlash), $K_{Kt}$: an adjustment coefficient for variation in the road surface of the actual model (1.0: the friction of the actual road surface matches the model; <1: when the road surface is in a slip state), $\hat{G}_{PTmA2}(S)$: a disturbance torque observer model (mathematical expression (12)), $\Delta TJ_m$: a time constant equivalent to the rotational inertia of the model, $K_g$: a feedback gain of the disturbance torque observer, $F_{comp}(S)$: a filter section for vibration suppression control (mathematical expression (13), $\zeta_A=1$), $K_{FB}$: a gain correction for a feedback component of vibration suppression control (when set to zero, it means no compensation), LPF1: a low-pass filter simulating a speed measurement delay ($T_{LPF1}$: a time constant; $T_{LPF1}=0$ means no delay), LPF2: a low-pass filter inside the observer for matching with the speed measurement delay ($T_{LPF2}$: a time constant; $T_{LPF2}=0$ means no delay), $\hat{T}_{obs}$: an estimated torque by the disturbance torque observer, $T_{Fcomp}$: a compensation torque component by the vibration suppression control, $T_{mA\_dly}$: a differential component of a measured motor speed on the actual plant side (with a delay), and $\hat{T}_{mA}$, $\hat{T}_{mA\_dly}$: a differential component of a measured motor speed on the model side (with no delay; with a delay).

Figure 14:
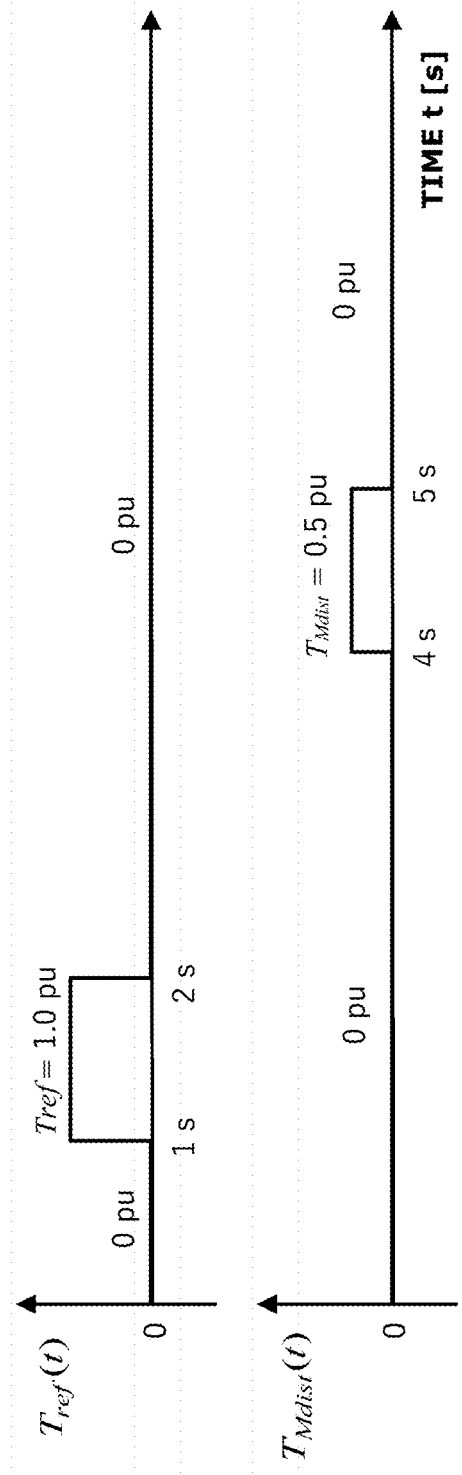
FIG. 14 is an explanatory diagram showing a pattern of an input torque command and a load disturbance used for simulation.

In order to investigate transient response characteristics, an input pattern of input torque command $T_{ref}(t)$ and load disturbance torque $T_{Mdist}(t)$ is set as shown in FIG. 14. This is an example of characteristics for evaluating: characteristics of response of the torque command; the vibration component when the reaction force applied to the vehicle body is changed transiently; and effects of backlash when the torque is returned to zero.

t=1.0 s to 2.0 s: acceleration with 100% torque, t=2.0 s to 4.0 s: coasting with 0% torque, t=4.0 s to 5.0 s: deceleration by reaction force of 50% torque (uphill gradient), and t=5.0 s~: reaction force of 0% torque; coasting.

However, the actual torque command does not have such a steeply changing step waveform. Accordingly, the low-pass filter 93 (LPF3) (10 ms) is added to soften the rise a little. As described below, the output of this filter 93 is indicated by a waveform labeled as "$T_{refLp}$".

In order to simulate the characteristics of the first to fourth embodiments, set values are combined as shown in Table 1 below.

TABLE 1

Figure 16:
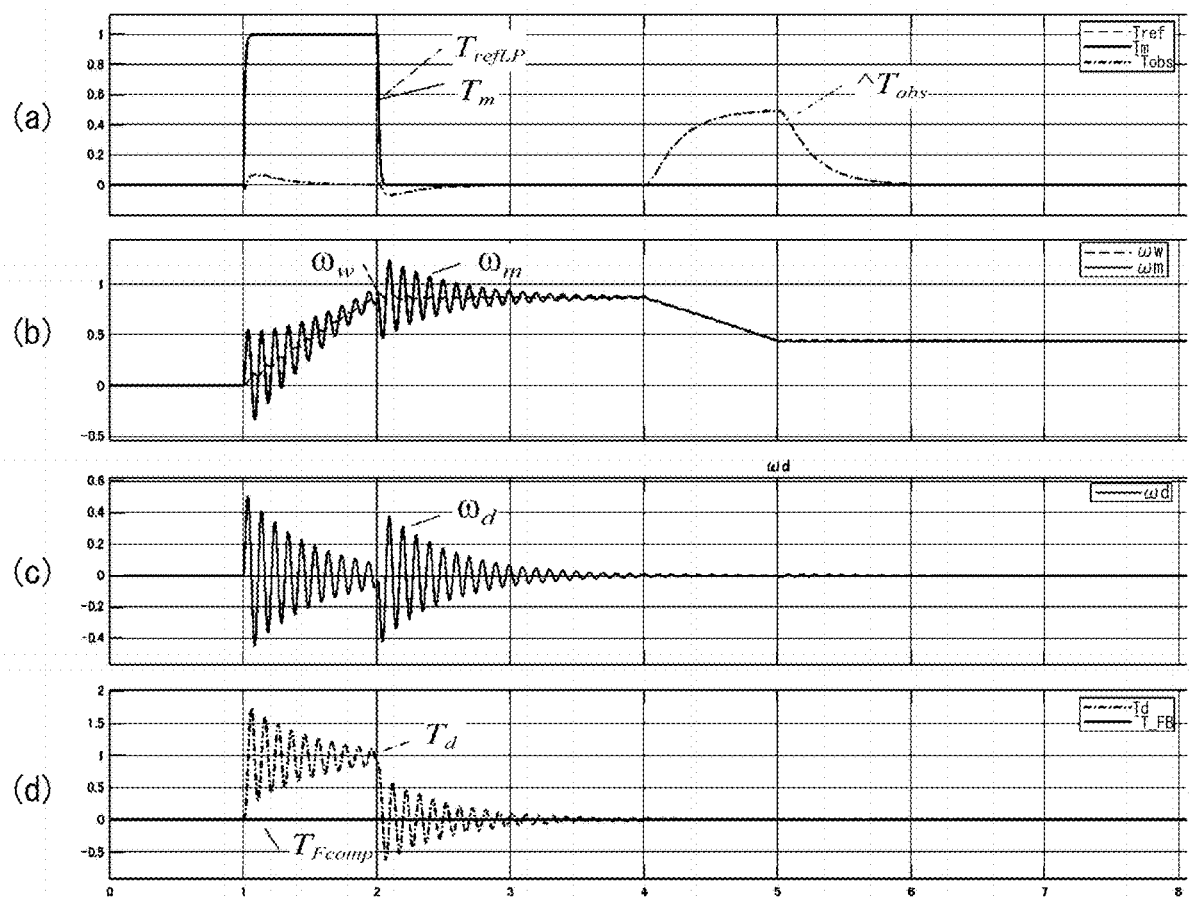
FIG. 16 is an explanatory diagram showing a result of simulation where no vibration suppression control is performed.
Figure 17:
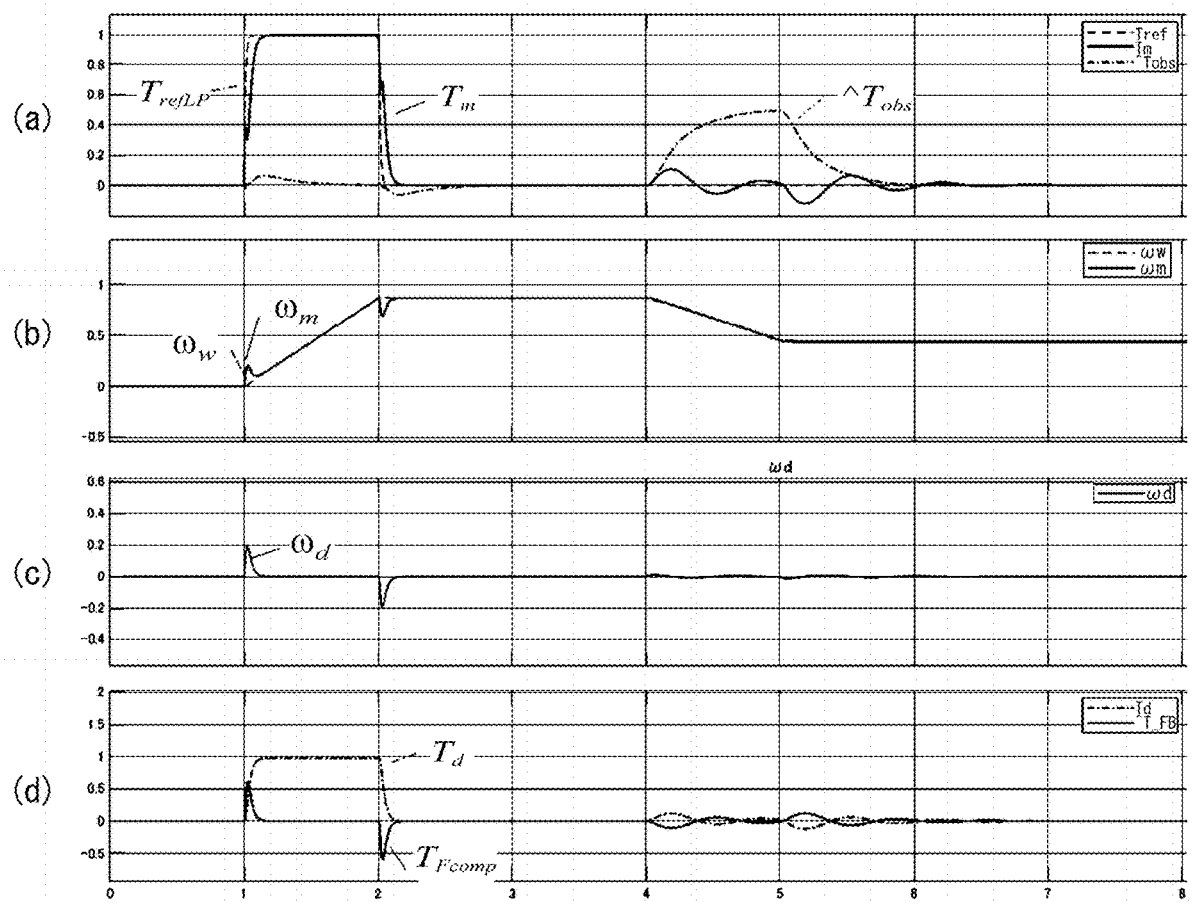
FIG. 17 is an explanatory diagram showing a result of simulation where the first embodiment of the present invention is employed.
Figure 18:
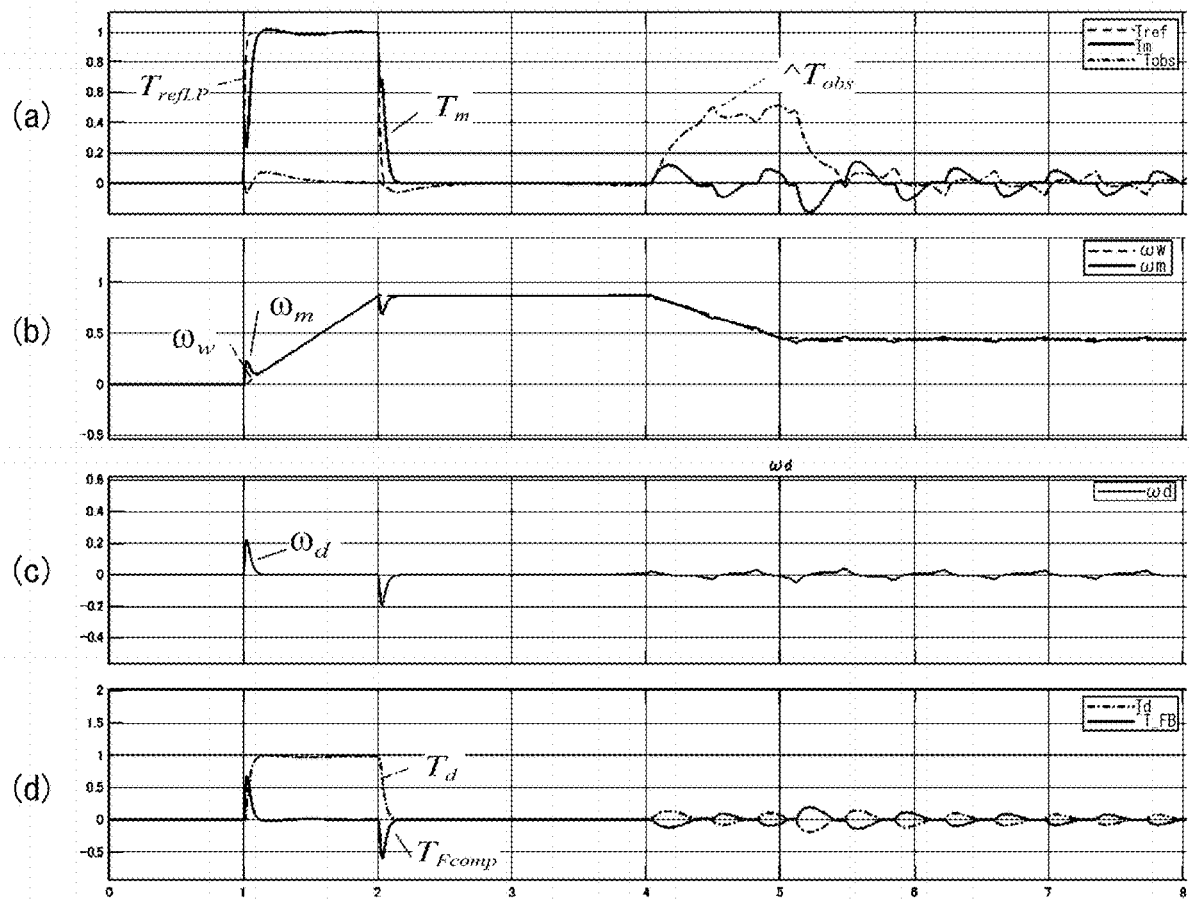
FIG. 18 is an explanatory diagram showing a result of simulation where the first embodiment of the present invention is employed and the influence of gear backlash components is taken into account.
Figure 19:
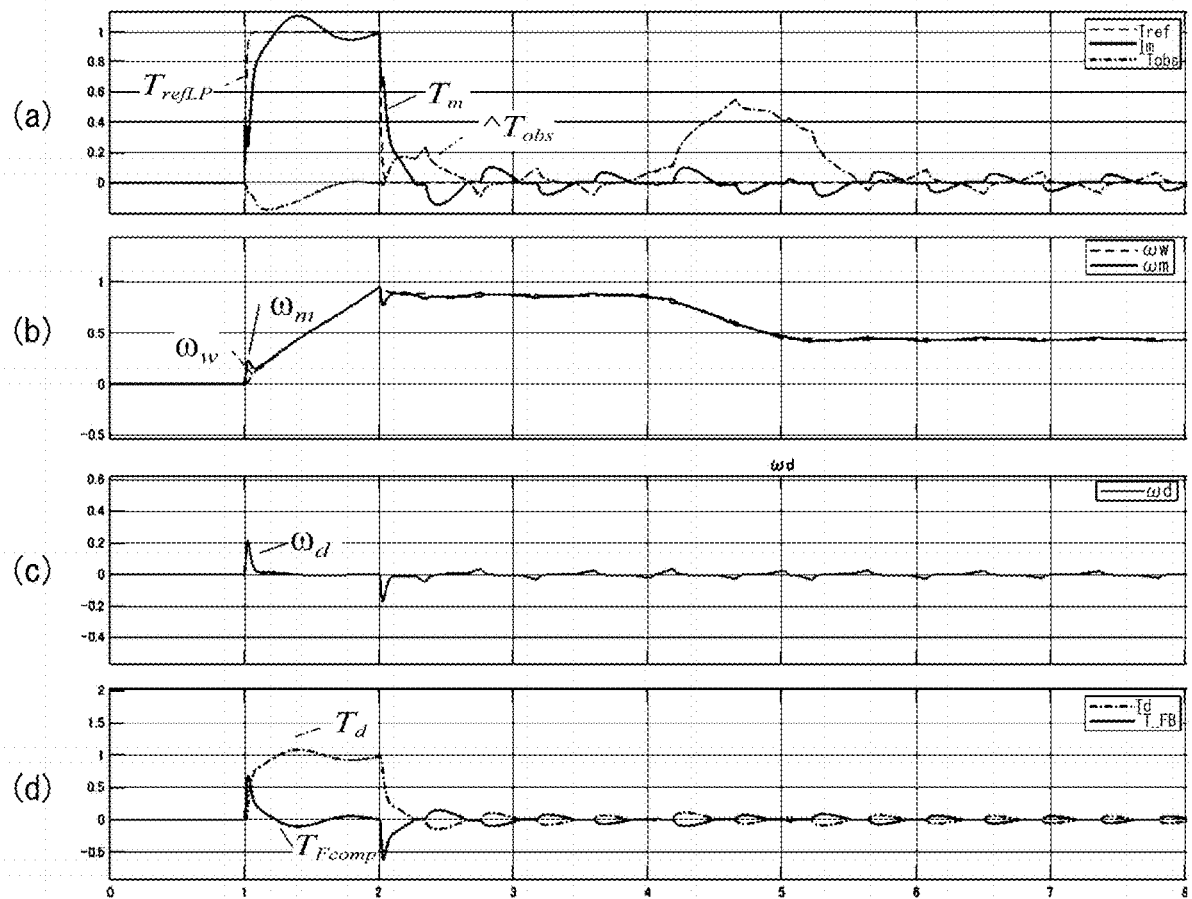
FIG. 19 is an explanatory diagram showing a result of simulation where tire slip is taken into account in addition to the condition of FIG. 18.
Figure 20:
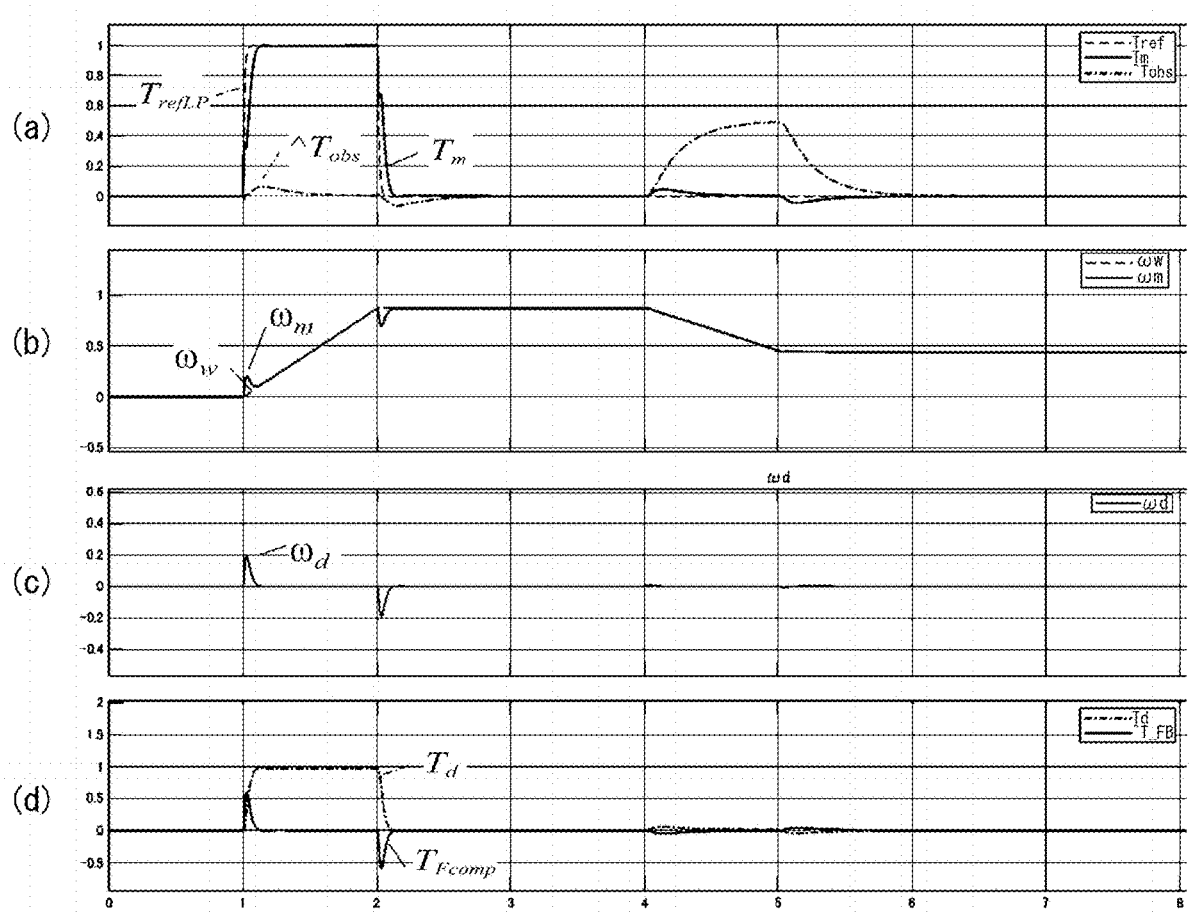
FIG. 20 is an explanatory diagram showing a result of simulation where the third embodiment of the present invention is employed.
Figure 21:
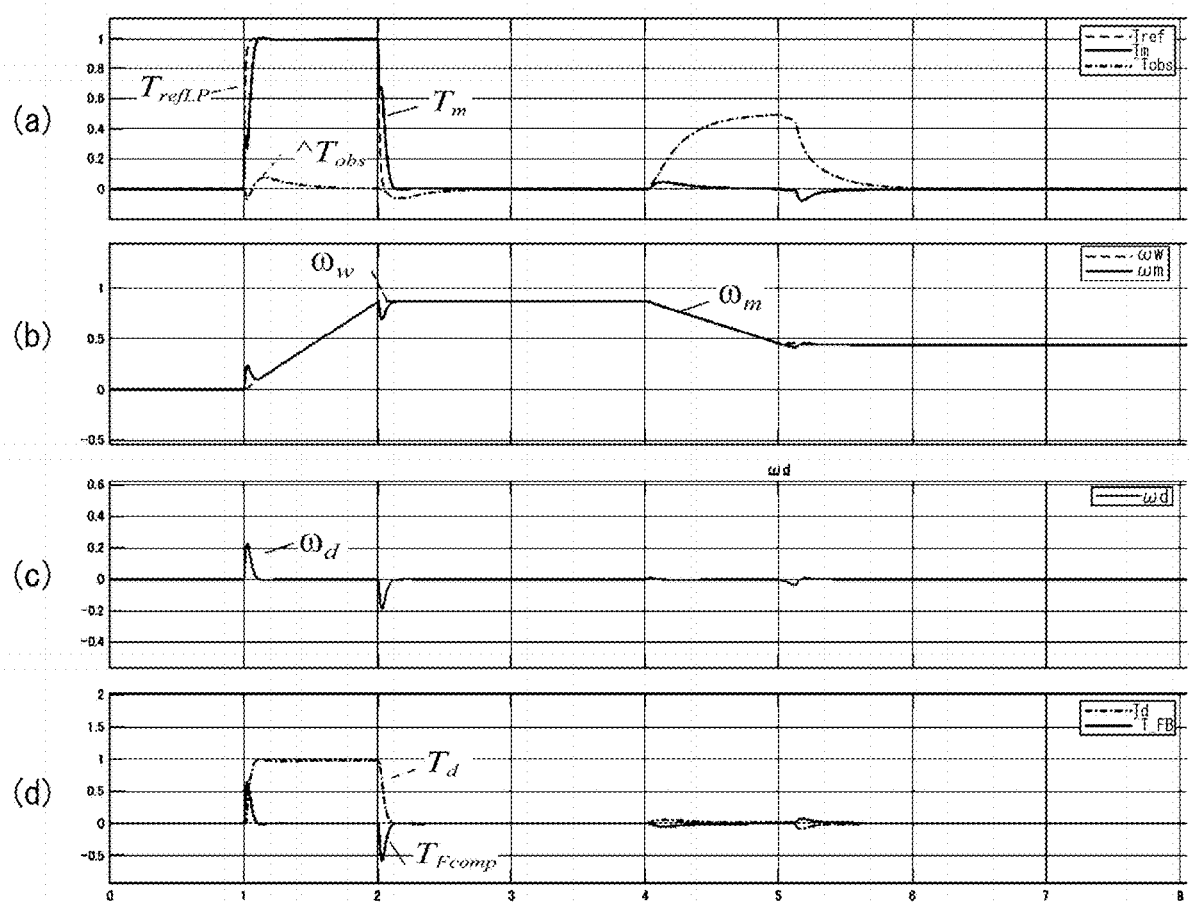
FIG. 21 is an explanatory diagram showing a result of simulation where the third embodiment of the present invention is employed and the influence of gear backlash components is taken into consideration.
Figure 22:
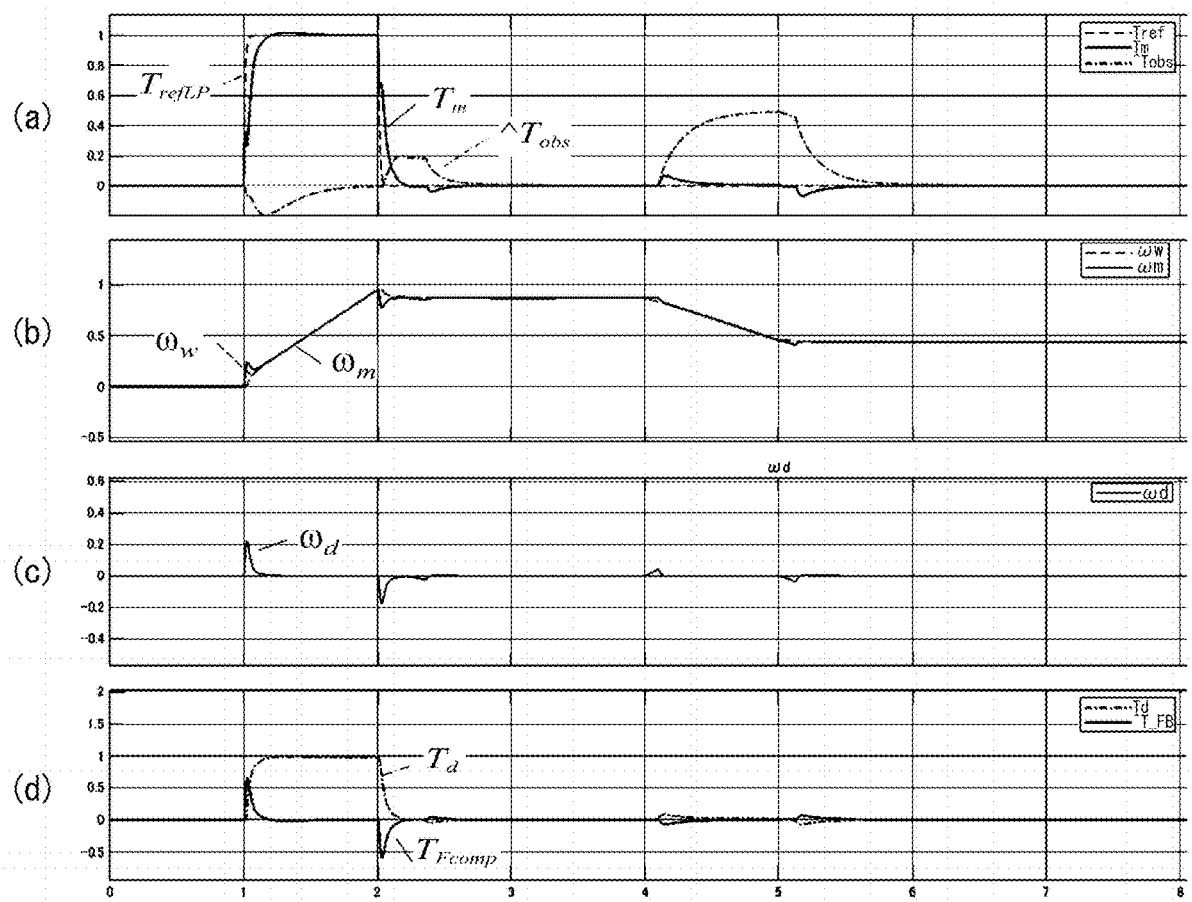
FIG. 22 is an explanatory diagram showing a result of simulation where tire slip is taken into account in addition to the condition of FIG. 21.

| | $\pm\theta_{BL}$ | k_Kt | TLPF3 | SelFB | $K_{FB}$ | $T_{LPF1}$ | $T_{LPF2}$ | to be studied |
|---|---|---|---|---|---|---|---|---|
| FIG. 16 | 0 | 1.0 | 5 ms | — | 0 | — | — | no vibration suppression control |
| FIG. 17 | 0 | 1.0 | 5 ms | TmAdet | 1.0 | 0 | 0 | vibration suppression control (speed measurement and differentiation system, without backlash, without tire slip) |
| FIG. 18 | ±0.001 | 1.0 | 5 ms | TmAdet | 1.0 | 0 | 0 | vibration suppression control (speed measurement and differentiation system, with backlash, without tire slip) |
| FIG. 19 | ±0.001 | 0.3 | 5 ms | TmAdet | 1.0 | 0 | 0 | vibration suppression control (speed measurement and differentiation system, with backlash, with tire slip) |
| FIG. 20 | 0 | 1.0 | 5 ms | TmAobs | 1.0 | 0 | 0 | vibration suppression control (torque observer system, without backlash, without tire slip) |
| FIG. 21 | ±0.001 | 1.0 | 5 ms | TmAobs | 1.0 | 0 | 0 | vibration suppression control (torque observer system, with backlash, without tire slip) |
| FIG. 22 | ±0.001 | 0.3 | 5 ms | TmAobs | 1.0 | 0 | 0 | vibration suppression control (torque observer system, with backlash, with tire slip) |

TABLE 1-continued

Figure 23:
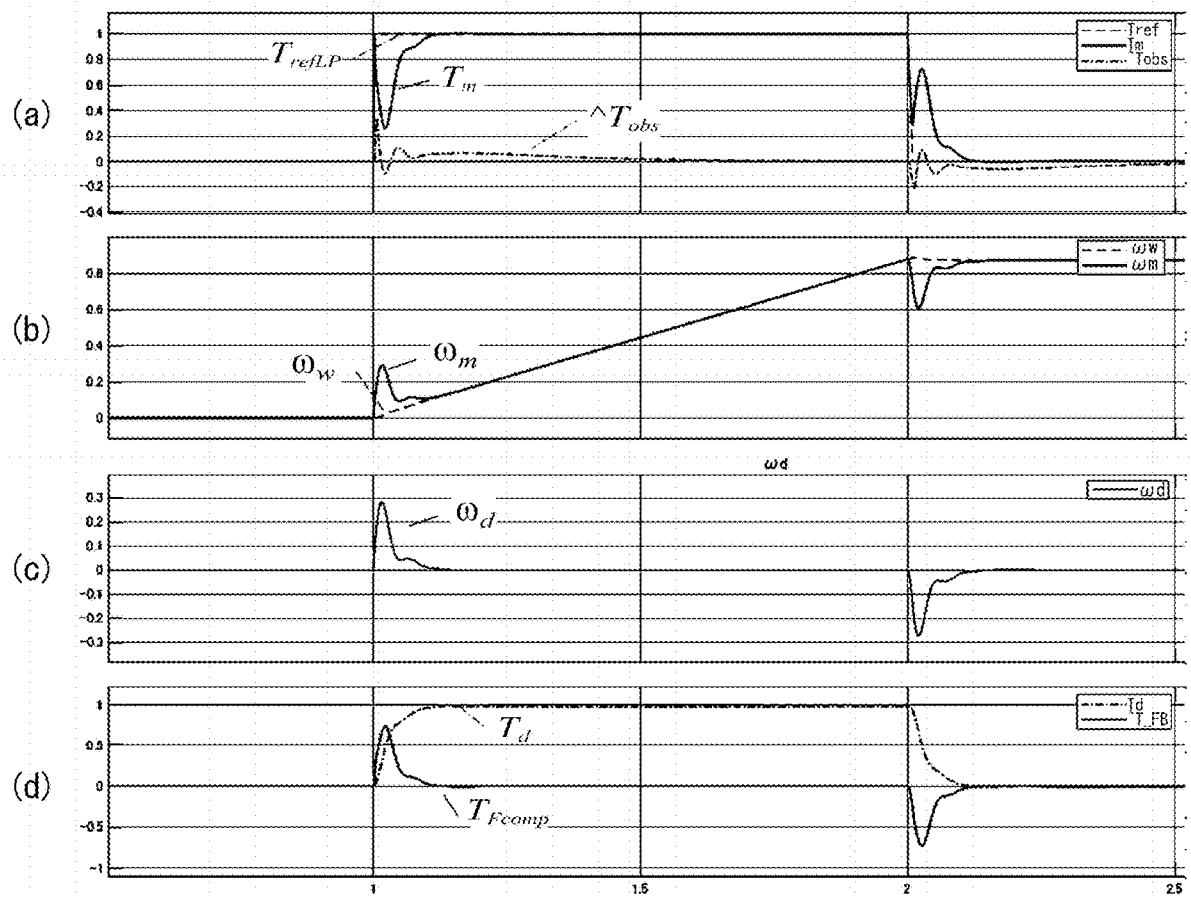
FIG. 23 is an explanatory diagram of a result of simulation where the third embodiment of the present invention is employed, the influence of gear backlash components is taken into consideration, and a delay time in electric current control and speed measurement is simulated and added as LPF1.
Figure 24:
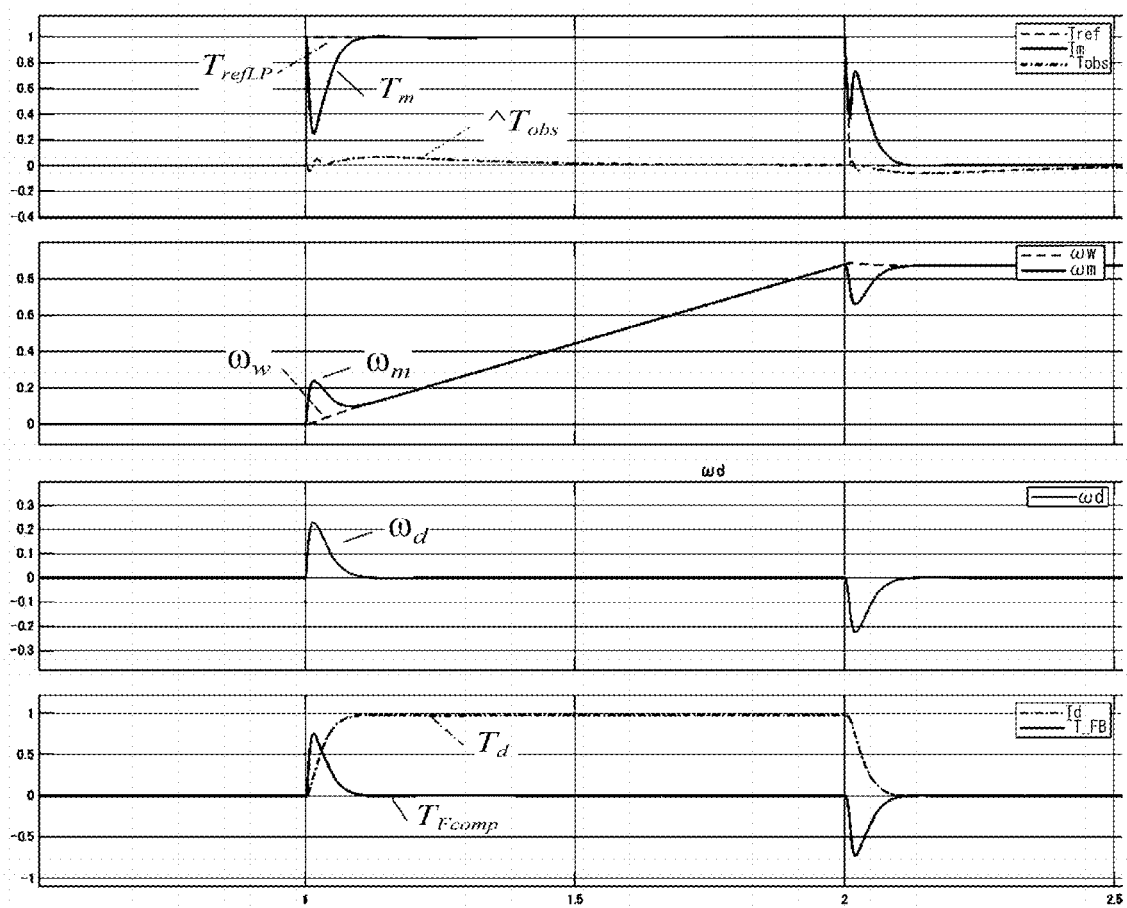
FIG. 24 is an explanatory diagram showing a result of simulation where the fourth embodiment of the present invention is employed, and a delay time on the approximate model side and a delay time on the speed measurement side are matched with each other.

|  | ±θ$_{BL}$ | k_Kt | TLPF3 | SelFB | K$_{FB}$ | T$_{LPF1}$ | T$_{LPF2}$ | to be studied |
|---|---|---|---|---|---|---|---|---|
| FIG. 23 | ±0.001 | 1.0 | 0 ms | TmAobs | 1.0 | 5 ms | 0 | vibration suppression control (torque observer system, with backlash, without tire slip, with delay in speed measurement, without time compensation) |
| FIG. 24 | ±0.001 | 1.0 | 0 ms | TmAobs | 1.0 | 5 ms | 5 ms | vibration suppression control (torque observer system, with backlash, with tire slip, with delay in speed measurement, with time compensation) |

<Behavior and Effects of Vibration Suppression Control Using Model Approximated to Two-Inertia System and Speed Measurement Information (First Embodiment)>

Figure 15:
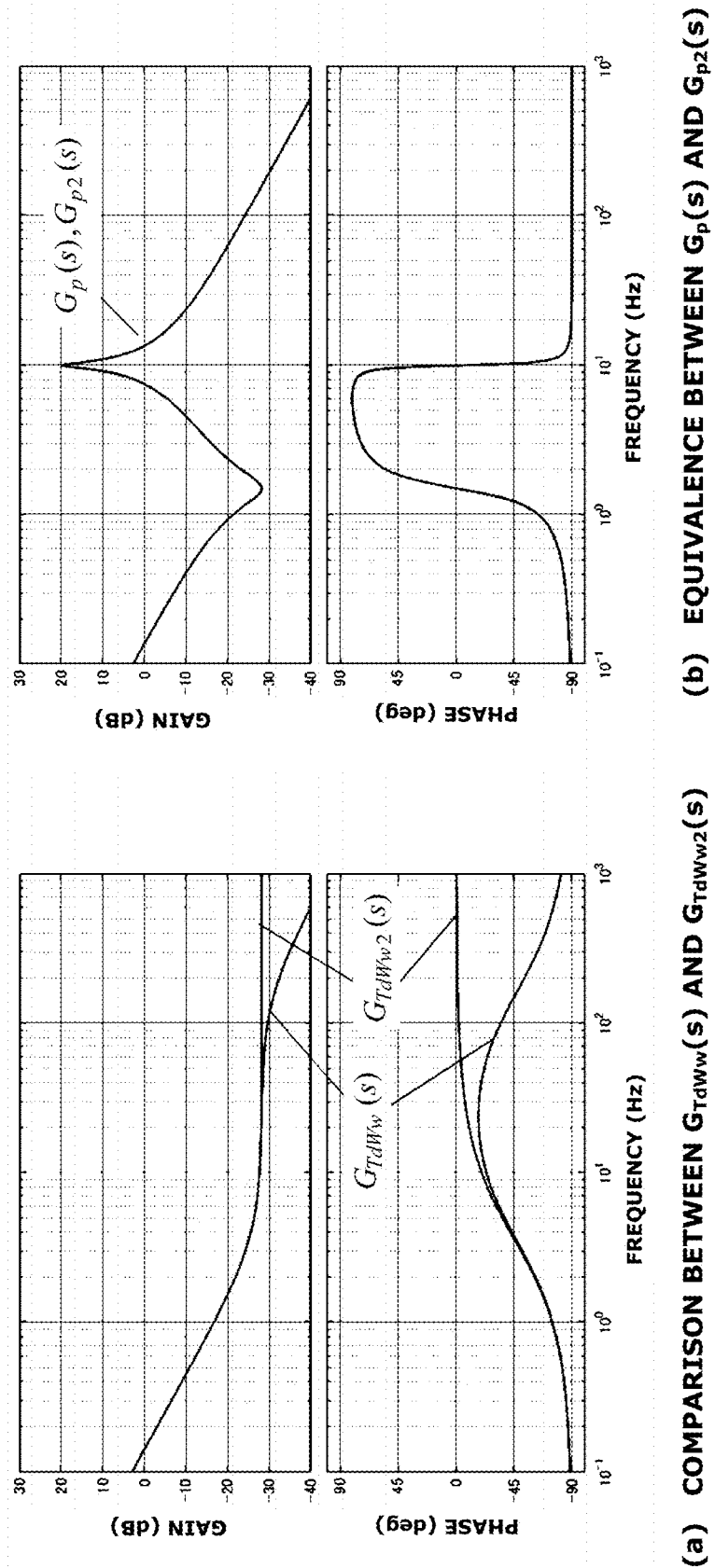
FIG. 15 is a Bode diagram of a conventional high order (third order) model and a second order approximate model used in the first embodiment.

FIG. 15 demonstrates validity of the model approximation employed in the first embodiment, where the characteristics of $G_{TdWw}(s)$ in mathematical expression (2) and the characteristics of $G_{TdEw2}(s)$ in mathematical expression (7) are compared in Bode diagrams. As can be seen from FIG. 15 (a), a difference in gain occurs at 50 Hz or more. Namely, the difference occurs only in frequency components higher than the resonant frequency of 10 Hz. Furthermore, in FIG. 15 (b), as $G_p(S)$ in mathematical expression (3) and $G_{p2}(S)$ in mathematical expressions (10) and (11), each of which is a transfer function from the motor input torque to the motor speed, are compared, it can be seen that the characteristics of the two almost overlap with each other, and the error of the approximate model is small, and this approximate model can also be used for control.

FIG. 16 shows characteristics when the vibration suppression control is disabled ($K_{FB}$=0) for comparison with the first embodiment. In FIG. 16, the motor rotational speed corn, the relative torsional speed $ω_d$ and torsional torque $T_d$ of the elastic shaft, etc., each show a large vibration around 10 Hz near the resonant frequency, after a change in the torque command, wherein damping is slow.

On the other hand, FIG. 17 shows a response when the vibration suppression control according to the first embodiment and the design method using the approximate model are employed. As compared with FIG. 16, vibration does not occur even when the torque command changes rapidly. Immediately after the start of acceleration at time instant 1 s, the motor speed $ω_m$ increases for a short period of time in order to generate a torsional phase of the elastic shaft corresponding to the input torque. However, when the torsional phase, namely, the transmitted torque $T_d$, has reached a target value, then the motor speed W m returns to a normal line, and thereafter increases in conformance with the tire speed ωw. From this behavior, it can be confirmed that the vibration due to resonance is suppressed and the acceleration is stabilized. This is also true when the torque command returns to zero at t=2 s.

However, when a disturbance force is applied to the vehicle body at t=4 s, the compensation torque component $T_{Fcomp}$ oscillates. Vibration occurs in the motor speed corn as well, although the amplitude of the vibration is small. The speed fluctuation is thus amplified by the vibration suppression control. The vibration component caused by this disturbance is a frequency component considerably lower in frequency than that in FIG. 16 and near the anti-resonant frequency of 1.5 Hz.

The following two effects can be confirmed with reference to such change characteristics of the torque command and the disturbance torque. First, even when the vibration suppression control is configured by approximating FIG. 1 as shown in FIG. 2 like a two-inertia system, it is possible to produce an adequate effect of vibration suppression with respect to changes in the torque command. Second, it has a disadvantage of generating low-frequency vibrations near the anti-resonant frequency in response to disturbance torque. This means that it is required to modify the method for designing the compensation filter of mathematical expression (13) or add a disturbance suppression function. Therefore, the latter disturbance suppression function is proposed.

<Behavior and Effects of Load Disturbance Torque Observer (Second Embodiment)>

In FIGS. 16 and 17 shown in the previous section, only the estimation function of the disturbance torque observer in the configuration of FIG. 6 using the approximate model in FIG. 3 is enabled ($K_g$≠0). With reference to behavior of estimation of the estimated disturbance torque ˆ$T_{obs}$ indicated by dashed-dotted lines in FIGS. 16 and 17, it is confirmed that the disturbance torque can be stably estimated, where a small component occurs at t=1 s and at t=2 s but vanishes soon, although there is a response delay when the disturbance torque is started and released at t=4 s and at t=5 s.

As described above, the vibration caused by disturbance torque, which is a problem of vibration suppression control, is affected by the inertia of the vehicle to be a low frequency component. In order to produce a response enough to compensate for the low frequency component, K g is set. Therefore, it can be seen that even with the configuration of the second embodiment, the disturbance torque observer can perform a normal estimating action.

<Behavior and Effects of Vibration Suppression by Disturbance Torque Observer (Third Embodiment)>

Before describing effects of the third embodiment, the following describes examples of waveforms for explaining two types of problems to be solved.

First, the following describes effects of backlash. When the gear backlash component (≠θ$_{BL}$≠0) is set in the model of the actual plant under the conditions of FIG. 17 in which the first embodiment is employed, the characteristics vary as shown in FIG. 18. When the torque command changes, the vibration can be suppressed in the same manner as in FIG. 17. However, after the disturbance torque occurs at t=4 s, an abnormal vibration, in which hunting continues, occurs. This is because when the torque command is equal to zero, a backlash, namely, a special state, in which tooth faces of the gears are out of contact with each other, occurs. This causes a problem of continuous low-frequency vibration.

Next, the following describes the effect of model errors. When the friction of the road surface is further reduced and only the tire coefficient is changed to 0.3 times ($K_{Kt}$=0.3) with respect to the condition of FIG. 18, the characteristics vary as shown in FIG. 19. During the period from t=1 s to t=2 s, it is not in a backlash region, because the torque command is applied, but there is a problem of low frequency vibration due to model errors. Furthermore, when the torque command returns to zero at and after t=2 s, hunting occurs due to backlash with this disturbance as a vibration source.

In summary, the systems of the first and second embodiments have problems of two types of low-frequency vibration phenomena, namely, the hunting phenomenon due to backlash, and the influence of model errors. These problems are addressed by the third embodiment.

Also in FIGS. 18 and 19, only the estimation function of the disturbance torque observer is enabled. Although not yet used for control, the estimated disturbance torque $\hat{T}_{obs}$ contains not only the disturbance torque but also the vibration torque component described above. In view of the characteristics of estimation, it is expected that the vibration suppression control using the disturbance torque observer is effective.

The following describes an example of behavior and effects of the third embodiment as compared with characteristics showing the above problems.

First, FIG. 20 shows characteristics when the vibration suppression control system is switched from the first embodiment to the third embodiment under the same ideal plant conditions as in FIG. 17. With respect to changes in the torque command from t=1 s to t=2 s, similar stable characteristics are maintained. Furthermore, the problematic low-frequency vibration near anti-resonance from t=4 s to t=6 s is also suppressed. Therefore, it can be confirmed that the vibration suppression control of the present invention does not cause abnormal low-frequency vibrations.

Next, under the conditions in which only backlash is set as in FIG. 18, stable characteristics are obtained with the system of the present invention as shown in FIG. 21. With respect to changes in the torque command from t=1 s to t=2 s, stable characteristics is maintained. Furthermore, hunting due to backlash that occurs after the input of the disturbance torque after t=4 s is suppressed.

Finally, under the condition where both backlash and model errors exist as in FIG. 19, characteristics shown in FIG. 22 are obtained with the system of the present invention. The low-frequency vibration while the torque command is inputted from t=1 s to t=2 s, which is the issue in the configuration of FIG. 19, is suppressed significantly. No vibration occurs due to backlash after t=2 s. With reference to the estimated disturbance torque $\hat{T}_{obs}$ during this period, it can be inferred that the disturbance estimation function contributes to vibration suppression, because the disturbance estimation works in contrast to the situation where there is no model error. After t=4 s, stability is maintained as in FIGS. 20 and 21.

<Behavior and Effects of Vibration Suppression Control where Time Matching with Speed Measurement is Added to Disturbance Torque Observer (Fifth Embodiment)>

FIG. 23 shows an example of characteristics when a delay time in electric current control and speed measurement is simulated as LPF1 ($T_{LPF1}$) under the same condition in which only backlash is set as in FIG. 18. The vibration suppression control remains the same as in the third embodiment, and LPF2 is set to no delay ($T_{LPF2}$=0) because the time matching measure is not yet adopted on the observer side. In order to clarify the characteristics of the problem, the time constant of LPF3 inserted in the torque command input section is also changed to zero ($T_{LPF3}$=10 ms→0 ms), and the torque command is rapidly changed stepwise. Since the effect of improving the characteristics appears when the torque command changes, the waveforms are drawn as enlarged in the time axis direction only during the period of t=0.5 s to 2.5 s. Since there is only a low frequency component at the time of disturbance torque, there is no difference in stability, which is omitted.

In FIG. 23, there is a problem that an error occurs in the estimated torque of the observer due to the influence of the delay time in speed measurement.

After rapid changes in the command at t=1 s and t=2 s, distortion and residual vibration of about one cycle appear in the pulse-like waveform of the estimated disturbance torque $\hat{T}_{obs}$. Accordingly, the waveform of vibration suppression compensation $T_{Fcomp}$ after t=2 s does not immediately return to zero, and is distorted stepwise in a converging waveform due to an estimation error. As a result, this distortion is also superimposed on the waveform of the torque command $T_m$ that is outputted to the motor drive section.

FIG. 24 shows characteristics when the compensation for the delay in speed measurement as shown in FIG. 9 is adopted to FIG. 23. Specifically, the delay time of LPF2 on the model side is set equal to the delay time of LPF1 on the speed measurement side ($T_{LPF2}$=$T_{LPF1}$=5 ms). With this time delay matching, the vibration components in the waveforms of the estimated disturbance torque $\hat{T}_{obs}$ and the vibration suppression compensation $T_{Fcomp}$ are suppressed, so that the output torque command $T_m$ has a smooth waveform containing no overshoot, no distortion, and no vibration. Therefore, it can be confirmed that the characteristics of the vibration suppression control can be improved by matching the motor-accelerating torque of the observer and the differential component of the measured speed in terms of time.

Problems in First to Fifth Embodiments (Method for Configuration of Observer, Combination with Speed Measurement System, and Time Matching Measure)

The basic principles described in the first to fifth embodiments are shown with models and transfer functions based on a continuous data system. However, when it is put to practical use, it is required to be implemented to form a digital control. This causes some problems.

To implement the system as a program for a digital arithmetic unit, etc., it is required to transform the system to a sampled data system suitable for digital control. When time is approximated to time values that are discrete by a sampling interval, the discretization causes errors.

For speed measurement, a filter is used to suppress the effects of phase time difference and measurement noise. Since there is a time delay component due to the filter, an error occurs in the observer estimation due to time mismatching as compared with the speed on the model side with no delay. In particular, during transient response, the error becomes large, so that time matching measures are required.

Although details are described below, examples of resonance characteristics are first shown in FIGS. 39, 40, and 41, to facilitate understanding of the problem. These are examples of resonance and its suppression effect when the torque command is changed in a trapezoidal shape. FIG. 39

(A) shows characteristics of acceleration/deceleration when no vibration suppression control is employed. FIG. 39 (B) is a partial view of FIG. 39 (A) enlarged in time. In FIG. 39 (A), (a) shows the torque command and the torsional torque $T_d$ of the driveline shaft, (b) shows the shaft torsional speed, and (c) shows the motor-accelerating torque component $T_{mA}$.

As compared with the data shown in the first to fifth embodiments, the torque command $T_{ref\_LPF}$ is changed to a trapezoidal shape, but breakpoints of the trapezoid still behave as a vibration source to cause overshoots and residual vibrations as resonance phenomena. It can be seen that the steeper the change in the break point, the greater the amplitude of the vibration, which does not attenuate even during acceleration. In the sixth and following embodiments, this is stabilized as shown in FIG. 40 (sixth embodiment) and FIG. 41 (seventh embodiment). When it can be stably controlled, components hidden in the vibration become clear. The waveform of $\Delta\omega_{mW}$ in FIG. 40 (b) shows a speed difference between both ends of the driveline mechanism (speed difference between the motor shaft and the tire axle), and corresponds to a time-differential component of the shaft torsional phase (shaft torsional speed), because backlash is not yet considered. When the transmitted torque of the elastic shaft is increased or decreased at a constant gradient, it is required to increase or decrease the shaft torsional phase, so that it can be seen that the amplitude of the shaft torsional speed is constant.

(Countermeasures Against Backlash Elements in Driveline)

Reduction gears are used in a driveline mechanism of a vehicle. Gears have play called backlash. This occurs in the vicinity of zero torque where the polarity of the motor torque switches between positive and negative, wherein the gear teeth are not meshed, so that the transmitted force, namely, the reaction force to the motor shaft, is also equal to zero. Therefore, if the rotational inertia of the motor is small, the motor speed rapidly increases even if the motor torque is not so large. At an end of a backlash period, the teeth of the gears collide with each other, causing an abnormal vibration and sound called "rattling shock".

Against this phenomenon, a countermeasure has been adopted, in which, when the motor torque command crosses zero, the rate of change of the motor torque command is reduced to lengthen the period of time during which the torque command is small, thereby allowing the teeth to come into contact with each other softly.

Figure 41:
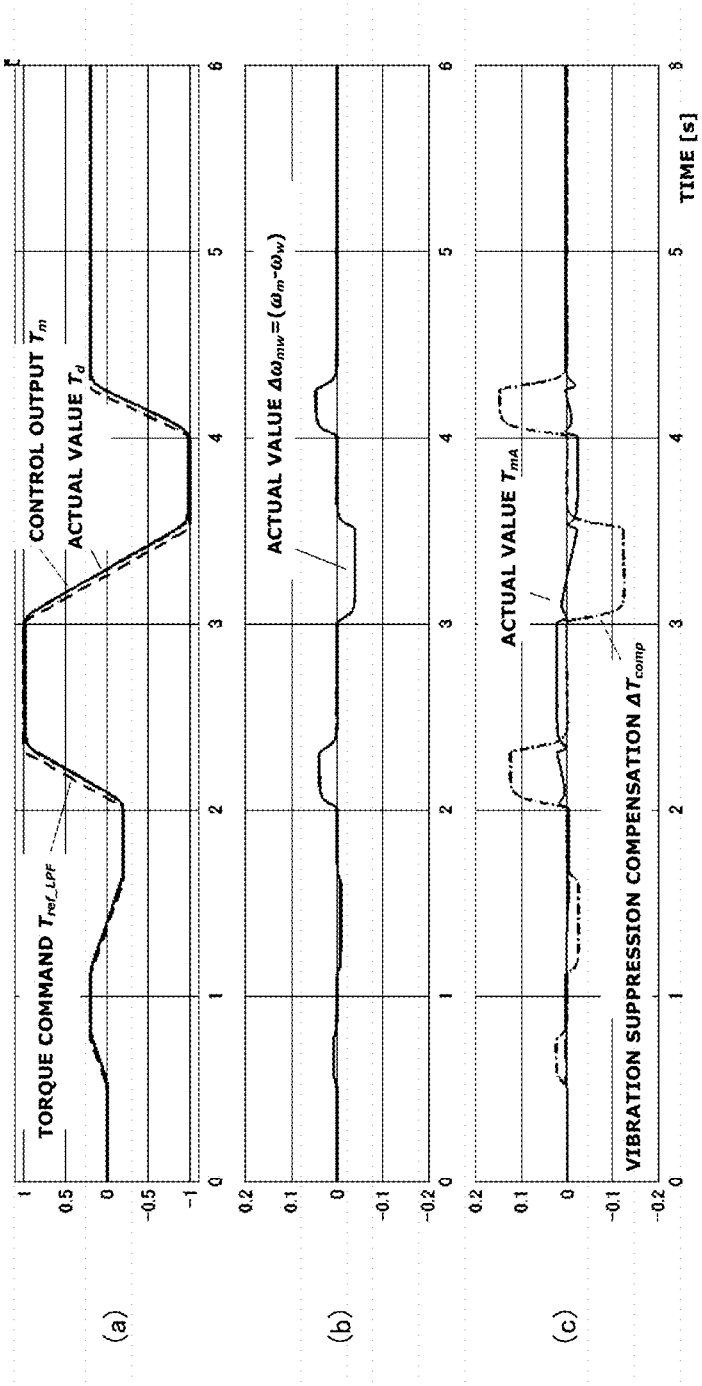
FIG. 41 is a diagram showing characteristics of acceleration/deceleration when the seventh embodiment of the present invention is employed and no backlash is assumed in the actual vehicle.

In FIG. 41 (seventh embodiment), backlash is ignored in both the control and the actual vehicle. In contrast, FIG. 42 is presented for investigating the influence of addition of backlash only in the actual plant side without modification of the control system. In FIG. 42, (a) shows the shaft torsional torque $T_d$ that shows a distortion to stick to zero in the vicinity of the zero-crossing point, due to backlash. In FIG. 42, (b) shows the shaft torsional speed on which a pulse-like waveform, which does not appear in FIG. 41, is superimposed. For clearly indicating where in the pulse the backlash period is, a waveform indicated by a broken line is added as a supplement. Only during the backlash period, the waveform of the shaft torsional speed indicated by a solid line is traced, and except for the backlash period, the value is held. During the period when the solid line and the broken line overlap with each other, backlash is occurring.

With reference to the enlarged view of FIG. 42 (B), the shaft torsional speed of (b) has a pulse-like waveform that rapidly increases immediately after the start of backlash and rapidly decreases after the end of backlash. Since there is no reaction force from the elastic shaft, the motor solely rapidly accelerates. When the teeth collide, the accelerated inertial energy is converted into elastic energy of torsion of the shaft, resulting in deceleration. As the amplitude of this pulse waveform increases, the relative speed between teeth at the end of the backlash increases, and the rattling shock also increases.

Patent document 3 discloses a method of backlash control, which is characterized by estimating a period of occurrence of backlash by using a reference model.

According to patent document 3, by increasing the torque command outside of the backlash period and suppressing the torque command to a low level only during the backlash period, it suppresses degradation of the response characteristics as a whole, and reduces the rattling shock.

In the time-enlarged view of FIG. 42 (B), zero-crossing of the torque command $T_{ref\_LPF}$ occurs around 1.5 s and around 2.1 s, wherein the enlarged range is selected so as to include two types, fast change and slow change. Due to fast and slow changes, a difference occurs in behavior of $T_m$, which is the control output, in the vicinity of zero-crossing. When change of the torque command is gradual, such as around 1.5 s, the control output $T_m$ is throttled to around zero during the backlash, namely, during the period when $T_d$ is equal to zero, so as to produce an effect of backlash control that suppresses rapid changes in the shaft torsional speed shown in the second row.

However, when the torque command changes rapidly, as at 2.1 s in the latter half, the control output $T_m$ is not sufficiently throttled, and the shaft torsional speed becomes large, namely, the motor acceleration becomes rapid, since the disturbance torque observer has a limit of response.

In view of the foregoing, in order to reduce the rattling shock at the time of rapid torque change, which cannot be sufficiently suppressed only by adoption of the sixth and seventh embodiments, the eighth and ninth embodiments are presented to have an extended function of reducing a wide range of rattling shocks.

(Limitation of Sampled Data System)

The configurations of the first to fifth embodiments are each shown in the form of a continuous data system model. However, in recent years, a computer processor called a CPU (Central Processing Unit) is often used as a controller, where a control algorithm is implemented as a digital control handling discrete-time digital values.

Digital control has the following limitations.

(a) Sampled Data System (Discrete Time)

Even a continuous input signal is converted to discrete time sample values and then handled. Internal state quantities are also updated with reference to sample timings. Execution of a program takes time, which causes a delay in an output signal by a maximum of one sampling.

(b) Restrictions on Number of Significant Digits

A quantity on a signal is also treated as an encoded digital value, which causes problems about the number of significant digits and resolution. A dynamic range also varies depending on an encoding method such as fixed point encoding method or floating point encoding method.

(c) Discrete Calculation Error

With a digital control based on a sampled data system, in order to obtain a result close to that of a continuous data system, there is a method of applying iterative operation such as the Runge-Kutta method to approximate an integral. Furthermore, for a configuration that has many integral elements and a feedback loop, there is also a method of transforming into a multivariable state equation or the like and solving a system of simultaneous differential equations.

On the other hand, there is also a simple method for implementation using the backward difference method or the like although some errors occur.

In the sixth to ninth embodiments, it is desired to realize a real-time control with a built-in CPU. Therefore, it is required to be implemented to have a simple algorithm and a short calculation time as much as possible. Accordingly, an integral is approximated to a simple backward difference, and a feedback loop is approximated by insertion of a sample delay, and convergence operation is thereby omitted. Therefore, there is a concern that a calculation error may increase with respect to a continuous data system.

In the following embodiments, the foregoing is referred to as a method of transformation to sampled data system, a calculation error in sampled data system, etc.

Sixth Embodiment

Figure 25:
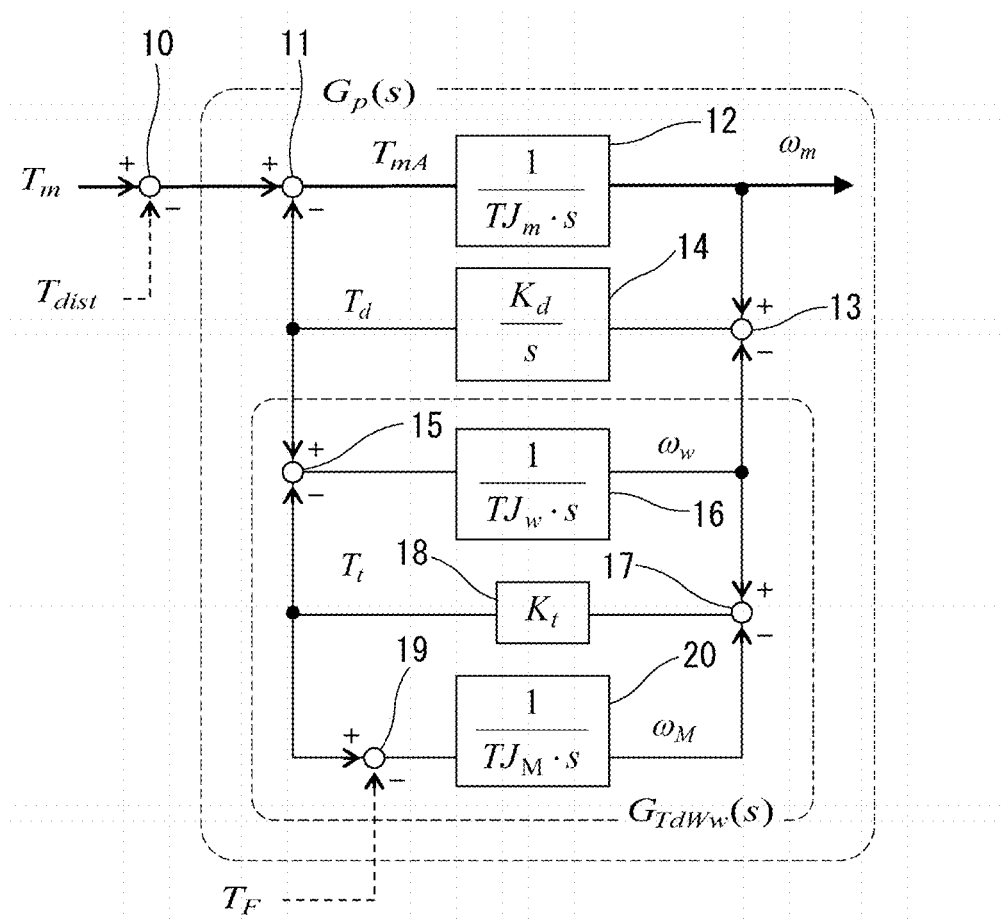
FIG. 25 is a block diagram showing a vehicle model where a disturbance torque component is taken into account.

The following embodiments also employ the models, variables, and transfer functions, which are defined in the first to fifth embodiments. FIG. 25 is a block diagram showing a basic vehicle model composed of three kinds of inertial bodies (motor, tires, and vehicle body) and spring elements of a torque transmission mechanism (gears, and an elastic shaft).

FIG. 25 differs from FIG. 1 in that the subtractor 10 subtracts the disturbance torque component (equivalent component obtained by conversion to motor shaft) $T_{dist}$ from the motor torque (output torque command) $T_m$ to output a quantity that is inputted to the subtractor 11. The other configuration is the same as in FIG. 1. Variables and constants in FIG. 25 are the same as those described with FIG. 1.

Figure 26:
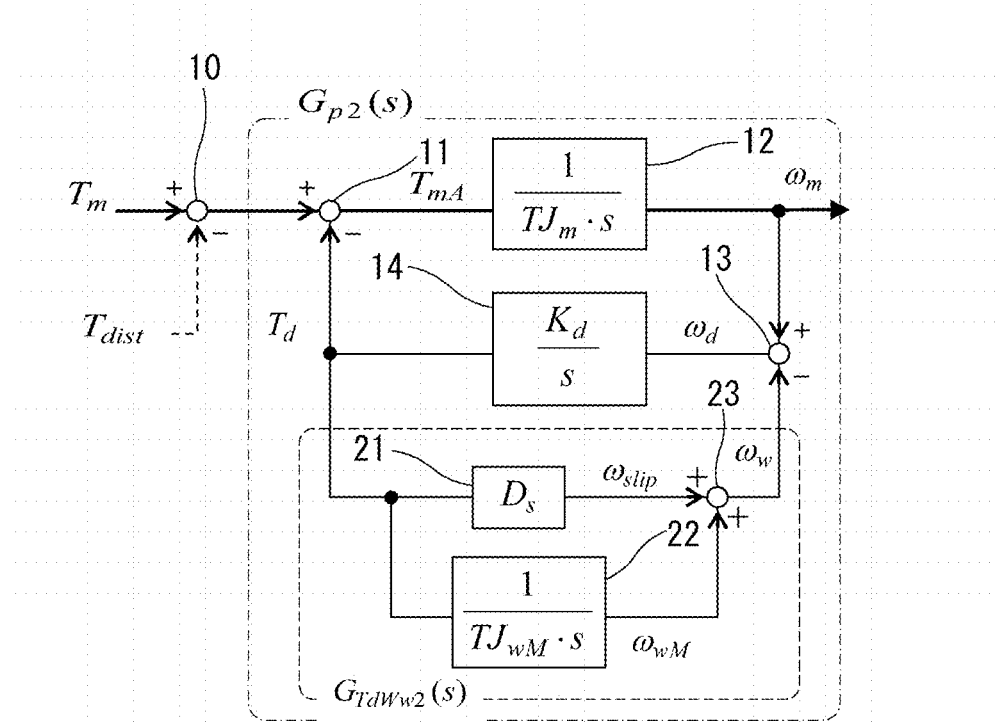
FIG. 26 is a block diagram showing a vehicle model produced by reducing the order of the vehicle model of FIG.

The model $G_p(s)$ in FIG. 25 is approximated to a model shown in FIG. 26 in which a transfer function has a reduced order, as in the first embodiment (mathematical expressions (1) to (12) are adopted). In FIG. 26, the same parts as in FIG. 25 and FIG. 2 are denoted by the same reference numerals.

Figure 29:
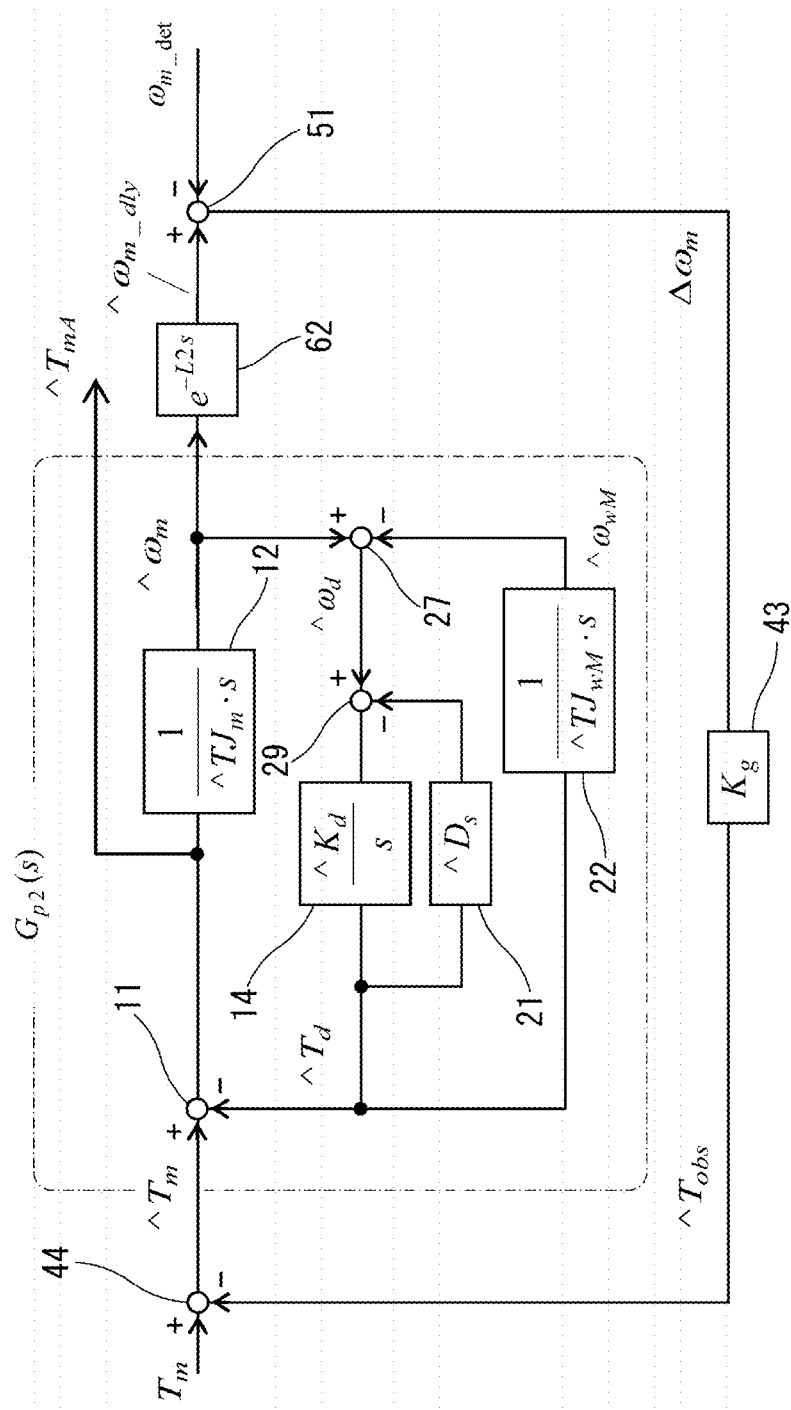
FIG. 29 is a block diagram showing a continuous data system model of a vehicle model section in a disturbance torque observer according to the sixth embodiment of the present invention.

FIG. 29 shows a disturbance torque observer constructed using the model of FIG. 26, as described below. The disturbance torque observer estimates the disturbance torque component $T_{dist}$ of FIG. 25, wherein $\hat{T}_{obs}$ and $\hat{T}_d$ are subtracted from AT m at the same point. Therefore, the estimated disturbance torque $\hat{T}_{obs}$ may be regarded as a component for correcting the shaft torsional torque component $\hat{T}_d$ of the model. In the configuration of FIG. 29, the estimated motor-accelerating torque is calculated as $\hat{T}_{mA} = \hat{T}_m - (\hat{T}_{obs} + \hat{T}_d)$. The relationship between the estimated motor-accelerating torque $\hat{T}_{mA}$ and the estimated motor speed $\hat{\omega}_m$ is expressed by differentiation and integration as in mathematical expression (16).

$$\hat{T}_{mA} = \frac{d}{dt}(\hat{\omega}_m), \quad \hat{\omega}_m = \int (\hat{T}_{mA}) \cdot dt \quad (16)$$

In the following embodiments, examples of configuration are proposed for implementing the foregoing with a sampled data system.

Figure 27:
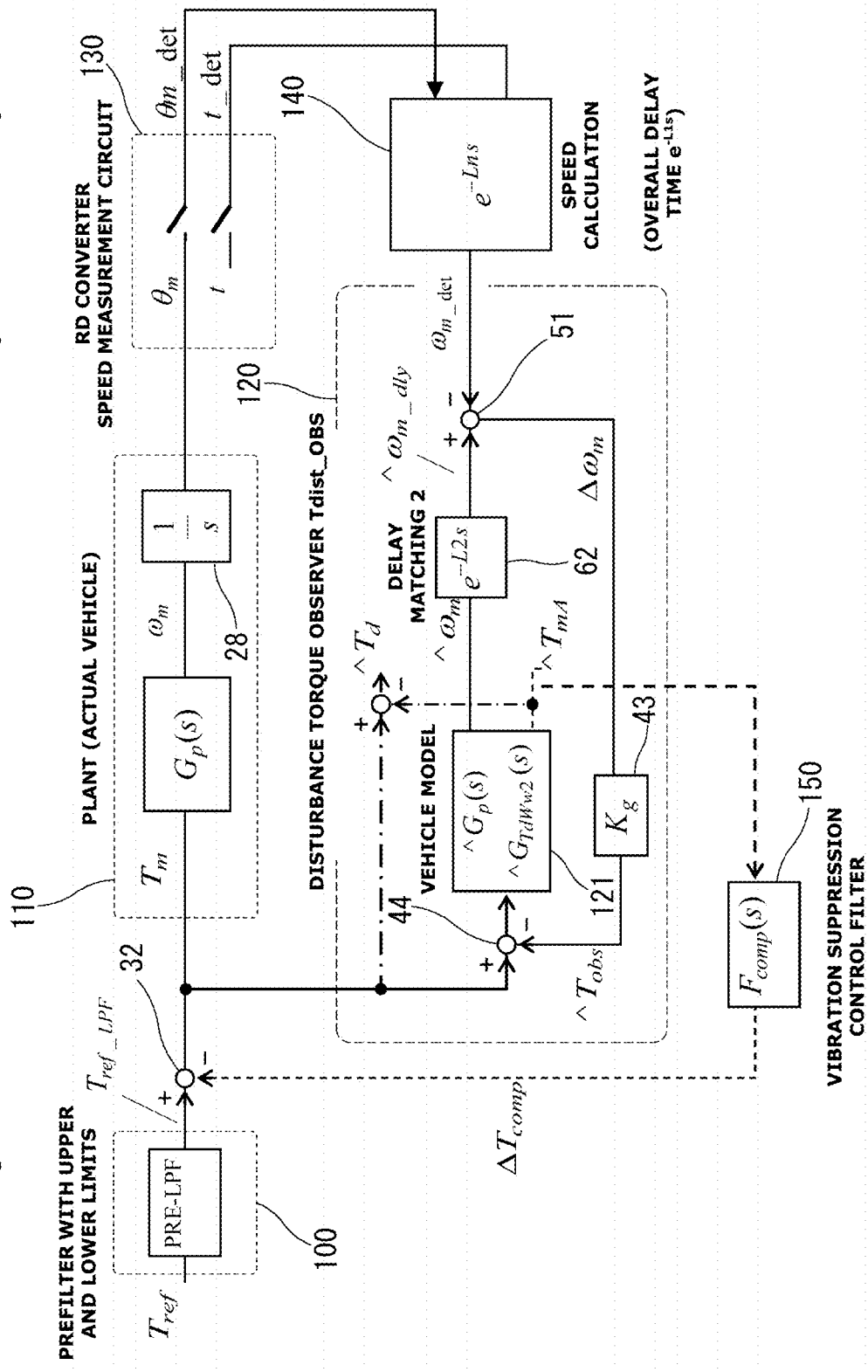
FIG. 27 is a block diagram showing a vibration suppression control device according to a sixth embodiment of the present invention.

FIG. 27 shows an overall configuration of a continuous data system that is a base of the sixth embodiment. First, the following describes variables and element blocks in FIG. 27.

[Description of Variables]

$T_{ref}$: an input torque command, which is a value of the shaft output torque of the motor requested by an upper command device, $\Delta T_{comp}$: a compensation torque component, which is an output of the vibration suppression control (outputted from a vibration suppression control filter 150), $T_m$: an output torque command of the control device, which is also an input to a disturbance torque observer 120. This torque is generated by the motor drive device in the subsequent stage.

$\omega_m$: a rotational speed of the actual motor, $\theta_m$, t: a rotational phase and time of the actual motor, which are latched by an RD converter 130 at time instants of sampling, wherein the speed is calculated based on a time difference component by a speed calculation part 140 in the subsequent stage.

$\omega_{m\_det}$: a measured motor rotational speed calculated based on the measured values ($\theta_{m\_det}$, $t_{\_det}$) of ($\theta_m$, t) by the speed calculation part 140. The sum of (1) a dead time from output of $T_m$ from the control device to torque generation in the actual vehicle, and (2) a dead time from actual rotational speed $\omega_m$ to measured rotational speed $\omega_{m\_det}$ is described as L1 (delay block 1 is $e^{-L1s}$).

$\hat{T}_{obs}$: a disturbance torque component estimated by the disturbance torque observer 120 (estimated disturbance torque), which is an estimate of $T_{dist}$ in FIG. 25, wherein disturbance forces applied to the vehicle body, such as $T_F$, are converted and estimated herein, $\hat{\omega}$: an estimated motor speed outputted from a reference model (121) in the disturbance torque observer, $\hat{T}_{mA}$: an estimated motor-accelerating torque outputted from the reference model (121) in the disturbance torque observer, $\hat{\omega}_{m\_dly}$: a signal component produced by delaying $\hat{\omega}m$ by a delay 2 of $e^{-L2s}$ in a delay part 62, for matching with a delay 1 of $e^{-L1s}$ in the speed calculation part 140, and $\Delta\omega_m$: a speed deviation component produced by a subtractor 51 as a deviation between the estimated motor speed ($\hat{\omega}_{m\_dly}$) of the model and the measured motor speed ($\omega_{m\_det}$), wherein the speed deviation component is multiplied by an observer gain $K_g$ by a gain multiplier 43 to produce the estimated torque $\hat{T}_{obs}$.

[Description of Blocks]

(a) Prefilter part (PRE-LPF) 100: a filter that removes high frequency components from an external torque command $T_{ref}$, and contains a torque limiter that defines upper and lower limits. The output $T_{ref\_LPF}$ is used as an input to vibration suppression control.

(b) Plant (actual vehicle) 110: a plant of an actual vehicle corresponding to $G_p(S)$ in FIG. 25 and mathematical expression (3). Drive devices such as inverters are ignored. The output torque command $T_m$ is inputted, and then the motor rotational speed $\omega_m$ is outputted, wherein the motor rotational speed $\omega_m$ is time-integrated by an integrator 28 to determine a motor rotational phase $\theta_m$.

(c) Disturbance torque observer 120 ($T_{dist\_OBS}$): a part of vibration suppression control, which is composed of a speed deviation calculation section (delay part 62, subtractor 51), which takes account of a vehicle model part (121) and time matching, and a feedback section based on the observer gain $K_g$.

(d) Vehicle model 121: a model part in the disturbance torque observer 120, which simulates the vehicle corresponding to FIG. 26. The torque command $T_m$ is inputted, and the motor rotational speed $\hat{\omega}_m$ corresponding to $\hat{G}_p(S)$ in mathematical expression (10) is outputted, and the estimated motor-accelerating torque $\hat{T}_{mA}$ corresponding to $G_{TdWw2}(s)$ in mathematical expression (12) is outputted.

(e) RD converter 130: a measurement circuit for speed measurement, which outputs a rotational phase $\theta_{m\_det}$ using a resolver and a resolver/digital converter (RD converter). In speed measurement, both the phase $\theta_{m\_det}$ and time $t_{\_det}$ are sampled simultaneously.

(f) Speed calculation part 140: a part that calculates a measured motor speed based on a signal of the RD converter.

(g) Vibration suppression control filter 150: a filter $F_{comp}(s)$ that calculates a vibration suppression control component $\Delta T_{comp}$ for suppressing resonance due to the elastic shaft, which corresponds to the bandpass filter of mathematical expression (13).

Next, the following describes the configuration of FIG. 27. First, the prefilter part 100 removes a high frequency band from the input torque command $T_{ref}$, and apply limitation with the upper and lower limits, to calculate $T_{ref\_LPF}$. The compensation torque $\Delta T_{comp}$, which is produced by the vibration suppression control, is subtracted from $T_{ref\_LPF}$, to produce the control output torque $T_m$. $T_m$ is also an input to the disturbance torque observer 120 in the vibration suppression control system.

The motor speed is calculated based on the measured values ($\theta_{m\_det}$, $t_{\_det}$) of the rotational phase $\theta_m$ and the time t by the speed calculation part 140. For example, the measured speed $\omega_{m\_det}$ is determined by dividing a phase difference from a past sample value by a time difference.

Although the detailed configuration of the disturbance torque observer 120 (Tdist_OBS) is described below, the output of the disturbance torque observer 120 is the estimated component $\hat{T}_{mA}$ of the motor-accelerating torque that is used for vibration suppression control. The estimated component $\hat{T}_{mA}$ is caused to pass through the vibration suppression control filter 150 ($F_{comp}(s)$) to produce a compensation torque $\Delta T_{comp}$, which is subtracted from $T_{ref\_LPF}$ to produce $T_m$.

Figure 28:
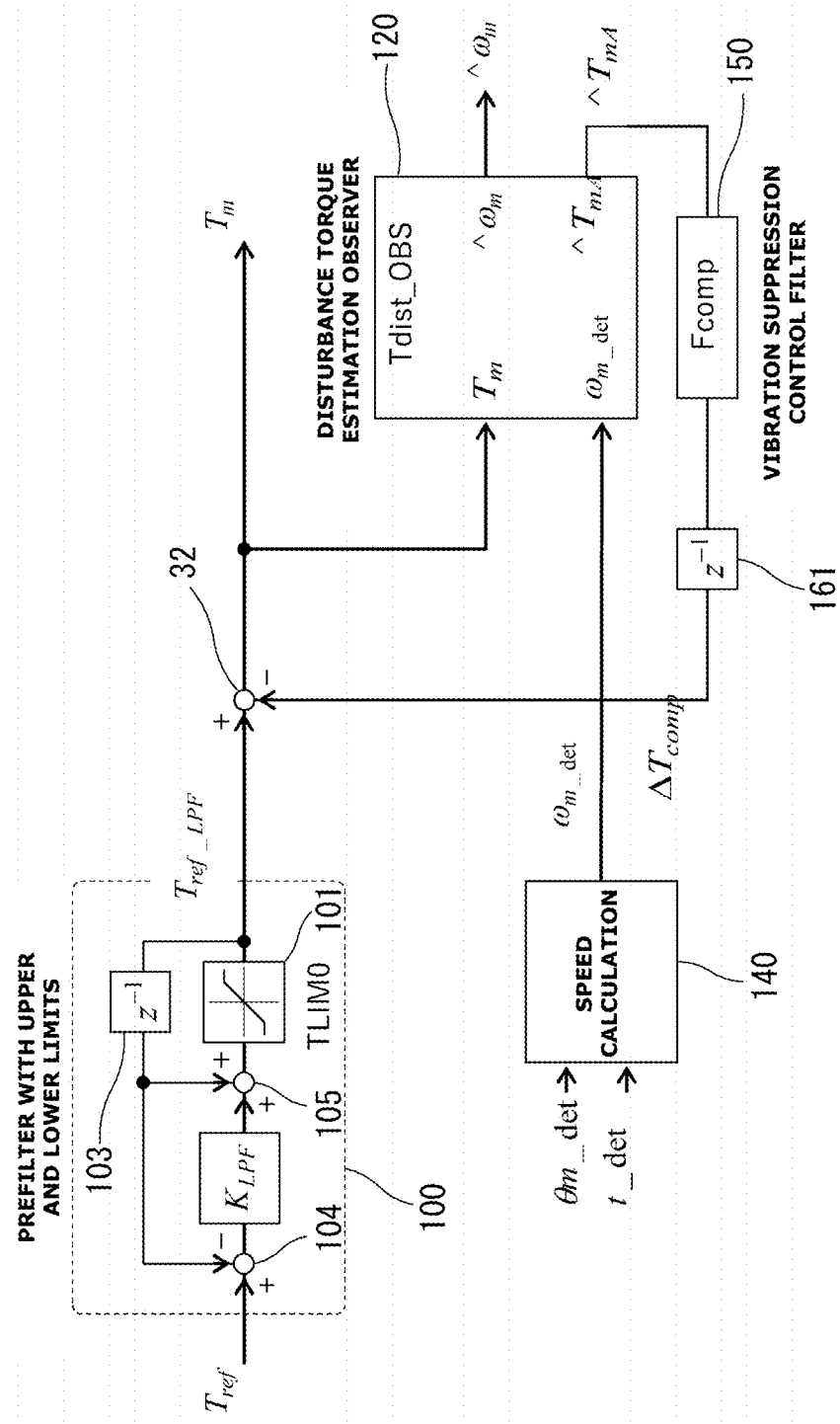
FIG. 28 is a block diagram showing a sampled data system to which the vibration suppression control device of FIG. 27 is transformed.

FIG. 28 shows a control section that is produced by transforming the control section shown in FIG. 27 into a sampled data system. FIG. 28 shows the whole of the control section, wherein only the prefilter part 100 is shown in detail. The prefilter part 100 includes a low-pass filter $K_{LPF}$ that suppresses a high frequency band of the input torque command $T_{ref}$ and is also provided with a torque limiter 101 (TLIM0) (first torque limiter) that defines a maximum value. FIG. 28 shows a simple example of configuration that is produced by transformation by the backward difference method, wherein a delay operator of a delay part 103 is represented by "$z^{-1}$", and a sample period thereof is represented by $T_c$.

The output of torque limiter 101 ($T_{ref\_LPF}$) is delayed by a delayer 103, and the output of delayer 103 is subtracted from the input torque command $T_{ref}$ by a subtractor 104, and the output of subtractor 104 is caused to pass through the low-pass filter $K_{LPF}$, and is thereafter added to the output of the delayer 103 by an adder 105. The output of addition of the adder 105 is inputted to the torque limiter 101.

In FIG. 28, the output $T_m$ of the vibration suppression control is produced by subtracting the compensation torque $\Delta T_{comp}$, which is the output of the vibration suppression control filter 150, from the output $T_{ref\_LPF}$ of the prefilter part 100. The output $T_m$ is also an input torque command to the disturbance torque observer 120. It is required to insert a delay $z^{-1}$ into the feedback section, so that a delayer 161 is inserted in the subsequent stage of the vibration suppression control filter 150. As the number of delayers increases, errors increase. Therefore, the delayer 161 is inserted in this position in consideration of reduction of the number of delayers.

FIG. 29 shows an example of configuration of the disturbance torque observer 120. FIG. 29 shows a base continuous data system model, which employs the reduced order model of FIG. 26. The model $G_{p2}(s)$ in FIG. 29 has the same configuration as the disturbance torque observer model $\hat{G}_{PTmA2}(S)$ according to the second embodiment shown in FIG. 6, where the delay part 62, subtractor 51, gain multiplier 43, and subtractor 44 are also shown.

Figure 30:
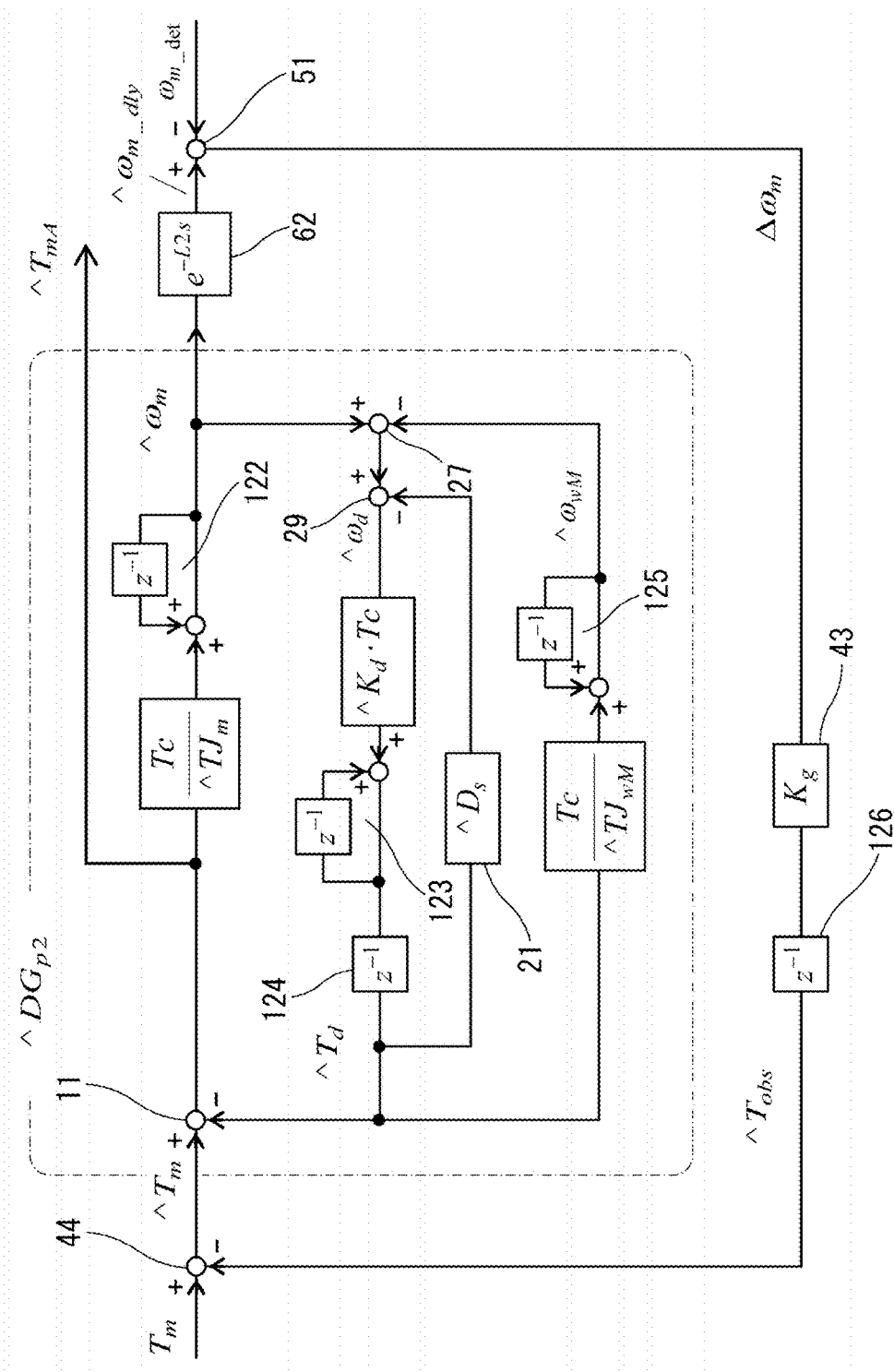
FIG. 30 is a block diagram showing an example of the sampled data system model of the vehicle model section in the disturbance torque observer according to the sixth embodiment of the present invention.

FIG. 30 shows a sampled data system produced by transformation from FIG. 29, showing an example of configuration in which time integration is replaced with integration by backward difference.

FIG. 30 differs from FIG. 29 in that: the output ($\hat{T}_{mA}$) of the subtractor 11 is caused to pass through an integral coefficient multiplier $T_c/TJ_m$ and an integrating part 122, which composed of a delayer having a delay operator $z^{-1}$, and an adder, to produce the estimated motor rotational speed $\hat{\omega}_m$; the estimated shaft torsional speed $\hat{\omega}_d$ is caused to pass through an integration coefficient multiplier $\hat{K}_d \cdot T_c$, an integrating part 123, which is composed of a delayer having a delay operator $z^{-1}$, and an adder, and a delayer 124 having a delay operator $z^{-1}$, to produce an estimated shaft torsional torque $\hat{T}_d$; the estimated shaft torsional torque $\hat{T}_d$ is caused to pass through the integral coefficient multiplier $T_c/TJ_m$, and an integrating part 125, which is composed of a delayer having a delay operator $z^{-1}$, and an adder, to produce $\hat{\omega}_{WM}$; and a delayer 126 having a delay operator $z^{-1}$ is inserted in the subsequent stage of the gain multiplier 43.

By subtracting the estimated value of the disturbance torque $\hat{T}_{obs}$ from the torque command inputted to the model, the speed deviation converges to decrease so that the disturbance torque and the estimated value match each other.

The delay part 62 ($e^{-L2s}$ block) in FIG. 30 is inserted for time matching, as described below in detail with reference to FIG. 32.

Figure 31:
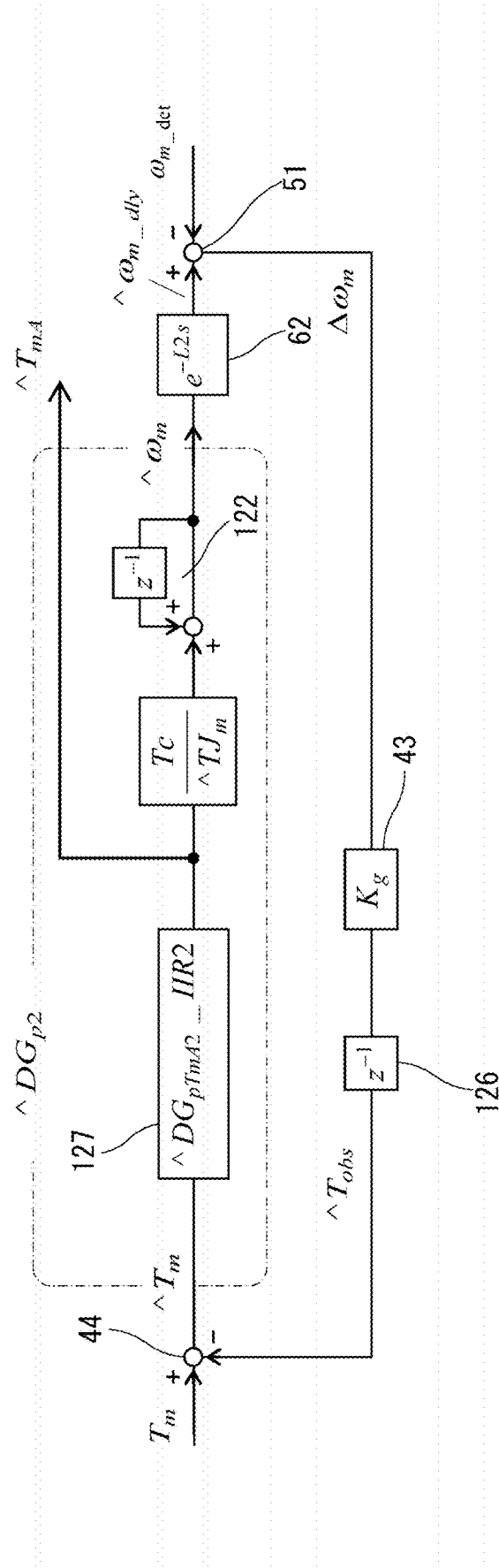
FIG. 31 is a block diagram showing another example of the sampled data system model of the vehicle model section in the disturbance torque observer according to the sixth embodiment of the present invention.

FIG. 31 shows another form of FIG. 30. The motor model part of $\hat{D}G_{p2}$ in FIG. 30 may be implemented by using the second order transfer function of mathematical expression (12). Therefore, coefficients of a second order IIR filter 127 (Infinite Impulse Response Filter) are designed directly from mathematical expression (12) and implemented as $\hat{D}G_{pTmA2}\_IIR2$ ($\hat{T}_m$-$\hat{T}_{mA}$ transformation block of the present invention). $\hat{\omega}_m$, which is used for calculating the estimated disturbance torque $\hat{T}_{obs}$, is produced by time-integrating the output component $\hat{T}_{mA}$ of the second order IIR filter 127 by an integral coefficient multiplier $T_c/TJ_m$ and an integrating part 122.

Referring back to FIG. 28, the torque command $T_{ref}$ is processed by the prefilter part 100 that is a first order LPF based on backward difference, to produce $T_{ref\_LPF}$ whose rapid changes are suppressed. The prefilter part 100 is not required to perform a function to remove the resonant frequency component as a notch filter, and but removes high frequency components that cannot be compensated for by the vibration suppression control at the subsequent stage.

The disturbance torque observer 120 receives input of the output torque command component $T_m$, which is produced by subtracting the compensation torque component $\Delta T_{comp}$ of the vibration suppression control from the output $T_{ref\_LPF}$ of the prefilter part 100, and the measured speed component $\omega_{m\_det}$, which is calculated by the speed calculation part 140, and outputs the estimated motor-accelerating torque component $\hat{T}_{mA}$ that is calculated by the vehicle model. The vibration suppression control filter 150 calculates the vibration suppression compensation torque component $\Delta T_{comp}$, wherein the vibration suppression compensation torque component $\Delta T_{comp}$ is subtracted from $T_{ref\_LPF}$ to produce the torque command $T_m$ as a quantity that is produced by application of the vibration suppression control compensation, wherein the torque command $T_m$ is used as an output of the controller. In the drive system, this torque command $T_m$ is fed to the drive device at the subsequent stage, to cause the actual motor to generate a motor torque corresponding to the torque command $T_m$.

The vibration suppression control thus configured using the disturbance torque observer 120 is expected to produce three types of effects in accordance with the input signal, as already described in the third embodiment.

The following discusses the transfer function from the torque command $T_{ref\_LPF}$ to the output $T_m$ where the speed measurement side input to the disturbance torque observer 120 is fixed to zero and thereby invalidated. As the feedback section including the disturbance torque observer 120 and the vibration suppression control filter 150 is transformed into an integrated transfer function, this transfer function is equivalent to a kind of band elimination filter. Namely, this produces an effect of outputting a torque command produced by removing a torque component in the resonant band contained in the torque command $T_{ref\_LPF}$.

On the other hand, the following discusses the effect of vibration suppression based on speed measurement where the torque command side input to the disturbance torque observer 120 is fixed at zero and thereby invalidated. Then, as a second effect, an effect of vibration suppression control based on speed differential feedback is produced, which is known as an effect of general PID control or the like. With reference to the example of FIG. 31, the disturbance torque observer 120 operates so that the speed deviation becomes zero, namely, the model speed and the measured speed become equal to each other. Since $\hat{T}_{mA}$ is the input signal to the integrator that generates the model speed $\hat{\omega}_m$, $\hat{T}_{mA}$ corresponds to the differential of $\hat{\omega}_m$, and may be regarded as an approximation of the differential component of measured speed under convergence behavior by the observer. Since $\hat{T}_{mA}$ is used for vibration suppression control via the vibration suppression control filter 150, this produces an effect similarly to a differential feedback type vibration suppression control based on speed measurement. This serves to suppress the resonant component caused by the disturbance forces applied to the vehicle body and driveline mechanism.

Furthermore, the disturbance torque observer is configured to feed back the deviation component between the information from the reference model and the information from the speed measurement to the model input, so that even if there is a difference in parameters between the reference model and the actual vehicle, this produces an effect of suppressing an error component resulting from the difference. This effect is a third effect, wherein robustness is ensured to suppress deterioration of performance of the vibration suppression control even if errors or fluctuations occur in parameters.

FIG. 32 shows a configuration of the speed measurement section (RD converter 130 and speed calculation part 140) and the section that calculates the deviation $\Delta \omega_m$ between the estimated speed $\hat{\omega}_m$ and the detected speed $\omega_{m\_det}$, which is used in the disturbance torque observer. The delay block $e^{-L2s}$ (delay part 62) corresponding to the delay time L2 is inserted on the estimated speed $\Delta \omega_m$ side for time matching.

Although omitted in FIGS. 27 and 28, many delay components exist in this control system. A calculation time is required until a control output is produced in response to an interrupt signal from the CPU. There is also a delay in electric current control and others in the drive device at the subsequent stage. Furthermore, in a configuration in which the speed is measured using a position sensor, it is required to calculate the speed using the phase difference in a certain amount of time difference, which causes a delay in measurement. If an LPF is inserted for noise removal, this adds a further delay component. In FIG. 27, the delay time due to speed measurement is represented by Ln, and the sum of the delay times including others is represented by L1.

On the other hand, since the model section of the disturbance torque observer calculates the model using sample values of the torque command, the estimated speed of the model can be regarded as a component at a sample time instant. Therefore, if the deviation is calculated without correction, the deviation is produced as a difference between the components shifted in time by the time L1 from each other. This time mismatch causes an error during transient response.

In view of the foregoing, in calculation of the speed deviation of the disturbance torque observer as shown in FIG. 32, for matching with the delay time L1, the delay block $e^{-L2s}$ corresponding to the time L2 equal to the delay time L1 is inserted to the model side. Regarding the correction for delay times, a delay component due to electric current control from an interrupt time instant to a phase measurement time instant, etc., and a delay component in the speed measurement calculation section are shown separately. The calculation time and the response time of the electric current control are relatively short and vary little, but the speed measurement delay varies depending on the calculation method, LPF, etc. This is because these are discussed separately. The following proposes a time matching method adapted to the speed measurement method.

In FIG. 32 (a), the speed measurement section (RD converter 130) samples the rotational phase $\theta_m$ and its corresponding time t by a measurement circuit, and reads values by the CPU as the phase $\theta_{m\_det}$ and time $t_{\_det}$. Then, a delayer 141 having a delay operator $z^{-n}$ delays the phase $\theta_{m\_det}$, and a subtractor 142 subtracts a value of $\theta_{m\_det}$ n-samplings before, which is outputted from the delayer 141, from the value of $\theta_{m\_det}$ at the current time. Also, a delayer 143 having a delay operator $z^{-n}$ delays $t_{\_det}$, and a subtractor 144 subtracts a value of $t_{\_det}$ n-samplings before, which is outputted from the delayer 143, from the value of $t_{\_det}$ at the current time.

Then, a calculator 145 divides a phase difference, which outputted from the subtractor 142, by a time difference, which is outputted from the subtractor 144, to calculate the measured speed $\omega_{m\_det}$. Here, the $z^{-n}$ block corresponds to n-cascaded $z^{-1}$ blocks. With the $z^{-n}$ block, the difference between the value at the current time and the value n-samplings before is calculated.

FIG. 32 shows an example of configuration of the deviation calculation section (subtractor 51) for calculation of a deviation between the model and the speed measurement calculation section (140), and the time matching section $e^{-L2s}$ (delay part 62). The delay time due to the current control of the motor drive device is assumed to be substantially constant, and is compensated for by $\alpha$-time delay calculations by a delayer 65 ($z^{-\alpha}$). In the subsequent stage, correction is made for the delay time due to speed measurement. There are various methods for speed measurement. When the phase difference at n-sample interval is used as shown in FIG. 32 (a), a delay time equivalent to that in speed measurement can be generated by inserting (n+1) samples moving average calculation.

The reason why the multiple (n-times) sampling interval is set for speed measurement is that the measured phase data contains measurement errors and noise, and the accuracy of speed measurement is to be improved by reducing the noise component ratio (measurement error) by increasing the phase difference and time difference for difference calculation. However, increasing the number n raises a problem of an increase in time delay (expressed as $e^{-Lns}$) in exchange for accuracy. Therefore, a delay corresponding to Ln is also inserted for the estimated speed on the disturbance torque observer side for time matching.

FIG. 33 (b) illustrates an equivalent delay time by the moving average calculation in FIG. 33 (a). When n=4, the measured speed is calculated based on the phase difference of $4 \times T_c$ between sample timings d0 (n=0) and d4 (n=4), so that the delay time is equal to ($\Delta T_{Ln} = 2 \times T_c$), where a time instant of measurement is defined as a central time instant of the measurement time period. Therefore, when a moving average of (n+1) times is inserted into the model side, in case of (n+1)=5, the average value ma(5) of d0 to d5 is outputted, and this central time instant defines a delay time ($2 \times T_c$) equivalent to the delay in speed measurement.

Inserting a delay in the model side for time matching may seem to reduce the effect of vibration suppression. However, the vibration suppression to the torque command, which is required to respond quickly, employs $\Delta T_{mA}$ at the preceding stage of the delay block, and thereby is not affected by the time matching. The speed deviation information containing the delay is only used for estimating the disturbance torque that changes relatively slowly, so that the performance is not adversely affected so much.

The speed measurement section in FIG. 32 (a) is based on the assumption that the phase measurement is implemented by a CPU interrupt signal and software, etc., and the interrupt interval $T_c$, which is constant, contains a variation of $\Delta_T$. Therefore, a time instant is measured simultaneously with measurement of the phase, for calculating an accurate time difference. If the speed measurement is implemented as a digital logic circuit, the sample time instant t_det can be accurately synchronized with the sample period $T_c$, so that the time difference may be replaced with a constant sample period of $n \cdot T_c$ as shown in FIG. 32 (b).

In FIG. 32(b), the phase difference outputted from the subtractor 142 is divided by the constant sample period $n \cdot T_c$ by a divider 146 to output the measured speed $\omega_{m\_det}$ The speed measurement section in FIG. 32(c) is an example in which the time difference and the filter are configured by a technique called incomplete differentiation or pseudo differentiation. By a first order filter by backward difference (first order delay filter based on sampled data system), a component before being added to a previous value is extracted, and divided by time $T_c$, to produce a component based on combination of speed measurement by time difference and first order filtering (LPF). On the other hand, by using a first order filter having the same configuration on the model side for time matching, it is possible to insert a delay equivalent to that on the speed measurement side.

In FIG. 32 (c), the first order filter based on backward difference on the speed measurement side includes: a subtractor 152 that subtracts the output of a delayer 151 from the phase measured by the RD converter 130 (speed measurement circuit); a multiplier 153 having a filter coefficient $K_{LP}$, through which the output of the subtractor 152 passes; and an adder 154 that sums the output of the multiplier 153 and the output of the delayer 151. The delayer 151 delays the output of the adder 154.

A divider 155 divides the output of the multiplier 153, which is before being added to the previous value by the adder 154, by the time $T_c$.

The first order filter based on backward difference on the model side includes: a delayer 65 that delays $\Delta \omega_m$ by a-times delay calculation; a subtractor 163 that subtracts the output of the delayer 162 from the output of the delayer 65; a multiplier 164 having a filter coefficient $K_{LP}$, through which the output of the subtractor 163 passes; and an adder 165 that sums the output of the multiplier 164 and the output of the delayer 162. The delayer 162 delays the output of the adder 165.

In the case of backward difference, the multiplication coefficient $K_{LP}$ of the multipliers 153 and 164 is set as $K_{LP} = T_c/(T_c + T_{LPF})$, where $T_{LPF}$ is a filter time constant.

The sixth embodiment described above produces the following effects.
 (a) The accuracy of calculation of the reference model can be improved.
 (b) Since various time matching measures are made with respect to speed measurement and LPF, the accuracy of the deviation (difference) between the reference model and the speed measurement is improved, and the accuracy of disturbance torque estimation is improved.

In this way, it is possible to improve the accuracy and response performance of the disturbance torque observer, and thereby improve the stability of vibration suppression control using the disturbance torque observer.

Seventh Embodiment

Figure 34:
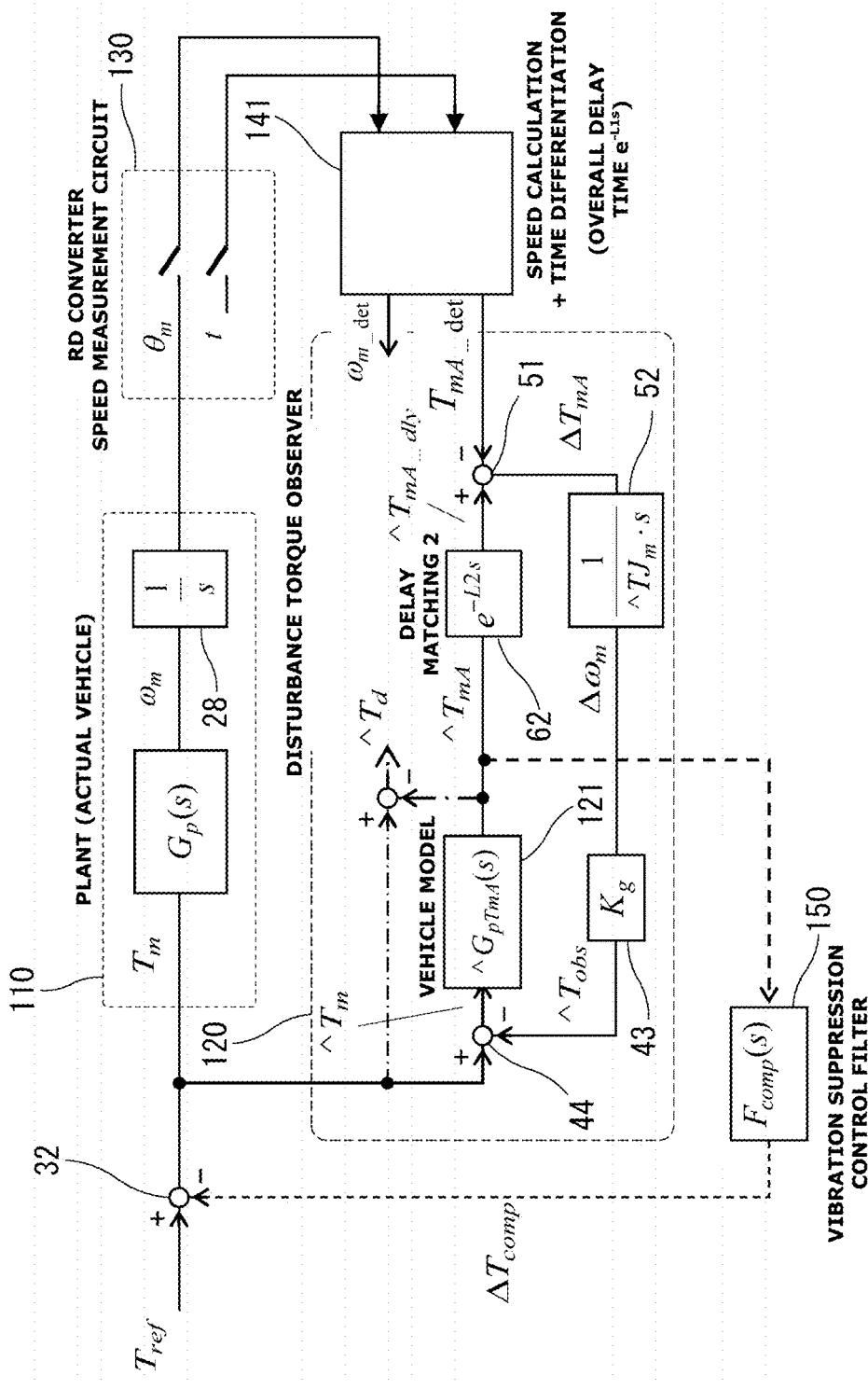
FIG. 34 is a block diagram showing a vibration suppression control device according to a seventh embodiment of the present invention.

FIG. 34 shows a seventh embodiment that employs the system using the deviation of the motor-accelerating torque as in the third and fourth embodiments. FIG. 34 shows an overall configuration of a continuous data system. The continuous data system is transformed into a sampled data system, which has the same overall configuration as in FIG. 28. In this embodiment, only the disturbance torque observer and the speed calculation are modified. In FIG. 34, the same parts as in FIG. 27 are denoted by the same reference numerals.

FIG. 34 differs from the example of configuration of the sixth embodiment in that the input to the deviation part (subtractor 51) of the disturbance torque observer 120 is modified to a difference $\hat{T}_{mA}$ between the estimated motor-accelerating torque component $\hat{T}_{mA\_dly}$ and the time-differential component $T_{mA\_det}$ calculated by a speed calculation part 141.

The deviation component $\hat{T}_{mA}$ of the motor-accelerating torque, which is the output of the subtractor 51, is finally returned to the speed deviation component $\Delta \omega_m$ by time integration (integrator 52), so that the disturbance torque observer can be configured as in the sixth embodiment. Thereby, the output of the vehicle model 121 in the disturbance torque observer 120 can be used for both vibration suppression control and disturbance torque estimation. This eliminates the need to calculate the estimated motor speed $\hat{\omega}_m$.

In FIG. 34, the prefilter part 100 shown in FIGS. 27 and 28 is omitted for illustration purposes.

FIG. 35 (a) shows an example of configuration produced by transforming the disturbance torque observer 120 of FIG. 34 into a sampled data system, and corresponds to FIG. 30 of the sixth embodiment. Since the estimated motor speed $\Delta\omega_m$ is not required, the number of items corresponding to integration can be reduced by moving the integrating parts (122, 125), which are positioned at the subsequent stage of the integral coefficients of $\Delta TJ_m$ and $\hat{}TJ_{WM}$ in the model $\hat{}DG_{p2}$ shown in FIG. 30, to a position subsequent to the subtractor 27 in the model $\hat{}DG_{p1}$, and combining the integrating parts into a single integrating part 128.

The difference output from the subtractor 51 is caused to pass through an integration coefficient multiplier $T_c/\hat{}TJ_m$ and the integrating part 122, which is composed of a delayer having a delay operator $z^{-1}$, and an adder, and is thereafter inputted to the gain multiplier 43, to estimate the disturbance torque.

FIG. 35 (b) corresponds to FIG. 31 of the sixth embodiment, wherein the integration (integration coefficient multiplier $T_c/\hat{}TJ_m$ and integrating part 122) in the model $\hat{}DG_{p2}$ is moved to the subsequent stage of the deviation calculation by the subtractor 51, and accordingly, the model $\hat{}DG_{p2}$ of FIG. 31 is simply implemented by only a second order IIR filter 127 ( $DG_{pTmA2}$_IIR2) ($\hat{}T_m$-$\hat{}T_{mA}$ transformation block of the present invention).

The reason why the output of the vehicle model is set to the estimated motor-accelerating torque $\hat{}T_{mA}$ in the seventh embodiment is that it is desirable that the two integral terms $\hat{}TJ_m$ and $\hat{}TJ_{WM}$ are moved to the subsequent stage of the difference calculation and thereby reduced to one integral term.

For digital calculation of the sampled data system, it is expected that as the number of integrators decreases, errors decrease, and the accuracy gets enhanced.

FIG. 36 shows details of the difference calculation of the motor-accelerating torque and the configuration of the part for integrating the difference in the seventh embodiment. FIG. 36 (a) corresponds to FIG. 32 (a) of the sixth embodiment, in which the output from the model side is changed to the motor-accelerating torque only, and on the other hand, a time differentiation is added to the speed measurement side while being approximated to a time difference calculation.

The speed measurement side of FIG. 36 (a) differs from that of FIG. 32 (a) in that the time differentiation is added. The measured motor rotational speed $\omega_{m\_det}$ outputted from a calculator 145 is caused to pass through a delayer 132 having a delay operator $z^{-1}$; a subtractor 133 calculates a difference between the output of the delayer 132 and $\omega_{m\_det}$; and the difference outputted from the subtractor 133 is caused to pass through a differentiator 134 having a coefficient $TJ_m/T_c$. The addition of the time differential calculation to the speed measurement side causes an increase in the delay time component. In order to compensate for this increase, an output of a moving average calculation part 66 is caused to pass through a two-samples moving average calculation part 67 to obtain $T_{mA\_dly}$, and the output of the subtractor 51 is caused to pass through the integration coefficient multiplier $T_c/\hat{}TJ_m$ and the integrating part 122 composed of a delayer having a delay operator $z^{-1}$, and an adder, to obtain $\Delta\omega_m$.

Although not shown, the calculation part for $\omega_{m\_det}$ in FIG. 36 (a) may be replaced with a configuration corresponding to FIG. 32 (b) of the sixth embodiment. Namely, the RD converter 130, the delayers 141 and 143, the subtractors 142 and 144, and the calculator 145 in FIG. 36 (a) may be replaced with the RD converter 130, the delayer 141, the subtractor 142, and the divider 146 in FIG. 32 (b).

FIG. 36 (b) shows a configuration in which an IIR filter (first order filter with a filter coefficient $K_{LP}$) is employed for filtering after speed measurement and time differentiation as shown in FIG. 32 (c). Since the IIR filter is expected to produce an LPF effect, and some noise is allowed to occur in speed measurement, the sample interval for speed measurement is set to n=1.

FIG. 36 (b) differs from FIG. 32 (c) in that a differentiating function is provided between the RD converter 130 and the subtractor 152, wherein the differentiating function is composed of a delayer 135 having the delay operator $z^{-1}$, a subtractor 136 for calculating a deviation from the output of the delayer 135, and a multiplier 137 for multiplying the output of the subtractor 136 by a coefficient $1/T_c$. In order to cancel this differentiation, an integral coefficient multiplier $T_c/\hat{}TJ_m$ and an integrator 122 are provided on the output side of the subtractor 51.

Furthermore, the divider 155 in FIG. 32(c) is a part of the speed calculation section, and is therefore moved as an element 137 to a position immediately subsequent to the subtractor 136.

While the speed measurement side of FIG. 36 (a) employs the delayer 132 for difference calculation in the time differentiation section, a function of the first order delay filter is employed instead in FIG. 36 (b).

Although the first order delay filter serves originally for the speed, the time differential component of the speed can be extracted by extracting $\hat{}T_{mA\_det}$ from the input part of the integrating part inside the filter. In other words, the function of the delayer 132 is included in the delayer 151, resulting in a slightly simplified configuration.

On the other hand, in the model side of FIG. 36 (b), the input signal itself is changed from the model estimated speed $\hat{}\omega_m$ to its differential component, the motor-accelerating torque $\hat{}T_{mA}$. Others are the same as in FIG. 32 (c), where as in the sixth embodiment, the first order delay filter is inserted, and the moving average calculator 67 is provided subsequent to the delayer 65 for matching with an increase in the delay time in the speed measurement side which is caused by the differential calculation.

As described above, according to the seventh embodiment, various time matching measures are made with respect to speed measurement and LPF as in the sixth embodiment, so that the accuracy of the deviation (difference) between the reference model and the speed measurement is improved, and the accuracy of disturbance torque estimation is improved.

In this way, it is possible to improve the accuracy and response performance of the disturbance torque observer, and thereby improve the stability of vibration suppression control using the disturbance torque observer.

Eighth Embodiment

In order to suppress the rattling shock due to gear backlash, it is desirable to reduce the motor torque during the backlash period, to suppress rapid changes in speed. However, if the motor torque is limited to zero, the backlash phase does not change, so that it takes longer time to eliminate the play. Therefore, it is desirable to accelerate the motor at an upper limit speed corresponding to an allowable shock level, and pass through a condition of backlash as quickly as possible, and thereby shorten the period during which the torque command is limited. For this purpose, it is required to accurately estimate the start and end of backlash.

In view of the foregoing, with respect to the configurations of the sixth and seventh embodiments, the eighth embodiment is additionally provided with a function of estimating the backlash period and a function of suppressing the torque command to a small value during the backlash period.

Figure 37:
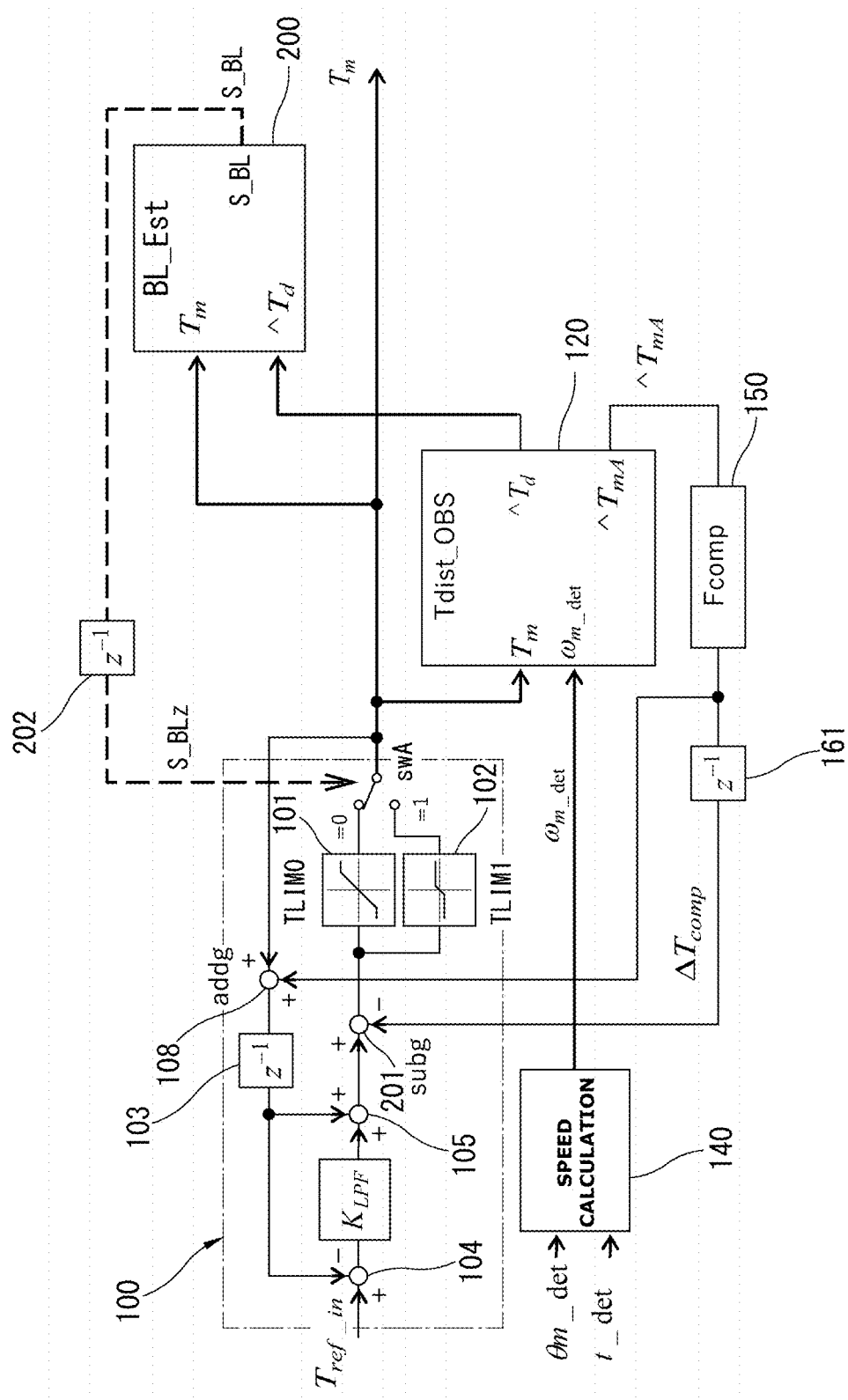
FIG. 37 is a block diagram showing a vibration suppression control device according to eighth and ninth embodiments of the present invention.
Figure 38:
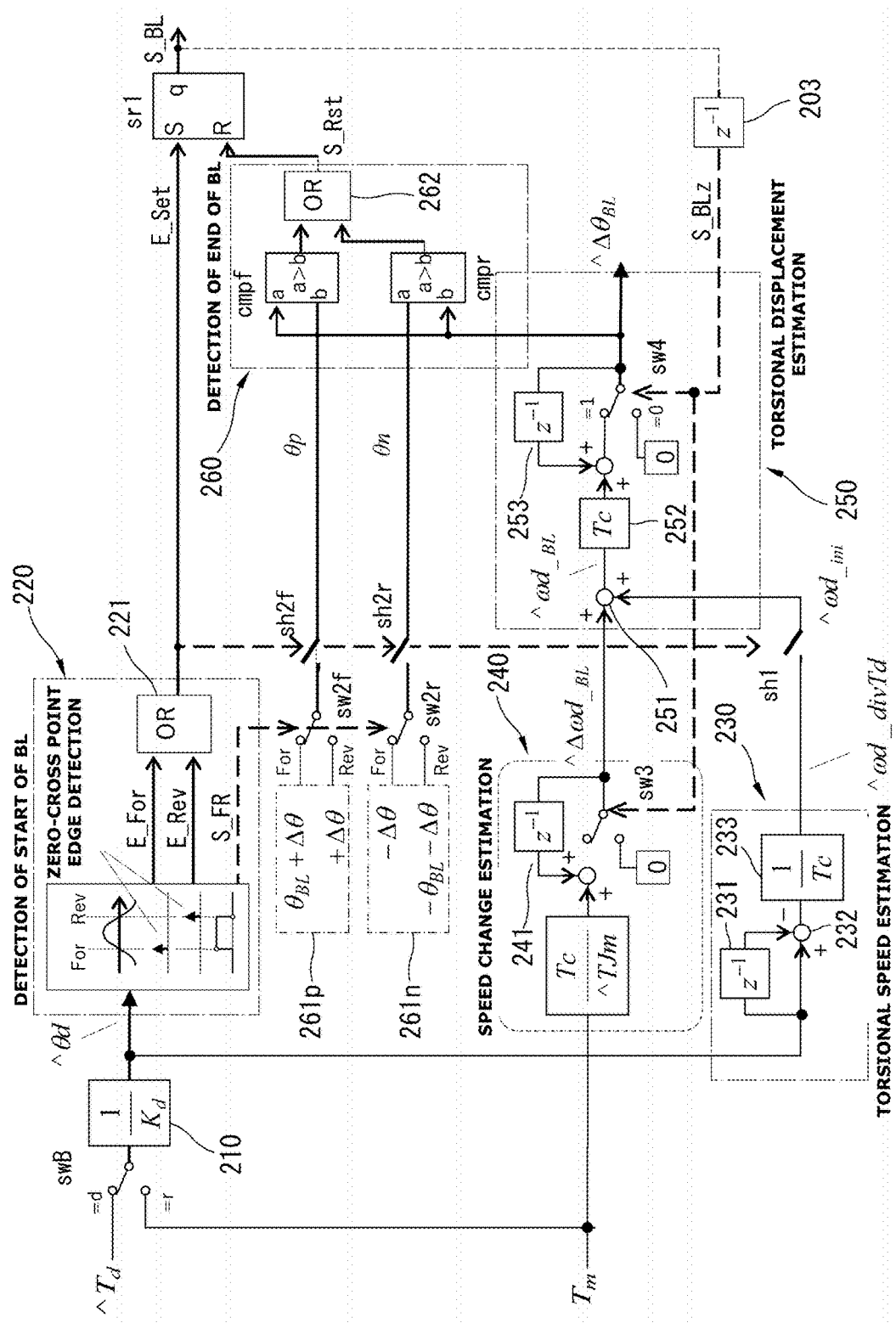
FIG. 38 is a block diagram showing a backlash period detection section shown in FIG. 37.

FIG. 37 shows an example of overall configuration of the eighth embodiment, and FIG. 38 shows an example of configuration of a backlash period detection section 200. The elements already described in the sixth and seventh embodiments are the speed calculation part 140, the disturbance torque observer (Tdist_OBS) 120, the vibration suppression control filter 150 ($F_{comp}$), etc. Furthermore, as indicated by the one-dot chain line in the disturbance torque observer 120 in FIGS. 27 and 34, a function is added to output the component (Tm-$\hat{T}_{mA}$) as the estimated shaft torsional torque $\hat{T}_d$, and is used for estimation.

In FIG. 37, a compensation torque subtractor 201 (subg) is provided for subtracting the compensation torque component $\Delta T_{comp}$ for vibration suppression from the output of the adder 105 in the prefilter part 100.

On the output side of the compensation torque subtractor 201, torque limiters are provided for limiting the output torque command $T_m$, wherein a first torque limiter 101 (TLIM0) has a first torque limit value, and a second torque limiter 102 (TLIM1) has a second torque limit value that has a narrower width between upper and lower limits than the first torque limit value.

On the output side of the torque limiters 101 and 102, there is a switch swA for selecting the output of the torque limiters 101 and 102, and when the backlash period detection section 200 described below detects backlash, selecting the output of the second torque limiter 102.

The output ($T_m$) of the switch swA is added by an adder 108 (addg) to the pre-delay compensation torque component $\Delta T_{comp}$ directly outputted from the vibration suppression control filter 150, and the output of addition of the adder 108 is inputted to a delayer 103 that is used for holding the previous value.

The disturbance torque observer 120 receives input of the output torque command $T_m$ limited by the torque limiter selected by the switch swA and the motor rotational speed $\omega_{m\_det}$ measured by the speed calculation part 140, and outputs the estimated motor-accelerating torque component $\hat{T}_{mA}$, and the estimated shaft torsional torque $\hat{T}_d$ that is the component of $T_m$-$\hat{T}_{mA}$.

The backlash period detection section 200 receives input of the output torque command $T_m$ outputted from the torque limiter selected by the switch swA and the estimated shaft torsional torque $\hat{T}_d$ outputted from the disturbance torque observer 120, estimates the backlash period, and outputs a logic signal "S_BL" (backlash detection signal) indicating the status of the backlash period.

When the logic signal S_BL is used for manipulation of the torque command, it corresponds to a feedback signal. Therefore, a backlash detection signal S_BLz, which is produced by delaying the input signal by one sampling by a delayer 202, is used as an operation signal for the switch swA.

In this embodiment, the backlash detection signal S_BLz is configured to output "1" during the backlash period, so that the switch swA selects a "=1" side, namely, selects the torque limiter 102 having a smaller width between upper and lower limits. This limits the magnitude of the torque command during the backlash period to prevent rapid acceleration of the motor.

FIG. 38 shows a main part of the backlash period detection section 200, which includes:
- a switch swB that is fixed to a "=d" side to receive input of the estimated torsional torque $\hat{T}_d$;
- a divider 210 (torque-to-phase transformation section) configured to perform transformation into an estimated shaft torsional phase $\hat{\theta}_d$;
- a backlash start timing detection section 220 configured to detect a zero cross point of the estimated shaft torsional phase ($\hat{\theta}_d$) as a start timing of the backlash period;
- a torsional speed estimation section 230 configured to estimate the shaft torsional speed $\hat{\omega}d\_divTd$ by time-differentiating the estimated shaft torsional phase $\hat{\theta}_d$;
- a speed change estimation section 240 configured to estimate a change component $\hat{\omega}d_{\_BL}$ of the motor speed during the backlash period by time-integrating the output torque command $T_m$ in FIG. 37 by a time constant $\hat{TJ}_m$ equivalent to the rotational inertia of the motor;
- a torsional displacement estimation section 250 configured to calculate an estimated phase change amount $\hat{\Delta\theta}_{BL}$ corresponding to backlash by: calculating by an adder 251 a sum of the shaft torsional speed, which is estimated by the torsional speed estimation section 230, an initial torsional speed $\hat{\omega}d_{\_ini}$, which is stored in a latch circuit sh1 at the start timing of the backlash period detected by the backlash start timing detection section 220, and the speed change component $\hat{\omega}d_{\_BL}$ during the backlash period, which is estimated by the speed change estimation section 240; and time-integrating the sum; and
- a backlash end detection section 260 configured to detect an end of the backlash period by comparing the phase change amount $\Delta\theta_{BL}$, which is estimated by the torsional displacement estimation section 250, with an absolute value of backlash phase width $\theta_{BL}$ and a margin width $\Delta\theta$ as set values; and
wherein the backlash period is detected based on the backlash start timing (trigger signal E_Set) detected by the backlash start timing detection section 220 and the backlash end (S_Rst) detected by the backlash end detection section 260.

Next, the following describes details of FIGS. 37 and 38. The switch swB in FIG. 38 is fixed to the "=d" side in the eighth embodiment, and is fixed to a "=r" side in the ninth embodiment. Accordingly, in the eighth embodiment, $\hat{T}_d$ is used as an input to the shaft torsional phase estimation calculation (divider 210).

A backlash period prediction section is divided into two sections, the backlash start timing detection section 220 and the backlash end detection section 260. Based on the detection signals (E_Set, S_Rst) indicating the start timing and end, the logic signal "S_BL" indicating the status of the backlash period is outputted by a flip-flop sr1 composed of an SR-FF (set-reset flip-flop). In the shown example, it is configured to output "=1" during the backlash period. Next, the following describes configuration of the backlash start timing detection section 220. $\hat{T}_d$ obtained by the disturbance torque observer 120 in FIGS. 27 and 34 corresponds to a reaction force from the elastic shaft, and is therefore converted to the shaft torsional phase $\hat{\theta}_d$ by dividing by the stiffness coefficient $K_d$ in the divider 210 (torque-to-phase converter). The backlash start timing detection section 220 detects the zero cross timing at which the polarity of the phase $\hat{\theta}_d$ switches between positive and negative, and outputs the start timing in the form of trigger signals. The trigger signals have two types according to the direction of phase change, wherein "E_For" is outputted for the direction from negative to positive, and "E_Rev" is outputted for the direction from positive to negative. These signals are combined into the single backlash start timing trigger signal E_Set by a logical sum circuit 221 (OR), and outputted from the backlash start timing detection section 220. This start timing is inputted and used as a trigger signal for the flip-flop sr1 (SR-FF). Furthermore, for detecting the end of the backlash, information on the direction of change in the phase is required. Therefore, the E_For and E_Rev trigger signals are latched, and the status signal "S_FR" indicating the polarity of the direction is also outputted.

Next, the following describes a method for detecting the end of backlash. The component $^\wedge T_d$ cannot be used for this purpose. The component $^\wedge T_d$ is constantly compensated by the vibration suppression control based on disturbance estimation by the disturbance torque observer, so that the motor-accelerating component during the backlash period is also compensated to change the output torque command $T_m$. In other words, since $^\wedge T_d$ also changes rapidly, it becomes impossible to accurately estimate the shaft torsional phase based on $^\wedge T_d$. Therefore, estimation of the end of backlash is implemented by combination with another prediction method. The configuration thereof is depicted at the bottom of FIG. 38.

Figure 40:
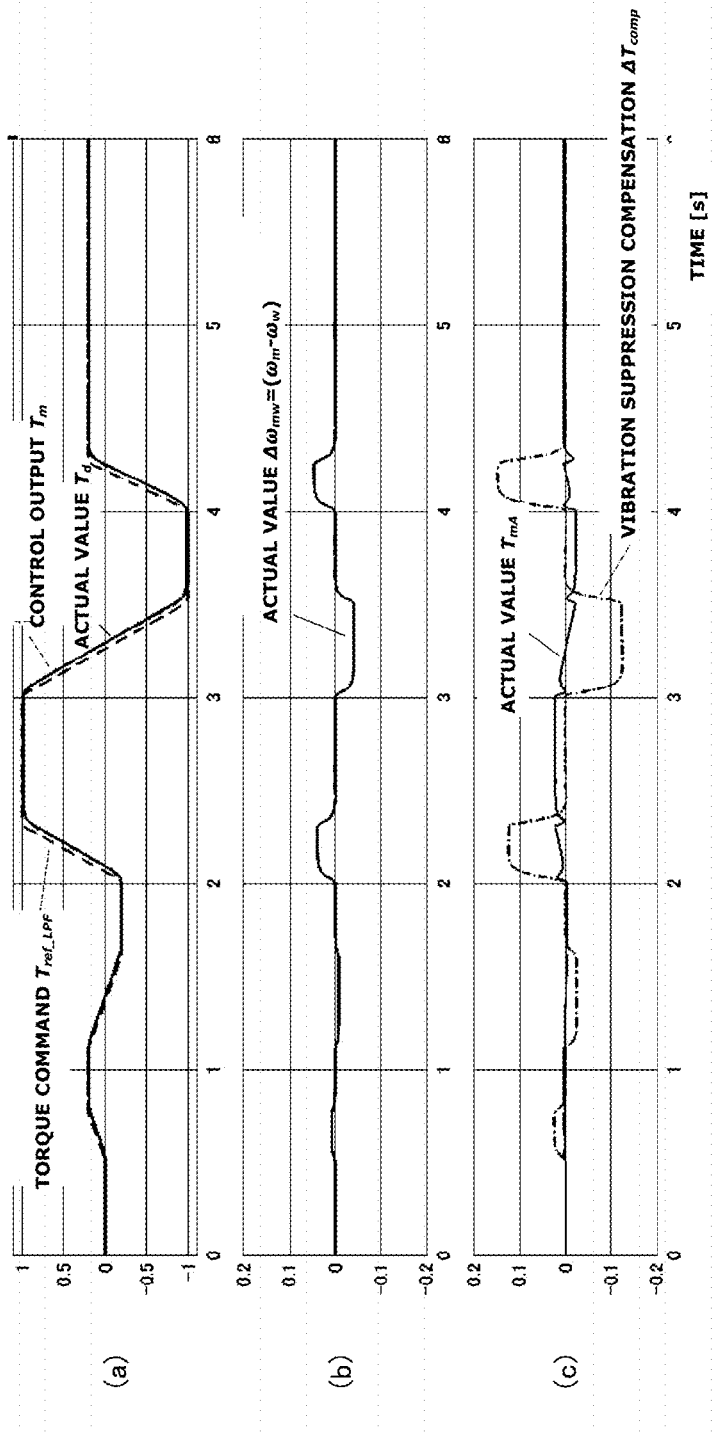
FIG. 40 is a diagram showing characteristics of acceleration/deceleration when the sixth embodiment of the present invention is employed and no backlash is assumed in an actual vehicle.

If there is no backlash and vibration is suppressed as in the waveform of the shaft torsional speed $\Delta\omega_{mW}$ shown in FIG. 40 (b), the shaft torsional speed becomes almost constant when the polarity changes while the shaft torque changes at a constant gradient. Since this speed is required for estimating the backlash period, a function is added for estimating the shaft torsional speed from the component $^\wedge T_d$.

For this purpose, the shaft torsional phase $^\wedge\theta_d$, which is produced by conversion from the component $^\wedge T_d$ by the divider 210, is used, and time-differentiated by the torsional speed estimation section 230, to calculate the shaft torsional speed $^\wedge\omega d\_divTd$.

This estimated shaft torsional speed is held as the initial torsional speed value $^\wedge\omega d_{\_ini}$ by the backlash start timing trigger signal E_Set outputted from the backlash start timing detection section 220, using the latch circuit sh1.

The torsional speed estimation section 230 is composed of a delayer 231, a subtractor 232 and a divider 233 for time differentiation.

However, since the torque command $T_m$ on the motor side changes even during the backlash period, the speed change component $^\wedge\Delta\omega d_{\_BL}$ is also estimated by time-integrating $T_m$ with the time constant $^\wedge TJ_m$ of the motor.

The time integration with the time constant $^\wedge TJ_m$ is performed by an integration coefficient multiplier $T_c/^\wedge TJ_m$ and an integrator 241 composed of a delayer having a delay operator $z^{-1}$ and an adder. The speed change component $^\wedge\Delta\omega d_{\_BL}$ is reset to zero by a switch sw3, which is switch-controlled by the backlash detection signal S_BLz estimated at the previous sampling timing until start of the backlash period. During the backlash period, the switch sw3 is switched to the adder side to the integrating part 241 to estimate the change component only.

Then, the change component $^\wedge\Delta\omega d_{\_BL}$ is added and corrected by the adder 251 to the initial speed $^\wedge\omega d_{\_ini}$ latched by the latch circuit sh1, to produce a quantity that is regarded as the shaft torsional speed $^\wedge\omega d_{\_BL}$ during the backlash period. Finally, in the torsional displacement estimation section 250, the shaft torsional speed $^\wedge\omega d_{\_BL}$ is time-integrated to estimate the phase change amount $^\wedge\Delta\theta_{BL}$ corresponding to the backlash. This time integration is performed by a multiplier 252 with the sample period $T_c$, and an integrator 253 composed of a delayer having a delay operator $z^{-1}$ and an adder.

The initial value of the phase change amount $^\wedge\Delta\theta_{BL}$ at the start of backlash is also reset to zero by a switch sw4 whose switching is controlled by the backlash detection signal S_BLz. During the backlash period, the switch sw4 is switched to the adder side to the integrating part 253 to estimate the phase change.

The integral coefficient multiplier $T_c/^\wedge TJ_m$, the integrating part 241, and the switch sw3 constitute the changing speed estimation section 240. The adder 251 corresponds to a compensating section for correcting the initial speed by the change component. In the position subsequent to the adder 251, the multiplier 252, the integrator 253, and the switch sw4 constitute the torsional displacement estimation section 250.

Next, the following describes configuration of the backlash end detection section 260.

The direction (positive/negative signs, positive/negative polarity) of the phase displacement to be estimated depends on the positive/negative polarity (S_FR) of the initial shaft torsional speed. Accordingly, a reference phase to be compared for determination of the end of backlash is required to be shifted depending on the positive/negative polarity. In view of the foregoing, reference phase setting parts 261p and 261n are provided for setting two kinds of determination reference phases in accordance with the positive/negative polarity. Switches sw2f and sw2r are switch-controlled by the status signal S_FR outputted from the backlash start timing detection section 220, to shift the determination reference phases, which are latched by latch circuits sh2f and sh2r at the timing of the backlash start timing trigger signal E_Set.

A determination phase width θp as a reference, which is latched by the latch circuit sh2f, is inputted to a "b" input terminal of a comparator cmpf. This is compared with the estimated phase change amount $^\wedge\Delta\theta_{BL}$ inputted to an "a" input terminal, to detect a state of $(^\wedge\Delta\theta_{BL} > \theta p)$.

A determination phase width θn as a reference, which is latched by the latch circuit sh2r, is inputted to an "a" input terminal of a comparator cmpr. This is compared with the estimated phase change amount $^\wedge\Delta\theta_{BL}$ inputted to a "b" input terminal, to detect a state of $(\theta n > ^\wedge\Delta\theta_{BL})$.

Outputs of determination of the comparators cmpf and cmpr are caused to pass through the logical sum circuit 262 to produce the backlash end signal S_Rst, and reset the flip-flop sr1.

In the reference phase setting parts 261p and 261n, a reference phase width of backlash is set as an unsigned absolute value $\theta_{BL}$, and a determination value is set by adding the margin width Δθ and then setting the positive/negative sign depending on the direction of change. Furthermore, even during the backlash period, the polarity of the torque command $T_m$ may change to reverse the direction of rotation. Accordingly, for the reverse direction, the determination level is set to about the margin width Δθ close to zero, thereby making it possible to output the end of backlash immediately in response to reverse. The determination phase widths θp and θn are compared with the estimated phase change amount $^\wedge\Delta\theta_{BL}$ to determine the end, and the signal S_BL of SR-FF (flip-flop sr1) is reset.

The above is an example of configuration of the backlash period estimation section.

The reference phase setting parts 261p and 261n, the switches sw2f and sw2r, the latch circuits sh2f and sh2r, the comparators cmpf and cmpr, and the logical sum circuit 262 constitute the backlash end detection section 260.

The flip-flop sr1 outputs the backlash detection signal S_BL during the period from being set by the backlash start timing trigger signal E_set to being reset by the backlash end signal S_Rst.

The estimated phase change amount $\hat{\Delta\theta}_{BL}$ is a change amount of the difference between the motor phase and the tire phase from the start of the backlash, and corresponds to an estimated phase of gear backlash play. When the play phase reaches the set backlash phase (θp, θn), the end of the backlash period is determined by the comparators cmpf, cmpr and logical sum circuit 262.

Referring back to FIG. 37, the following describes a method of limiting the torque command based on the backlash detection signal S_BL.

There are two types of upper and lower limit blocks in the prefilter part 100. The first upper and lower limit block TLIM0 (torque limiter 101) is a conventional one, and the other second upper and lower limit block TLIM1 (torque limiter 102) serves for limitation during the backlash period and sets a torque width (torque limit value) to a second torque limiter value smaller than the first upper and lower limit block TLIM0 (torque limiter 101). The switch swA is switched to a backlash limit side (TLIM1 side) only when the backlash detection signal S_BLz is indicating the backlash period. This limits the magnitude of the torque command during the backlash period, and thereby prevents acceleration of the motor.

However, if the compensation component $\Delta T_{comp}$ of the vibration suppression control is subtracted at the subsequent stage of the upper/lower limit block, the compensation component $\Delta T_{comp}$ is not subject to this limiting function. Therefore, the subtracting compensation part (compensation torque subtractor 201) is moved to the preceding stage of the limiter. With this configuration, when the switch swA is switched back from the backlash side (=1) to the normal side (=0), the output of the prefilter part 100 changes rapidly, thereby causing resonance.

Therefore, in order to ensure a bumpless feature, a system is adopted in which the compensation component $\Delta T_{comp}$ is subtracted at subg (compensation torque subtractor 201) and the same compensation component $\Delta T_{comp}$ is added at addg (adder 108) immediately before holding of the previous value (delayer 103).

The foregoing is an example of configuration of the detection of the backlash period and the method of limiting the torque command during the backlash period. The torque limitation during the backlash period does not need to be activated in all situations where the torque crosses zero, specifically, in situations where the rate of change of the torque command inputted from the outside is gradual. The vibration suppression control with the disturbance torque observer also operates to limit the torque command during the backlash period. Therefore, it is sufficient to cause the limitation by the backlash detection signal S_BL and TLIM1 (torque limiter 102) to be activated only when the limitation by the vibration suppression control is inadequate.

Next, the following describes the principles of the phase estimation. As described above, in the systems to which the sixth and seventh embodiments are applied, $\hat{T}_d$ cannot be used to detect the end of backlash. Therefore, since the combined rotational inertia of the tires and the vehicle body is large, and the torque command is also near zero, it is assumed that a speed change of the tire side during a short time is small, and the method described above is adopted.

If the rotational speeds of both ends of the gearing can be measured, the speed difference $\Delta\omega_{mw}(t)$ is calculated based on the motor side speed $\omega_m(t)$ and the tire side speed $\omega_w(t)$ as in mathematical expression (17), and the relative phase $\theta_{BL}(\Delta t)$ between the gear teeth during the backlash period can be calculated by time integration for the elapsed time $\Delta t$ from the backlash start time t0 as in mathematical expression (18).

$$\Delta\omega_{mw}(t0 + \Delta t) = \omega_m(t0 + \Delta t) - \omega_w(t0 + \Delta t) \qquad (17)$$

$$\theta_{BL}(\Delta t) = \int_{t0}^{t0+\Delta t} (\Delta\omega_{mw}(t))dt \qquad (18)$$

$\Delta\omega_{mw}(t)$ is a time derivative of the sum of two types of phase components, i.e. a phase component of shaft torsion and a phase component of backlash. $\Delta\omega_{mw}(t)$ indicates the shaft torsional speed until immediately before the occurrence of backlash, and indicates the relative speed during the period of gear play because the shaft torque during the backlash period is equal to zero.

However, since the tire side speed cannot be measured, the tire side speed is approximated using other information as in mathematical expression (19).

$$\begin{aligned}\hat{\Delta\omega}_{mw}(t0 + \Delta t) &\coloneqq \omega_m(t0 + \Delta t) - \hat{\Delta\omega}_w(t0) \qquad (19)\\ &\coloneqq \Delta\omega_m(\Delta t) + (\omega_m(t0) - \hat{\Delta\omega}_w(t0))\\ &= \Delta\omega_m(\Delta t) + \Delta\omega_{mw}(t0)\end{aligned}$$

First, on the assumption that the tire speed changes little, an initial value is held and substituted as $\hat{\omega}w(t0+\Delta t)\approx\hat{\omega}w(t0)$. Next, the motor side speed is separated into a speed change $\Delta\omega_m(\Delta t)$ and an initial speed $\omega_m(t0)$ as $\omega_m(t0+\Delta t) = \Delta\omega_m(\Delta t) + \omega_m(t0)$. Then, as in the third line of the mathematical expression (19), the right side is reduced into two elements, namely, the first term of the right side is reduced to the motor side speed change $\Delta\omega_m(\Delta t)$, and the second term of the right side is reduced to the initial value of the torsional speed $\Delta\omega_{mw}(t0)=(\omega_m(t0)-\hat{\omega}_w(t0))$. Thus, this is handled in a form where a variable term and a constant term are separated from each other.

For the constant term, the speed, which is produced by time-differentiating the phase $\hat{\theta}_d$ by the torsional speed estimation section 230, is used, wherein the phase $\hat{\theta}_d$ is estimated from $\hat{T}_d$. For the variable term, the motor speed change $\Delta\omega_m(\Delta t)$ during the backlash is estimated by integrating the torque command $T_m$ by mathematical expression (20).

$$\Delta\omega_m(\Delta t) = \frac{1}{TJm}\int_0^{\Delta t}(T_m(t))dt \qquad (20)$$

Advantageously, all of the input torque to the motor serves as a torque component that accelerates the motor, because no reaction force is applied to the motor output shaft. Therefore, the rotational inertia $TJ_m$ of the motor may be used as the integral time constant as in the integral coefficient multiplier $T_c/\hat{T}J_m$ of the speed change estimation section 240.

By mathematical expression (19) and the approximation of mathematical expression (20), it is possible to calculate an approximate value of the shaft torsional speed that changes during the backlash period. Then, by applying the integral calculation of mathematical expression (18) to the approximate value, it is possible to calculate an estimated value of the backlash phase. Then, by comparing the estimated value of the backlash phase with the preset backlash phase width, the end of the backlash is detected.

For description based on correspondence between the mathematical expressions described above and FIG. 38, the input signal $\hat{T}_d$ is divided by the stiffness coefficient $K_d$ to calculate the torsional phase $\hat{\theta}_d$; the torsional phase $\hat{\theta}_d$ is time-differentiated to calculate $\hat{\omega}d\_divTd$ corresponding to $\Delta\omega_{mw}(t)$; and $\hat{\omega}d\_divTd$ is sampled by the latch circuit sh1 to obtain $\hat{\omega}d_{\_ini}$ corresponding to the initial value $\Delta\omega_{mw}(t0)$. The torque command $T_m$, which is the other input signal, is time-integrated to calculate $\hat{\Delta}\omega d_{\_BL}$ corresponding to the motor side speed change $\Delta\omega_m(\Delta t)$; the sum of $\hat{\Delta}\omega d_{\_BL}$ and $\hat{\omega}d_{\_ini}$ is calculated by the adder 251 to determine $\hat{\omega}d_{\_BL}$ corresponding to $(t0+\Delta t)$; and $\hat{\omega}d_{\_BL}$ is time-integrated by the torsional displacement estimation section 250 to estimate $\hat{\theta}_{BL}$ corresponding to $\hat{\theta}_{BL}(\Delta t)$. The initial value of $\Delta\omega_m(\Delta t)$ in mathematical expression (20) and the initial value of $\hat{\theta}_{BL}(\Delta t)$ in mathematical expression (18) are zero at the start time t0. Accordingly, while the backlash detection signal S_BLz is at "0", namely, during a standby period where no backlash occurs, $\hat{\omega}d_{\_BL}$ and $\hat{\theta}_{BL}$ are reset to zero values by the switches sw3 and sw4.

In this way, it is possible to estimate the amount of change in the backlash phase by the configuration of FIG. 38. Then, the estimated amount of change is compared with the phase widths θp, θn, which are set by the reference phase setting parts 261p, 261n, to detect the end of backlash.

As described above, the backlash phase widths, which are set comparison references, have two kinds corresponding to torque change directions, namely, a kind corresponding to the positive direction, and a kind corresponding to the negative direction. Accordingly, selection is made by the switches sw2f and sw2r and latch circuits sh2h and sh2r.

The system of the eighth embodiment requires some assumptions and measures. First, at the start of estimation, the actual torque is required to be estimated wherein the estimated value of the disturbance torque observer is sufficiently converged. If large torque changes occur repeatedly in a short period of time, it is impossible to accurately estimate the start timing of backlash, so that an error occurs in the estimation of the initial speed, and the detection of the end becomes inaccurate. In this regard, it is conceivable that it is when the torque command is small that the torque polarity repeatedly changes in a short time. As described with reference to FIG. 42, the systems of the sixth and seventh embodiments are effective for suppressing the torque command, so that when the torque command is small, there is no problem even if the estimation operation of the eighth embodiment is stopped and the limiter switching is not performed.

Furthermore, since the phase of backlash varies from one machine to another, the estimated period varies. In this regard, it is preferable that the response be quiet even if the response is slightly delayed, rather than the period during which the torque is reduced is shortened to allow the occurrence of the rattling shock. Therefore, the backlash start determination is set to a level such that a backlash start can be detected a little earlier than zero-crossing of the torque (zero-cross edge detection by the backlash start timing detection section 220). This may be implemented by adding Δθ as an appropriate margin phase to the set values of the reference phase setting parts 261p, 261n, to delay detection.

FIG. 43 is a time chart showing an example of characteristics when the system of the eighth embodiment is additionally applied to the seventh embodiment. This is an example of behavior under the same conditions as in FIG. 42. The behavior regarding the prediction operation during the backlash period is shown in the time chart of FIG. 44.

In FIGS. 43 (A) and 43 (B) where waveforms (b) show the shaft torsional speed, it can be confirmed that the speed change width of the shaft torsional speed during the backlash period can be significantly suppressed as indicated by a section where the solid line and the dashed line overlap with each other. Furthermore, the control output $T_m$ is forcibly suppressed to a small value, and as shown in waveforms (c), the motor-accelerating torque $T_{mA}$ and the correction amount $\Delta T_{comp}$ of the vibration suppression control are both suppressed to small values. Since the estimated shaft torque $\hat{T}_d$ in waveforms (d) has a waveform similar to the actual torsional torque until the backlash starts, it can be seen that the start timing can be detected by zero-cross detection. However, during the subsequent backlash period, the component $\hat{T}_d$ is suppressed to be small, but it is not suppressed to near zero. Therefore, the torque limiter is added. Regarding the estimated torque $\hat{T}_{obs}$ of the disturbance torque observer, an estimation error occurs due to a pulsation remaining even after the backlash. However, the estimated torque $\hat{T}_{obs}$ converges to a normal estimated value within 0.1 s. Therefore, it is conceivable that the backlash estimation can be thereafter performed again.

Figure 44:
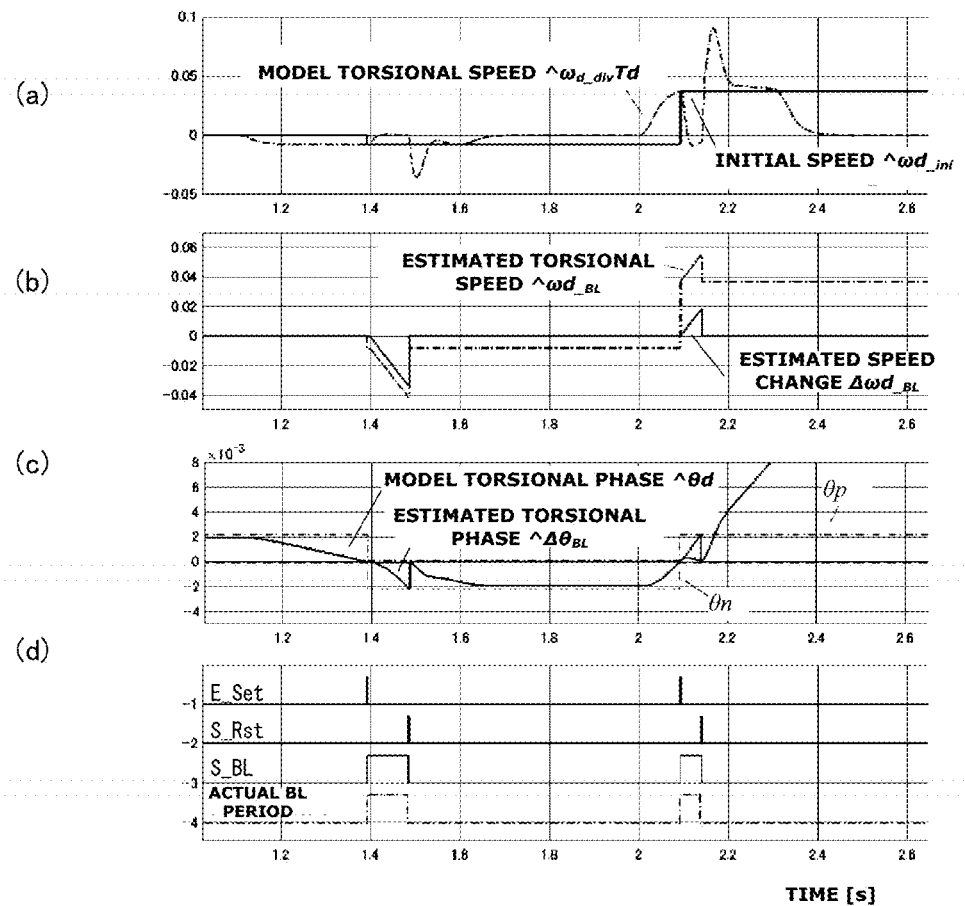
FIG. 44 is a diagram showing characteristics of acceleration/deceleration, showing behavior of a function of estimating a backlash period, when the eighth embodiment of the present invention is employed.

FIG. 44 shows behavior of the function of estimating the backlash period, wherein in waveforms (a), a dashed line indicates the torsional speed estimated based on the input of $\hat{T}_d$. Here, $\hat{\omega}_{d\_ini}$ held at the start is drawn with a solid line.

In waveforms (b), a solid line indicates the component $\Delta\omega_m(\Delta t)$ ($\hat{\Delta}\omega_{d\_BL}$) estimated by integrating the motor torque command, and a dashed line indicates the sum of the component $\Delta\omega_m(\Delta t)$ ($\hat{\Delta}\omega_{d\_BL}$) and the initial value $\hat{\omega}_{d\_ini}$ ($\hat{\omega}_{d\_BL}$) It can be confirmed that even if the torque command is limited, it is possible to generate a speed sufficient to terminate the backlash in a short time.

In waveforms (c), solid lines indicate the phase $\hat{\theta}_d$ calculated from the torque estimation $\hat{T}_d$, and the component $\hat{\Delta}\theta_{BL}$ estimated using the mathematical expression (18), a dashed line indicates θp, and a broken line indicates θn, wherein θp and θn are to be compared with $\hat{\Delta}\theta_{BL}$.

Waveforms (d) indicate the timing signals E_Set and S_Rst, and the backlash detection signal S_BL produced by latching the timing signals E_Set and S_Rst. For comparison, the backlash period detected from the actual plant model is also drawn with a dashed line at the bottom. It can be seen that the backlash period can be estimated almost accurately.

Ninth Embodiment

In the eighth embodiment, the slip phase and speed are estimated using the input/output difference component $\hat{T}_d$ of the disturbance torque observer. In the ninth embodiment, the torque command $T_m$ is used instead for input information. Specifically, the switch swB of FIG. 38 is set to the "=r" side to input $T_m$, which is caused to pass through the divider 210 to be transformed into the shaft torsional phase $\hat{\theta}_d$, thereby providing the torque command $T_m$ as a substitute of an information source for estimating $\hat{\theta}_d$.

Since the torque command is near zero, this approximation can be adopted if the compensation component of the vibration suppression control has converged.

Since a backlash occurs when the torsional torque of the shaft is near zero, the estimated shaft torque $\hat{T}_d$ calculated by the disturbance torque observer and $T_m$ are approximately equal to each other. Therefore, with regard to backlash prediction, there is little difference even if the signal is replaced.

Figure 46:
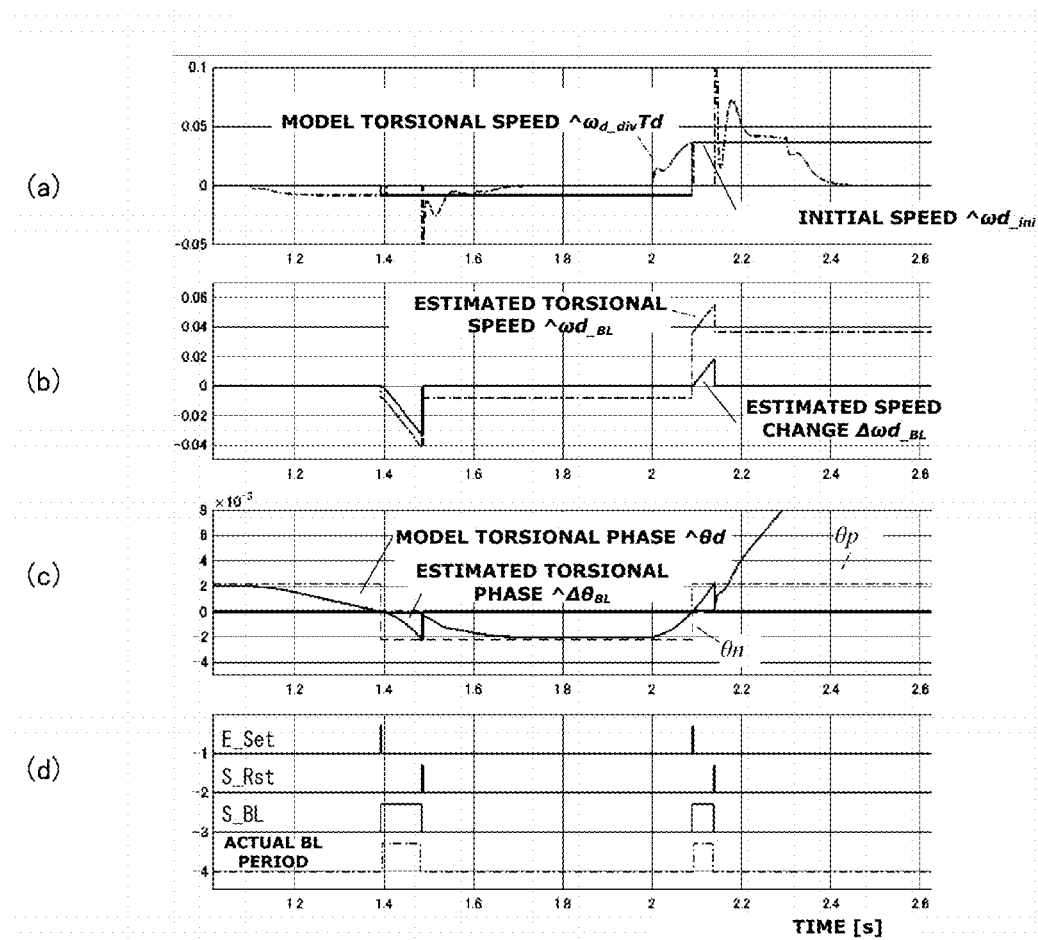
FIG. 46 is a diagram showing characteristics of acceleration/deceleration, showing behavior of a function of estimating a backlash period, when the ninth embodiment of the present invention is employed.

Other operations are the same as in the eighth embodiment. FIGS. 45 and 46 show an example of characteristics in correspondence to FIGS. 43 and 44. The characteristics of FIGS. 45 and 46 are almost the same as those of FIGS. 43 and 44. It has been confirmed that the operation is possible even with the approximation.

Comparing the examples of characteristics of the eighth embodiment and the ninth embodiment, it seems that there is little superiority or inferiority due to variation in system. Accordingly, for practical use, it is conceivable that which is to be selected is determined according to the amount of noise contained in speed measurement.

By expanding the configuration of the sixth and seventh embodiments with addition of the functions of the eighth and ninth embodiments, it is possible to estimate the backlash start time and end time, and furthermore, reduce the torque command during the backlash period, and thereby suppress the amount of acceleration of the motor. This reduces the kinetic energy resulting from acceleration, and reduce the shock when the gear teeth collide at the end of the backlash.

In this system, backlash cannot be accurately estimated in a region where the torque command is small or when the torque changes slowly. However, the vibration suppression control using the disturbance torque observer of the sixth and seventh embodiments also has a function of reducing the output torque command when the motor rapidly accelerates during the backlash period. Therefore, the eighth and ninth embodiments are not required to operate over the entire region, and are only required to operate only when the rate of change of the torque command is large enough to facilitate estimation of the backlash period.

In other words, by combining the sixth or seventh embodiment with the eighth or ninth embodiment, it is possible to suppress rattling shocks caused by a wide range of backlash.

The invention claimed is:

1. A vehicle system vibration suppression control device for a vehicle system in which a vehicle is driven via an elastic shaft by a motor drive device having a torque control function, the vehicle system vibration suppression control device comprising:
    at least one controller configured to:
        contain an approximate model to which an output torque command ($T_m$) is inputted;
        calculate a motor-accelerating torque component ($T_{mA}^*$) by differentiating a measured speed component ($\omega_m$) of a motor rotational speed;
        produce a compensation torque component ($T_{Fcomp}$) by causing the motor-accelerating torque component ($T_{mA}^*$) to pass through a vibration suppression control filter ($F_{comp}(s)$);
        calculate the output torque command ($T_m$) by subtracting the compensation torque component ($T_{Fcomp}$) from an input torque command ($T_{ref}$); and
        instruct the motor drive device to generate a motor torque corresponding to the calculated output torque command ($T_m$);
    wherein the vibration suppression control filter ($F_{comp}(s)$) is expressed by a mathematical expression (13), $$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \quad (13)$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$\zeta_A$: an adjustable parameter,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_t$: a coefficient relating to friction between tire and road surface, and
$TJ_{wM} = TJ_w + TJ_M$.

2. The vehicle system vibration suppression control device as claimed in claim 1, comprising a disturbance torque observer, wherein:
    the approximate model includes:
        a subtractor configured to subtract an estimated disturbance torque ($\hat{T}_{obs}$), which is calculated by the disturbance torque observer, and a shaft torsional torque ($\hat{T}_d$) from the output torque command ($T_m$) to output an estimated motor-accelerating torque component ($\hat{T}_{mA}$);
        a block configured to calculate a motor side acceleration by dividing the estimated motor-accelerating torque component ($\hat{T}_{mA}$) by a time constant equivalent to motor rotational inertia;
        a block configured to calculate a vehicle body side acceleration by dividing the shaft torsional torque ($\hat{T}_d$) by a combined rotational inertia of a vehicle body and tires;
        a block configured to calculate a relative speed between the motor and the vehicle body by time-integrating a difference between the motor side acceleration and the vehicle body side acceleration;
        a block configured to calculate a tire slip speed by multiplying the shaft torsional torque ($\hat{T}_d$) by a slip coefficient ($\hat{D}_s$); and
        a block configured to calculate the shaft torsional torque ($\hat{T}_d$) by transforming a difference between the tire slip speed and the relative speed between the motor and the vehicle body into a torsional phase of the elastic shaft by time integration, and multiplying the torsional phase of the elastic shaft by a torsional stiffness coefficient ($\hat{K}_d$) of driveline;
    wherein the disturbance torque observer is configured to:
        integrate with the time constant equivalent to motor rotational inertia a deviation between the estimated motor-accelerating torque component ($\hat{T}_{mA}$) and the motor-accelerating torque component ($T_{mA}^*$) calculated by differentiating the measured speed component ($\omega_m$) of the motor rotational speed to produce an integrated quantity;
        calculate the estimated disturbance torque ($\hat{T}_{obs}$) by multiplying the integrated quantity by an observer gain ($K_g$); and
        input the estimated disturbance torque ($\hat{T}_{obs}$) to the subtractor.

3. The vehicle system vibration suppression control device as claimed in claim 2, wherein the motor-accelerating torque component ($T_{mA}*$) is replaced with the estimated motor-accelerating torque component ($\hat{T}_{mA}$) for input to the vibration suppression control filter ($F_{comp}(s)$).

4. The vehicle system vibration suppression control device as claimed in claim 3, comprising a delay compensator configured to delay the estimated motor-accelerating torque component ($\hat{T}_{mA}$) for time matching between the estimated motor-accelerating torque component ($\hat{T}_{mA}$) and the measured speed component of the motor rotational speed.

5. The vehicle system vibration suppression control device as claimed in claim 4, comprising a low-pass filter configured to delay the deviation between the motor-accelerating torque component ($T_{mA}*$) and the estimated motor-accelerating torque component ($\hat{T}_{mA}$).

6. The vehicle system vibration suppression control device as claimed in claim 3, comprising:
a first multiplier configured to multiply the motor-accelerating torque component ($T_{mA}*$) by a variable weighting factor;
a second multiplier configured to multiply the estimated motor-accelerating torque component ($\hat{T}_{mA}$) by a variable weighting factor; and
an adder configured to sum outputs of the first and second multipliers;
wherein an output of the adder is inputted to the vibration suppression control filter ($F_{comp}(S)$).

7. The vehicle system vibration suppression control device as claimed in claim 4, comprising:
a first multiplier configured to multiply the motor-accelerating torque component ($T_{mA}*$) by a variable weighting factor;
a second multiplier configured to multiply the estimated motor-accelerating torque component ($\hat{T}_{mA}$) by a variable weighting factor; and
an adder configured to sum outputs of the first and second multipliers;
wherein an output of the adder is inputted to the vibration suppression control filter ($F_{comp}(S)$).

8. The vehicle system vibration suppression control device as claimed in claim 5, comprising:
a first multiplier configured to multiply the motor-accelerating torque component ($T_{mA}*$) by a variable weighting factor;
a second multiplier configured to multiply the estimated motor-accelerating torque component ($\hat{T}_{mA}$) by a variable weighting factor; and
an adder configured to sum outputs of the first and second multipliers;
wherein an output of the adder is inputted to the vibration suppression control filter ($F_{comp}(S)$).

9. A vehicle system vibration suppression control device for a vehicle system in which a vehicle is driven via an elastic shaft by a motor drive device having a torque control function, the vehicle system vibration suppression control device comprising:
a disturbance torque observer configured to:
calculate a measured motor rotational speed ($\omega_{m\_det}$) based on a measured value of a motor rotational phase and a measured value of time;
determine an estimated motor rotational speed ($\hat{\omega}_m$) by a vehicle model to which an output torque command ($T_m$) is inputted;
determine a first quantity ($\hat{\omega}_{m\_dly}$) by delaying the estimated motor rotational speed ($\hat{\omega}_m$) by a time equal to an overall delay time including a speed measurement side delay time; and
determine an estimated disturbance torque ($\hat{T}_{obs}$) based on a deviation between the measured motor rotational speed ($\omega_{m\_det}$) and the first quantity ($\hat{\omega}_{m\_dly}$); and
a feedback control section configured to:
produce a torque command ($T_{ref\_LPF}$) by causing an input torque command ($T_{ref}$) to pass through a pre-filter;
produce a compensation torque component ($\Delta T_{comp}$) by causing an estimated motor-accelerating torque component ($\hat{T}_{mA}$) to pass through a vibration suppression control filter, wherein the estimated motor-accelerating torque component ($\hat{T}_{mA}$) is calculated by the vehicle model;
calculate the output torque command ($T_m$) by subtracting the compensation torque component ($\Delta T_{comp}$) from the torque command ($T_{ref\_LPF}$); and
instruct the motor drive device to generate a motor torque corresponding to the calculated output torque command ($T_m$);
wherein the disturbance torque observer is a first block based on a sampled-data system model and configured to:
receive input of a second quantity ($\hat{T}_m$) calculated by subtracting the estimated disturbance torque ($\hat{T}_{obs}$) from the output torque command ($T_m$); and
calculate the estimated motor-accelerating torque component ($\hat{T}_{mA}$) based on the second quantity ($\hat{T}_m$);
wherein the disturbance torque observer includes:
a second block or a $\hat{T}_m$-$\hat{T}_{mA}$ transformation block;
wherein the second block includes a subtractor configured to subtract a shaft torsional torque ($\hat{T}_d$) from the second quantity ($\hat{T}_m$) to output the estimated motor-accelerating torque component ($\hat{T}_{mA}$);
wherein the second block is configured to:
calculate the estimated motor rotational speed ($\hat{\omega}_m$) by approximately integrating the estimated motor-accelerating torque component ($\hat{T}_{mA}$);
calculate a vehicle speed ($\hat{\omega}_{Wm}$) by approximately integrating the shaft torsional torque ($\hat{T}_d$);
calculate a tire slip speed by multiplying the shaft torsional torque ($\hat{T}_d$) by a slip coefficient ($\hat{D}_s$);
calculate a shaft torsional speed ($\hat{\omega}_d$) by subtracting the vehicle speed ($\hat{\omega}_{Wm}$) and the tire slip speed from the estimated motor rotational speed ($\hat{\omega}_m$);
produce a third quantity by approximately integrating a product of the shaft torsional speed ($\hat{\omega}_d$) and an integral coefficient ($\hat{K}_d \cdot T_c$);
produce the shaft torsional torque ($\hat{T}_d$) by causing the third quantity to pass through a delayer;
wherein the $\hat{T}_m$-$\hat{T}_{mA}$ transformation block is composed of a second order filter having a coefficient designed based on a second order transfer function expressed by a mathematical expression (12), $$G_{pTmA2}(s) = \frac{s^2 + (K_d \cdot D_s) \cdot s + K_d \cdot \frac{1}{TJ_{wM}}}{s^2 + (K_d \cdot D_s \cdot s) + K_d \cdot \left(\frac{1}{TJ_m} + \frac{1}{TJ_{wM}}\right)} = \frac{s^2 + 2 \cdot \zeta_a \cdot \omega_a \cdot s + \omega_a^2}{s^2 + 2 \cdot \zeta_r \cdot \omega_r \cdot s + \omega_r^2} \quad (12)$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_t$: a coefficient related to friction between tire and road surface, and
$TJ_{wM} = TJ_w + TJ_M$;
wherein the disturbance torque observer further includes:
   a gain multiplier configured to multiply the deviation between the first quantity ($\hat{\omega}_{m\_dly}$) and the measured motor rotational speed ($\omega_{m\_det}$) by an observer gain ($K_g$); and
   a delayer configured to delay an output of the gain multiplier to produce the estimated disturbance torque ($\hat{T}_{obs}$);
wherein the deviation between the measured motor rotational speed ($\omega_{m\_det}$) and the estimated motor rotational speed ($\hat{\omega}_m$) is determined by first, second, or third sampled data system model calculation;
wherein the first sampled data system model calculation is configured to:
   calculate the measured motor rotational speed ($\omega_{m\_det}$) by dividing a phase difference from a past sampled value of the motor rotational phase by a time difference;
   produce the first quantity ($\hat{\omega}_{m\_dly}$) by delaying the estimated motor rotational speed ($\hat{\omega}_m$) by a delay block; and
   calculate the deviation between the measured motor rotational speed ($\omega_{m\_det}$) and the first quantity ($\hat{\omega}_{m\_dly}$);
wherein the second sampled data system model calculation is configured to:
   calculate the measured motor rotational speed ($\omega_{m\_det}$) by dividing a phase difference from a past sampled value of the motor rotational phase by a constant sampling period;
   produce the first quantity ($\hat{\omega}_{m\_dly}$) by delaying the estimated motor rotational speed ($\hat{\omega}_m$) by a delay block; and
   calculate the deviation between the measured motor rotational speed ($\omega_{m\_det}$) and the first quantity ($\hat{\omega}_{m\_dly}$);
wherein the third sampled data system model calculation is configured to:
   calculate the measured motor rotational speed ($\omega_{m\_det}$) by dividing an input signal from an integrating part of a sampled data system first-order delay filter by a sampling period (Tc), wherein the sampled data system first-order delay filter is configured to process a measured value of the motor rotational phase;
   produce the first quantity ($\hat{\omega}_{m\_dly}$) by delaying the estimated motor rotational speed ($\hat{\omega}_m$) by a delay block having a first-order delay filter identical in coefficient to the sampled data system first-order delay filter; and
   calculate the deviation between the measured motor rotational speed ($\omega_{m\_det}$) and the first quantity ($\hat{\omega}_{m\_dly}$); and wherein the vibration suppression control filter ($F_{comp}(s)$) is expressed by a mathematical expression (13), $$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \quad (13)$$

where
s: a Laplace operator,
$\omega_r = \sqrt{(K_d \cdot (1/TJ_m + 1/TJ_{wM}))}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$\zeta_A$: an adjustable parameter,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_t$: a coefficient relating to friction between tire and road surface, and
$TJ_{wM} = TJ_w + TJ_M$.

10. A vehicle system vibration suppression control device for a vehicle system in which a vehicle is driven via an elastic shaft by a motor drive device having a torque control function, the vehicle system vibration suppression control device comprising:
   a disturbance torque observer configured to:
      calculate a measured motor rotational speed ($\omega_{m\_det}$) based on a measured value of a motor rotational phase and a measured value of time; and
      determine an estimated disturbance torque ($\hat{T}_{obs}$) based on a time differential component ($T_{mA\_det}$) of the measured motor rotational speed ($\omega_{m\_det}$) and an output torque command ($T_m$); and
   a feedback control section configured to:
      produce a torque command ($T_{ref\_LPF}$) by causing an input torque command ($T_{ref}$) to pass through a pre-filter;
      produce a compensation torque component ($\Delta T_{comp}$) by causing an estimated motor-accelerating torque component ($\hat{T}_{mA}$) to pass through a vibration suppression control filter, wherein the estimated motor-accelerating torque component ($\hat{T}_{mA}$) is calculated by a model of the vehicle;
      calculate the output torque command ($T_m$) by subtracting the compensation torque component ($\Delta T_{comp}$) from the torque command ($T_{ref\_LPF}$); and
      instruct the motor drive device to generate a motor torque corresponding to the calculated output torque command ($T_m$);
   wherein the disturbance torque observer is a first block based on a sampled-data system model and configured to:
      receive input of a second quantity ($\hat{T}_m$) calculated by subtracting the estimated disturbance torque ($\hat{T}_{obs}$) from the output torque command ($T_m$); and
      calculate the estimated motor-accelerating torque component ($\hat{T}_{mA}$) based on the second quantity ($\hat{T}_m$);
   wherein the disturbance torque observer includes:
      a second block or a $\hat{T}_m$-$\hat{T}_{mA}$ transformation block;
      wherein the second block includes a subtractor configured to subtract a shaft torsional torque ($\hat{T}_d$) from the second quantity ($\hat{T}_m$) to output the estimated motor-accelerating torque component ($\hat{T}_{mA}$);

wherein the second block is configured to:
calculate a first quantity by subtracting a product of the estimated motor-accelerating torque component ($\char"005E\relax T_{mA}$) and an integral coefficient ($T_c/TJ_m$) from a product of the shaft torsional torque ($\char"005E\relax T_d$) and an integral coefficient ($T_c/TJ_{wM}$);
calculate a third quantity by first approximate integration of the first quantity;
calculate a tire slip speed by multiplying the shaft torsional torque ($\char"005E\relax T_d$) by a slip coefficient ($\char"005E\relax D_s$);
calculate a shaft torsional speed ($\char"005E\relax \omega_d$) by subtracting the tire slip speed from the third quantity;
produce a fourth quantity by second approximate integration of a product of the shaft torsional speed ($\char"005E\relax \omega_d$) and an integral coefficient ($\char"005E\relax K_d \cdot T_c$);
produce the shaft torsional torque ($\char"005E\relax T_d$) by causing the fourth quantity to pass through a delayer;
wherein the $\char"005E\relax T_m$-$\char"005E\relax T_{mA}$ transformation block is composed of a second order filter having a coefficient designed based on a second order transfer function expressed by a mathematical expression (12), $$G_{pTmA2}(s) = \frac{s^2 + (K_d \cdot D_s) \cdot s + K_d \cdot \dfrac{1}{TJ_{wM}}}{s^2 + (K_d \cdot D_s \cdot s) + K_d \cdot \left(\dfrac{1}{TJ_m} + \dfrac{1}{TJ_{wM}}\right)} = \frac{s^2 + 2 \cdot \zeta_a \cdot \omega_a \cdot s + \omega_a^2}{s^2 + 2 \cdot \zeta_r \cdot \omega_r \cdot s + \omega_r^2} \quad (12)$$

wherein the disturbance torque observer further includes:
an integrator configured to integrate a deviation component ($\Delta T_{mA\_dly}$) between a fifth quantity ($\char"005E\relax T_{mA\_dly}$) and the time differential component ($T_{mA\_det}$), wherein the fifth quantity ($\char"005E\relax T_{mA\_dly}$) is produced by delaying the estimated motor-accelerating torque component ($\char"005E\relax T_{mA}$);
a gain multiplier configured to multiply an output of the integrator by an observer gain ($K_g$); and
a delayer configured to delay an output of the gain multiplier to produce the estimated disturbance torque ($\char"005E\relax T_{obs}$);
wherein the deviation ($\Delta T_{mA\_det}$) is determined by first, second, or third sampled data system model calculation;
wherein the first sampled data system model calculation is configured to:
calculate the measured motor rotational speed ($\omega_{m\_det}$) by dividing a phase difference from a past sampled value of the motor rotational phase by a time difference;
produce a sixth quantity by delaying the measured motor rotational speed ($\omega_{m\_det}$);
calculate the time differential component ($\char"005E\relax T_{mA\_det}$) by differentiating the sixth quantity with a coefficient ($TJ_m/Tc$);
produce the fifth quantity ($\char"005E\relax T_{mA\_dly}$) by delaying the estimated motor-accelerating torque component ($\char"005E\relax T_{mA}$) by a delay block; and
calculate the deviation between the time differential component ($\char"005E\relax T_{mA\_det}$) and the fifth quantity ($\char"005E\relax T_{mA\_dly}$);

wherein the second sampled data system model calculation is configured to:
calculate the measured motor rotational speed ($\omega_{m\_det}$) by dividing a phase difference from a past sampled value of the motor rotational phase by a constant sampling period;
produce a sixth quantity by delaying the measured motor rotational speed ($\omega_{m\_det}$);
calculate the time differential component ($\char"005E\relax T_{mA\_det}$) by differentiating the sixth quantity with a coefficient ($TJ_m/Tc$);
produce the fifth quantity ($\char"005E\relax T_{mA\_dly}$) by delaying the estimated motor-accelerating torque component ($\char"005E\relax T_{mA}$) by a delay block; and
calculate the deviation between the time differential component ($\char"005E\relax T_{mA\_det}$) and the fifth quantity ($\char"005E\relax T_{mA\_dly}$);
wherein the third sampled data system model calculation is configured to:
determine the time differential component ($\char"005E\relax T_{mA\_det}$) as an input signal from an integrating part of a sampled data system first-order delay filter, wherein the sampled data system first-order delay filter is configured to process the measured motor rotational speed ($\omega_{m\_det}$) produced by differentiating a measured value of the motor rotational phase;
produce the fifth quantity ($\char"005E\relax T_{mA\_dly}$) by delaying the estimated motor-accelerating torque component ($\char"005E\relax T_{mA}$) by a delay block having a first-order delay filter identical in coefficient to the sampled data system first-order delay filter; and
calculate the deviation between the time differential component ($\char"005E\relax T_{mA\_det}$) and the fifth quantity ($\char"005E\relax T_{mA\_dly}$); and
wherein the vibration suppression control filter ($F_{comp}(S)$) is expressed by a mathematical expression (13), $$F_{comp}(s) = \frac{2 \cdot (\zeta_A - \zeta_r) \cdot \omega_r \cdot s}{s^2 + 2 \cdot \zeta_a \cdot \omega_a \cdot s + \omega_a^2} \quad (13)$$

where
s: a Laplace operator,
$\omega_r = \sqrt{(K_d \cdot (1/TJ_m + 1/TJ_{wM})}$,
$\omega_a = \sqrt{(K_d \cdot (1/TJ_{wM}))}$,
$\zeta_r = (K_d \cdot D_s)/(2 \cdot \omega_r)$,
$\zeta_a = (K_d \cdot D_s)/(2 \cdot \omega_a)$,
$\zeta_A$: an adjustable parameter,
$D_s = TJ_M/(TJ_w + TJ_M) \cdot K_t$,
$TJ_m$: a time constant equivalent to motor inertia,
$TJ_w$: a time constant equivalent to driving wheel inertia (a combined value of multiple driving wheels),
$TJ_M$: a time constant equivalent to vehicle mass,
$K_d$: a torsional stiffness coefficient of driveline,
$K_t$: a coefficient relating to friction between tire and road surface, and
$TJ_{wM} = TJ_w + TJ_M$.

11. The vehicle system vibration suppression control device as claimed in claim 9, comprising:
a backlash period detection section configured to detect a backlash period;
a compensation torque subtractor configured to subtract the compensation torque component ($\Delta T_{comp}$) from the torque command ($T_{ref\_LPF}$) to output the output torque command ($T_m$), wherein the torque command ($T_{ref\_LPF}$) is produced by causing the input torque command ($T_{ref}$) to pass through the prefilter to suppress a high frequency band;

first and second torque limiters configured to limit the output torque command ($T_m$) outputted from the compensation torque subtractor, wherein the first torque limiter has a first torque limit value, and wherein the second torque limiter has a second torque limit value smaller than the first torque limit value;

a switch configured to select one of an output of the first torque limiter and an output of the second torque limiter, and when the backlash period detection section detects the backlash period, select the output of the second torque limiter; and an adder configured to calculate a first sum of the output of one of the torque limiters selected by the switch and the compensation torque component ($\Delta T_{comp}$), and feed the first sum back to the prefilter;

wherein the backlash period detection section includes:
- a torque-to-phase transformation section configured to receive input of the shaft torsional torque ($\hat{T}_d$) estimated, which is a difference between the second quantity ($\hat{T}_m$) and the estimated motor-accelerating torque component ($\hat{T}_{mA}$), and transform the estimated shaft torsional torque ($\hat{T}_d$) into an estimated shaft torsional phase ($\hat{\theta}_d$);
- a backlash start timing detection section configured to detect a zero cross point of the estimated shaft torsional phase ($\hat{\theta}_d$) as a start timing of the backlash period;
- a torsional speed estimation section configured to estimate the shaft torsional speed by time-differentiating the estimated shaft torsional phase ($\hat{\theta}_d$);
- a speed change estimation section configured to estimate a speed change component during the backlash period by time-integrating the output torque command ($T_m$);
- a torsional displacement estimation section configured to calculate an estimated phase change amount ($\hat{\Delta\theta}_{BL}$) corresponding to backlash by:
  - calculating a second sum of the shaft torsional speed, which is estimated by the torsional speed estimation section, an initial torsional speed, which is stored at the start timing of the backlash period detected by the backlash start timing detection section, and the speed change component during the backlash period, which is estimated by the speed change estimation section; and
  - time-integrating the second sum; and
- a backlash end detection section configured to detect an end of the backlash period by comparing the phase change amount ($\hat{\Delta\theta}_{BL}$), which is estimated by the torsional displacement estimation section, with an absolute value of backlash phase width ($\hat{\theta}_d$) and a margin width ($\Delta\theta$) as set values; and wherein the backlash period is detected based on the backlash start timing detected by the backlash start timing detection section and the backlash end signal detected by the backlash end detection section.

12. The vehicle system vibration suppression control device as claimed in claim 10, comprising:
a backlash period detection section configured to detect a backlash period;
a compensation torque subtractor configured to subtract the compensation torque component ($\Delta T_{comp}$) from the torque command ($T_{ref\_LPF}$) to output the output torque command ($T_m$), wherein the torque command ($T_{ref\_LPF}$) is produced by causing the input torque command ($T_{ref}$) to pass through the prefilter to suppress a high frequency band;

first and second torque limiters configured to limit the output torque command ($T_m$) outputted from the compensation torque subtractor, wherein the first torque limiter has a first torque limit value, and wherein the second torque limiter has a second torque limit value smaller than the first torque limit value;

a switch configured to select one of an output of the first torque limiter and an output of the second torque limiter, and when the backlash period detection section detects the backlash period, select the output of the second torque limiter; and an adder configured to calculate a first sum of the output of one of the torque limiters selected by the switch and the compensation torque component ($\Delta T_{comp}$), and feed the first sum back to the prefilter;

wherein the backlash period detection section includes:
- a torque-to-phase transformation section configured to receive input of the shaft torsional torque ($\hat{T}_d$) estimated, which is a difference between the second quantity ($\hat{T}_m$) and the estimated motor-accelerating torque component ($\hat{T}_{mA}$), and transform the estimated shaft torsional torque ($\hat{T}_d$) into an estimated shaft torsional phase ($\hat{\theta}_d$);
- a backlash start timing detection section configured to detect a zero cross point of the estimated shaft torsional phase ($\hat{\theta}_d$) as a start timing of the backlash period;
- a torsional speed estimation section configured to estimate the shaft torsional speed by time-differentiating the estimated shaft torsional phase ($\hat{\theta}_d$);
- a speed change estimation section configured to estimate a speed change component during the backlash period by time-integrating the output torque command ($T_m$);
- a torsional displacement estimation section configured to calculate an estimated phase change amount ($\hat{\Delta\theta}_{BL}$) corresponding to backlash by:
  - calculating a second sum of the shaft torsional speed, which is estimated by the torsional speed estimation section, an initial torsional speed, which is stored at the start timing of the backlash period detected by the backlash start timing detection section, and the speed change component during the backlash period, which is estimated by the speed change estimation section; and
  - time-integrating the second sum; and
- a backlash end detection section configured to detect an end of the backlash period by comparing the phase change amount ($\hat{\Delta\theta}_{BL}$), which is estimated by the torsional displacement estimation section, with an absolute value of backlash phase width ($\hat{\theta}_d$) and a margin width ($\Delta\theta$) as set values; and wherein the backlash period is detected based on the backlash start timing detected by the backlash start timing detection section and the backlash end signal detected by the backlash end detection section.

13. The vehicle system vibration suppression control device as claimed in claim 11, wherein the estimated shaft torsional torque ($\hat{T}_d$) is replaced with the output torque command ($T_m$) for input to the torque-to-phase transformation section.

14. The vehicle system vibration suppression control device as claimed in claim 12, wherein the estimated shaft torsional torque ($\hat{T}_d$) is replaced with the output torque command ($T_m$) for input to the torque-to-phase transformation section.

15. A vehicle system vibration suppression control method comprising operating the vehicle system vibration suppression control device as claimed in claim 1.

\* \* \* \* \*